United States Patent
Sato et al.

(10) Patent No.: US 7,137,035 B2
(45) Date of Patent: Nov. 14, 2006

(54) LOAD TESTING APPARATUS, COMPUTER READABLE RECORDING MEDIUM FOR RECORDING LOAD TEST PROGRAM, FAULT DIAGNOSIS APPARATUS, AND COMPUTER READABLE RECORDING MEDIUM FOR RECORDING FAULT DIAGNOSIS PROGRAM

(75) Inventors: Satoshi Sato, Kanagawa (JP); Shintaro Suzuki, Kanagawa (JP)

(73) Assignee: Fijitsu Limited, Kawasaki (JP)

( * ) Notice: Subject to any disclaimer, the term of this patent is extended or adjusted under 35 U.S.C. 154(b) by 481 days.

(21) Appl. No.: 10/449,012

(22) Filed: Jun. 2, 2003

(65) Prior Publication Data
US 2004/0078718 A1   Apr. 22, 2004

Related U.S. Application Data

(62) Division of application No. 09/513,695, filed on Feb. 25, 2000, now Pat. No. 6,665,268.

(30) Foreign Application Priority Data
Aug. 31, 1999   (JP)   ................... 11-246519

(51) Int. Cl.
*G06F 11/00*   (2006.01)
(52) U.S. Cl. .................. 714/25; 714/12; 714/30
(58) Field of Classification Search .................. 714/25
See application file for complete search history.

(56) References Cited

FOREIGN PATENT DOCUMENTS

| JP | HEI 3-238951 A | 10/1991 |
| JP | HEI 4-256260 A | 9/1992 |
| JP | HEI 7-129522 A | 5/1995 |
| JP | HEI 7-183899 A | 7/1995 |

OTHER PUBLICATIONS

Culler, David E. Parallel Computer Architecture: A Hardware/Software Approach. (c) 1999. Morgan Kauffman Publishers, Inc. pp. 468-473, 750-755.*

Culler, David E. Parallel Computer Architecture: A Hardware/Software Approach. (c) 1999. Morgan Kauffman Publishers, Inc. pp. 789-790.*

* cited by examiner

*Primary Examiner*—Robert Beausoliel
*Assistant Examiner*—Matthew Urick
(74) *Attorney, Agent, or Firm*—Staas & Halsey LLP

(57) ABSTRACT

In a load testing apparatus, before the load test, three processor elements are combined, without overage or shortage, with a source processor element and a destination processor element as one pair, and the transmission time between the processor elements for each pair is measured. During the load test, packets are sent at a time from the source processor element to the corresponding destination processor element in the same pair, and the transmission time for each pair is measured. The transmission time measured for each pair in the load test is compared with a corresponding expected value data so as to evaluate the performance.

3 Claims, 32 Drawing Sheets

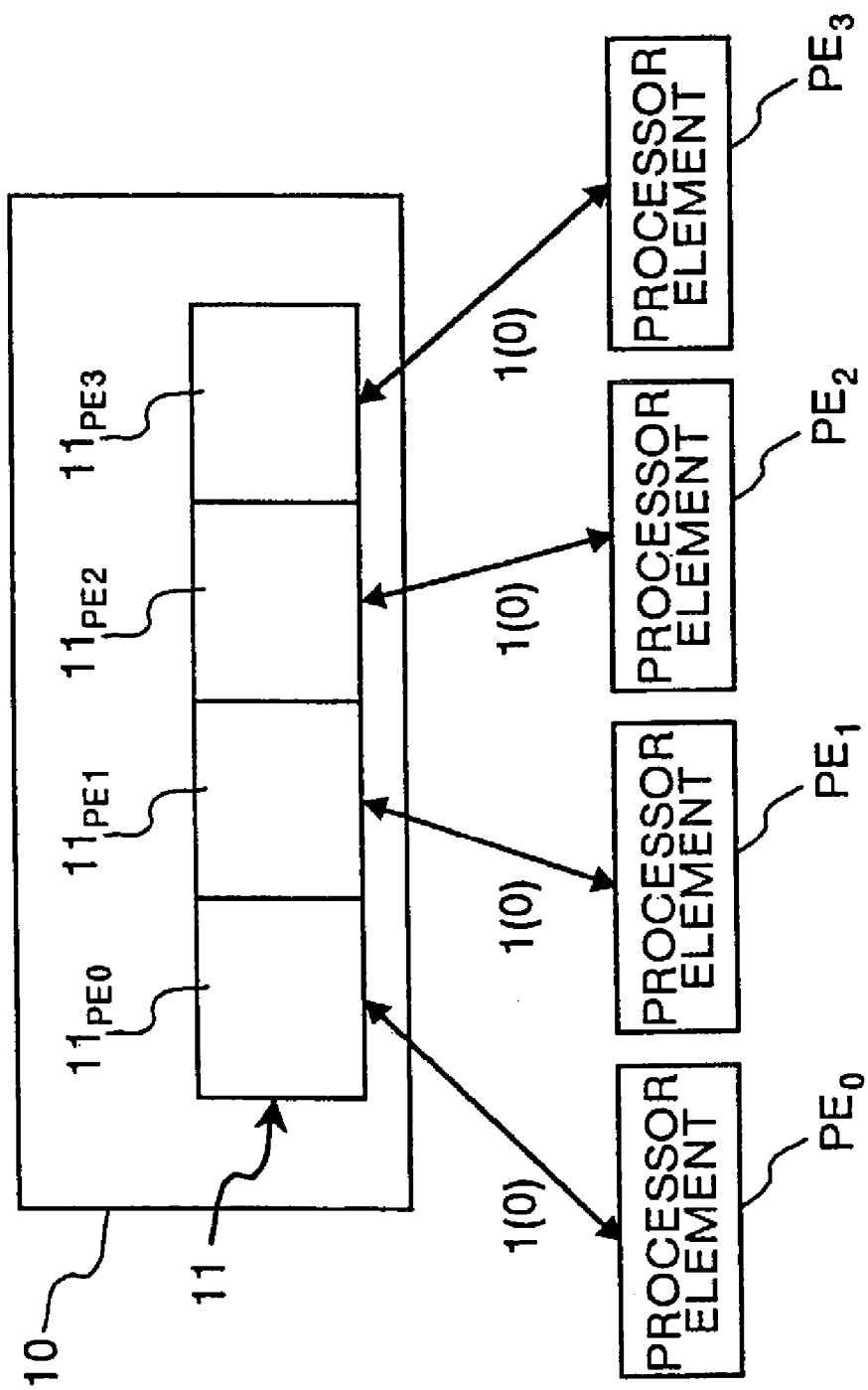

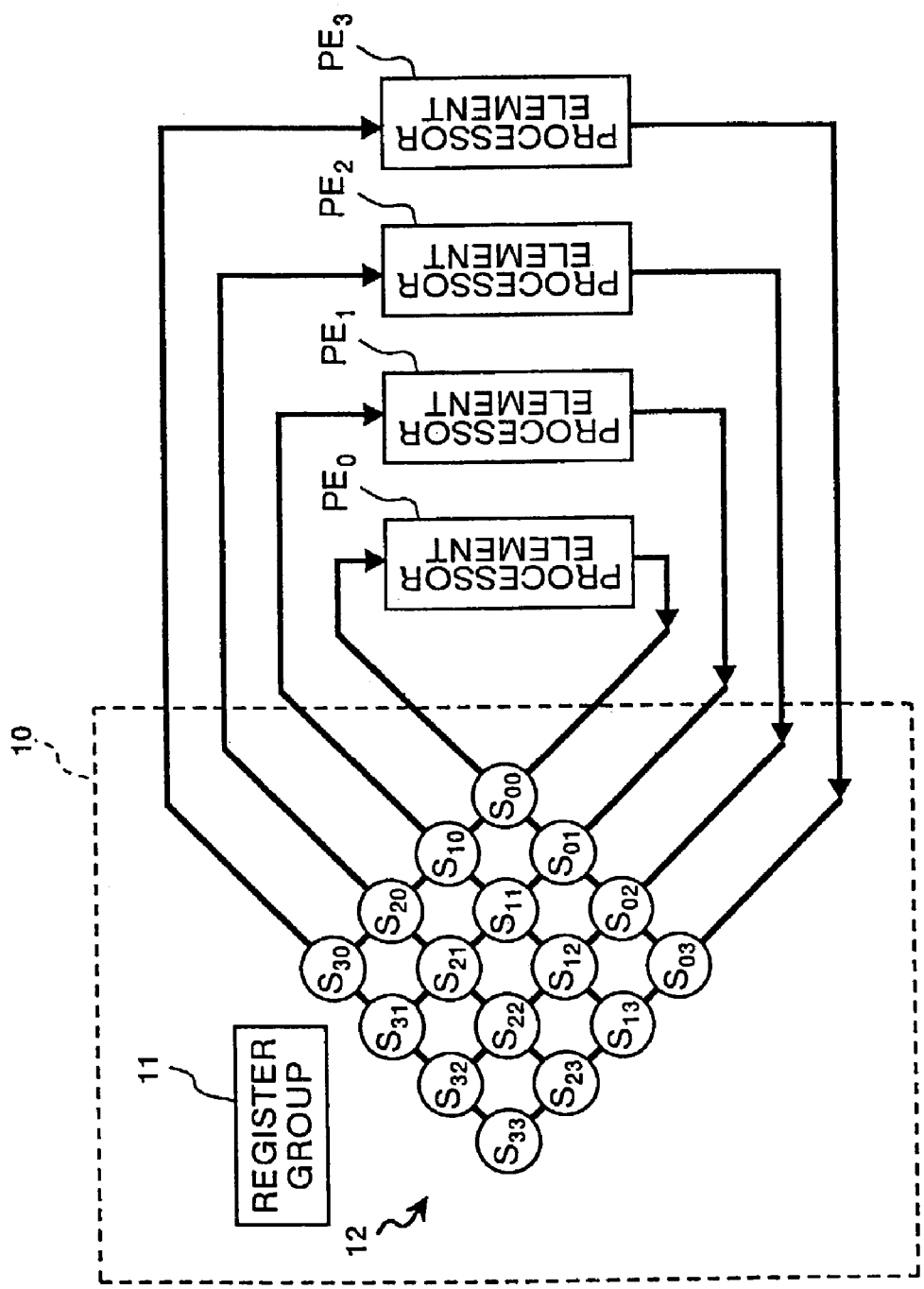

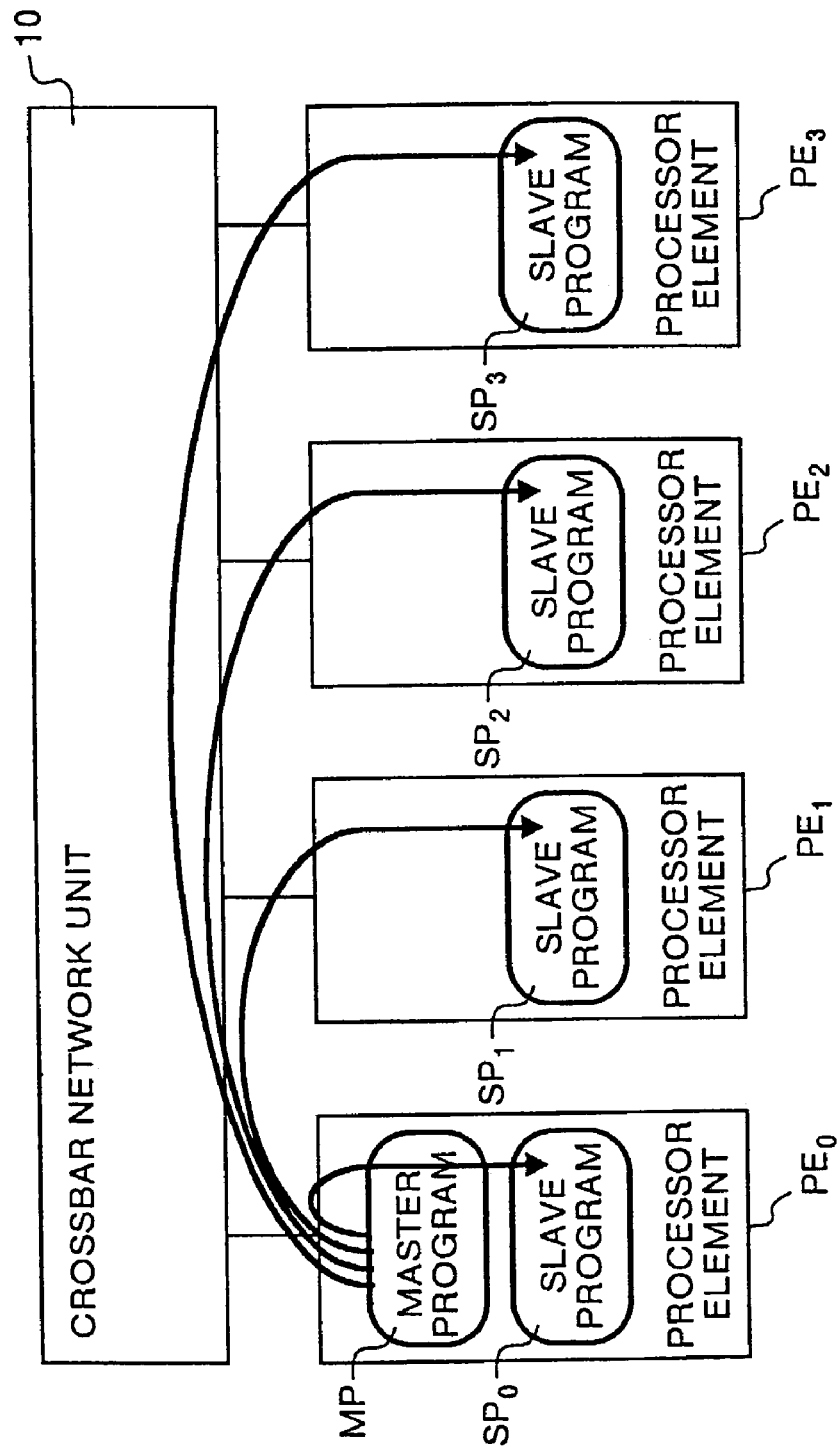

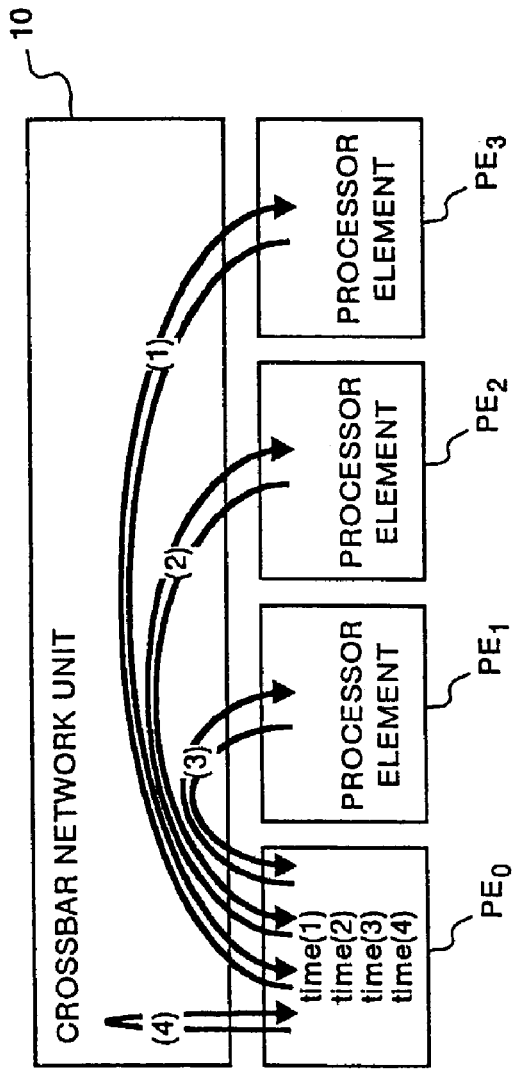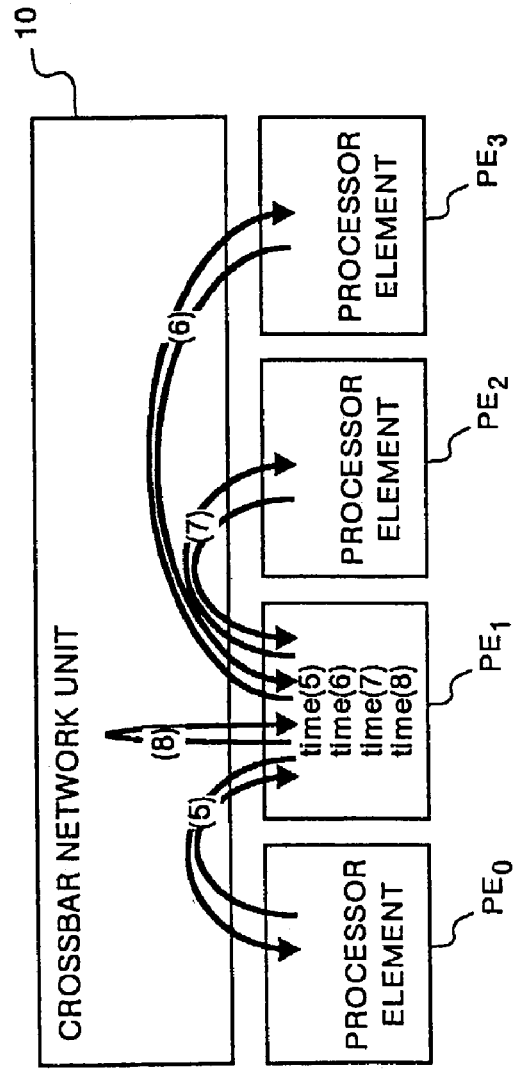
FIG.5A
FIG.5B

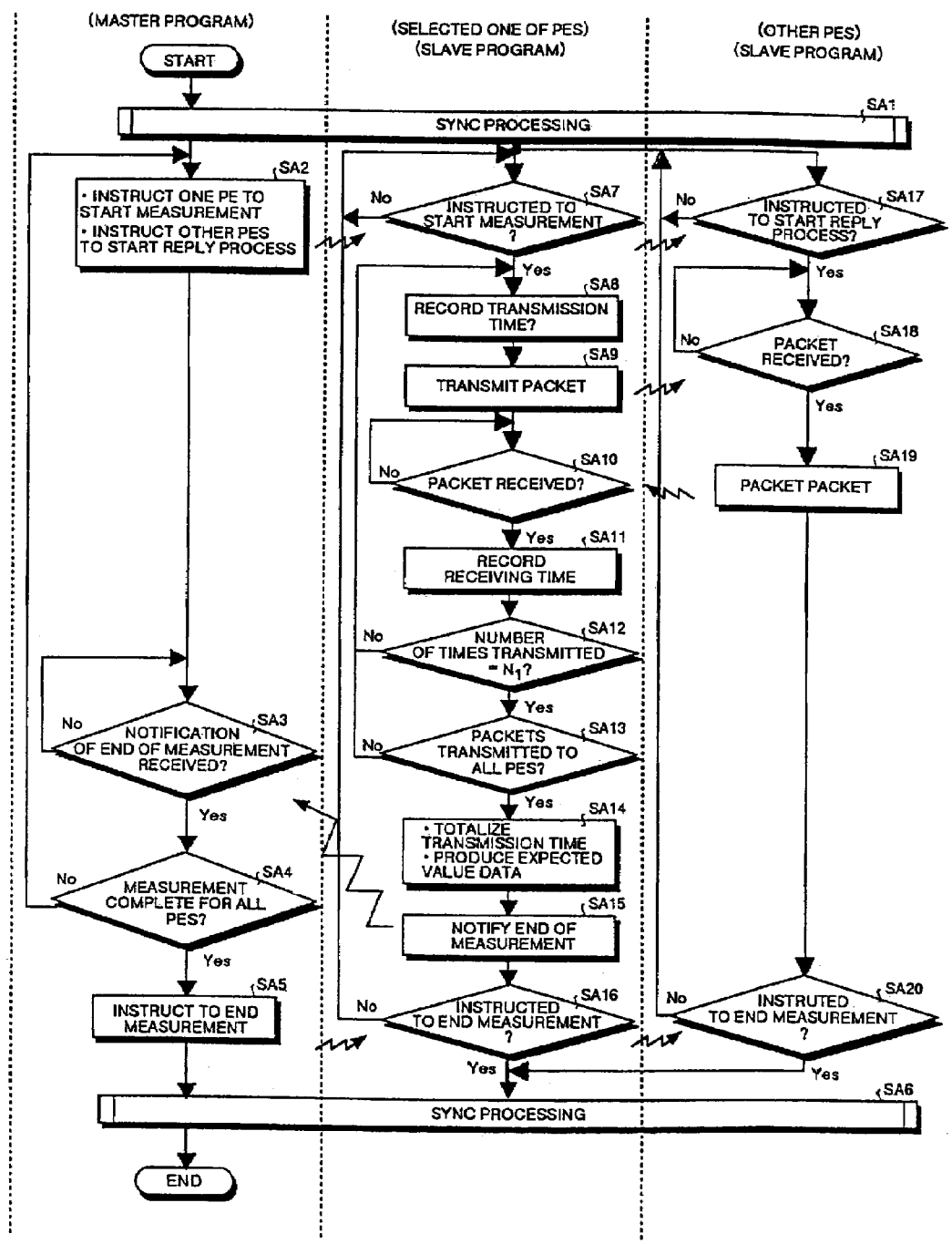

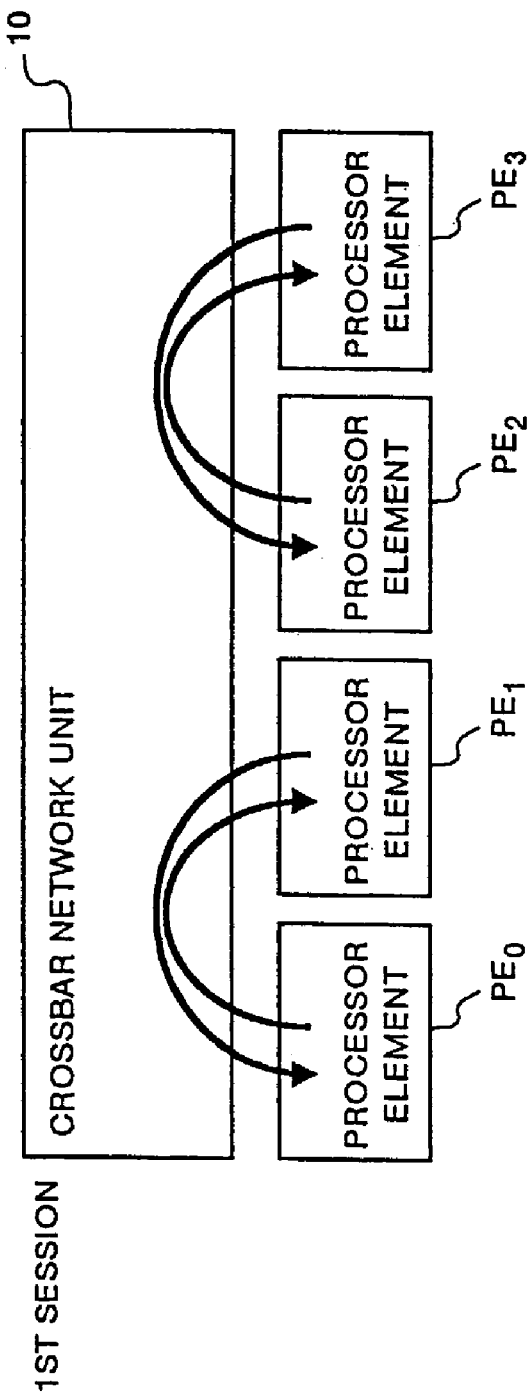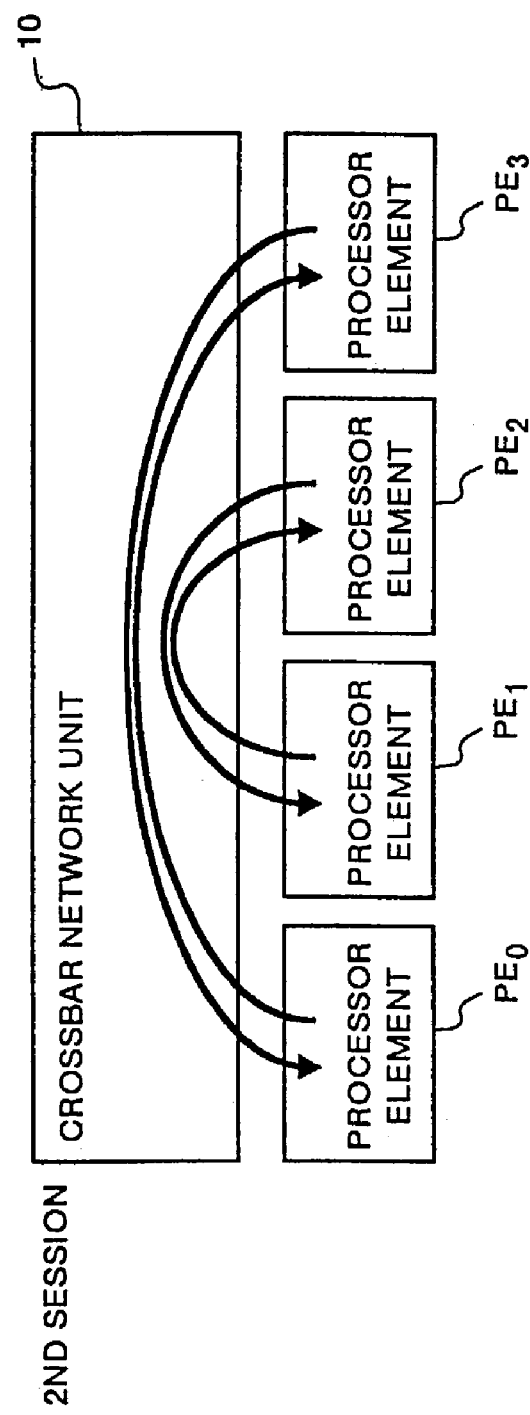

FIG.10

| SET NO. | PE NO. | | | |
|---|---|---|---|---|
| 1 | 0-0 | 1-1 | 2-2 | 3-3 |
| 2 | 0-0 | 1-1 | 2-3 | 3-2 |
| 3 | 0-0 | 1-2 | 2-1 | 3-3 |
| 4 | 0-0 | 1-2 | 2-3 | 3-1 |
| 5 | 0-0 | 1-3 | 2-1 | 3-2 |
| 6 | 0-0 | 1-3 | 2-2 | 3-1 |
| 7 | 0-1 | 1-0 | 2-2 | 3-3 |
| 8 | 0-1 | 1-0 | 2-3 | 3-2 |
| 9 | 0-1 | 1-2 | 2-0 | 3-3 |
| 10 | 0-1 | 1-2 | 2-3 | 3-0 |
| 11 | 0-1 | 1-3 | 2-0 | 3-2 |
| 12 | 0-1 | 1-3 | 2-2 | 3-0 |
| 13 | 0-2 | 1-0 | 2-3 | 3-1 |
| 14 | 0-2 | 1-1 | 2-0 | 3-3 |
| 15 | 0-2 | 1-1 | 2-3 | 3-0 |
| 16 | 0-2 | 1-2 | 2-0 | 3-3 |
| 17 | 0-2 | 1-3 | 2-0 | 3-1 |
| 18 | 0-2 | 1-3 | 2-1 | 3-0 |
| 19 | 0-3 | 1-0 | 2-1 | 3-2 |
| 20 | 0-3 | 1-0 | 2-2 | 3-1 |
| 21 | 0-3 | 1-1 | 2-0 | 3-2 |
| 22 | 0-3 | 1-1 | 2-2 | 3-0 |
| 23 | 0-3 | 1-2 | 2-0 | 3-1 |
| 24 | 0-3 | 1-2 | 2-1 | 3-0 |

FIG.25

| PACKET ID | SOURCE PE | DESTINATION PE | PACKET PROPER |
|---|---|---|---|
| 0 | A | A | PACKET 0 |
| 1 | A | B | PACKET 1 |
| 2 | A | C | PACKET 2 |
| 3 | A | D | PACKET 3 |
| 4 | A | E | PACKET 4 |
| 5 | B | A | PACKET 5 |
| 6 | B | B | PACKET 6 |
| 7 | B | C | PACKET 7 |
| 8 | B | D | PACKET 8 |
| 9 | B | E | PACKET 9 |
| 10 | C | A | PACKET 10 |
| 11 | C | B | PACKET 11 |
| 12 | C | C | PACKET 12 |
| 13 | C | D | PACKET 13 |
| 14 | C | E | PACKET 14 |
| 15 | D | A | PACKET 15 |
| 16 | D | B | PACKET 16 |
| 17 | D | C | PACKET 17 |
| 18 | D | D | PACKET 18 |
| 19 | D | E | PACKET 19 |
| 20 | E | A | PACKET 20 |
| 21 | E | B | PACKET 21 |
| 22 | E | C | PACKET 22 |
| 23 | E | D | PACKET 23 |
| 24 | E | E | PACKET 24 |

FIG.28

| PACKET ID | SOURCE PE | DESTINATION PE | PACKET PROPER | RESULT |
|---|---|---|---|---|
| 0 | A | A | PACKET 0 | OK |
| 1 | A | B | PACKET 1 | OK |
| 2 | A | C | PACKET 2 | OK |
| 3 | A | D | PACKET 3 | OK |
| 4 | A | E | PACKET 4 | OK |
| 5 | B | A | PACKET 5 | OK |
| 6 | B | B | PACKET 6 | OK |
| 7 | B | C | PACKET 7 | OK |
| 8 | B | D | PACKET 8 | OK |
| 9 | B | E | PACKET 9 | OK |
| 10 | C | A | PACKET 10 | OK |
| 11 | C | B | PACKET 11 | OK |
| 12 | C | C | PACKET 12 | NG |
| 13 | C | D | PACKET 13 | OK |
| 14 | C | E | PACKET 14 | OK |
| 15 | D | A | PACKET 15 | OK |
| 16 | D | B | PACKET 16 | OK |
| 17 | D | C | PACKET 17 | NG |
| 18 | D | D | PACKET 18 | OK |
| 19 | D | E | PACKET 19 | OK |
| 20 | E | A | PACKET 20 | OK |
| 21 | E | B | PACKET 21 | OK |
| 22 | E | C | PACKET 22 | NG |
| 23 | E | D | PACKET 23 | OK |
| 24 | E | E | PACKET 24 | OK |

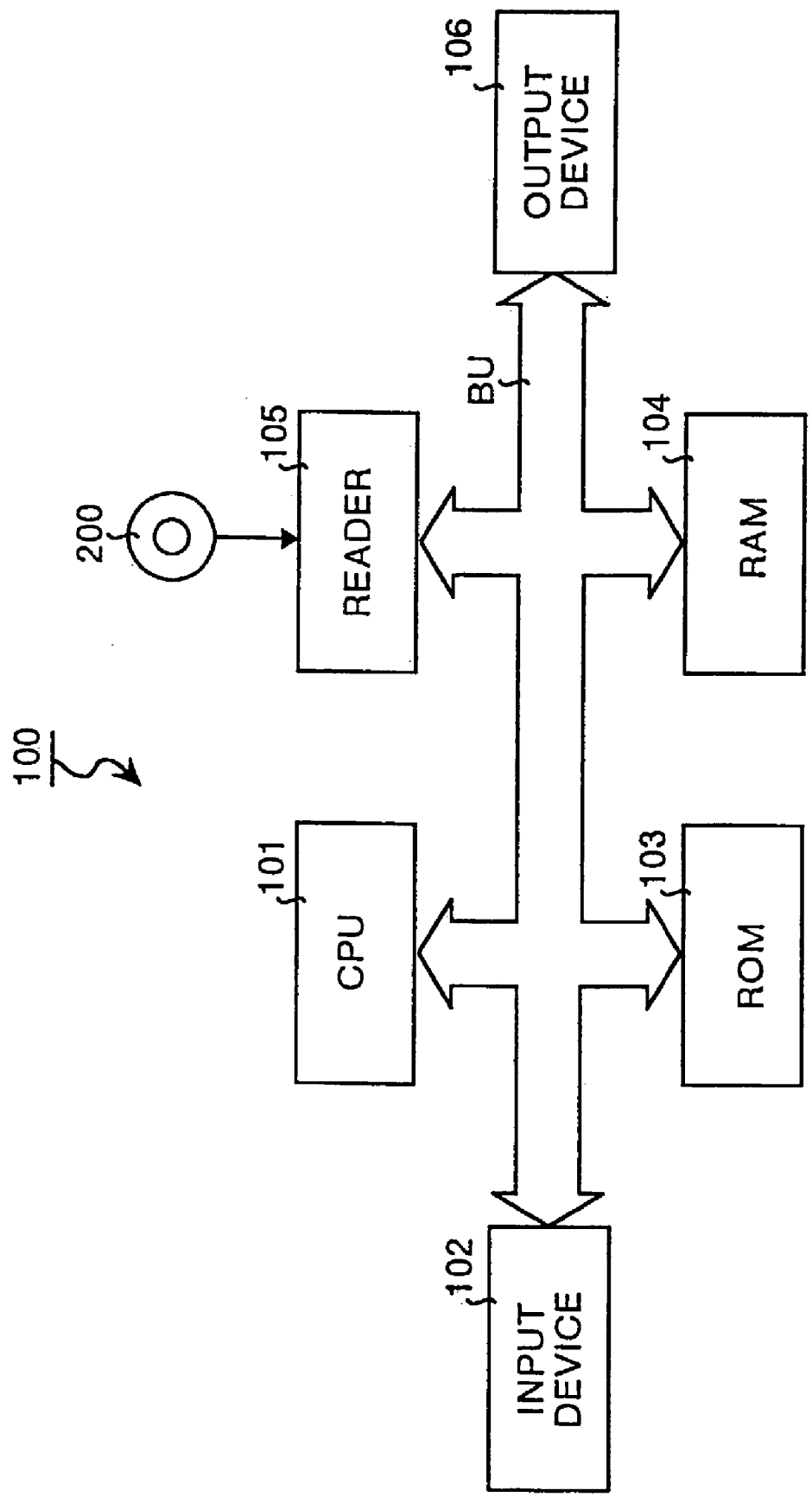

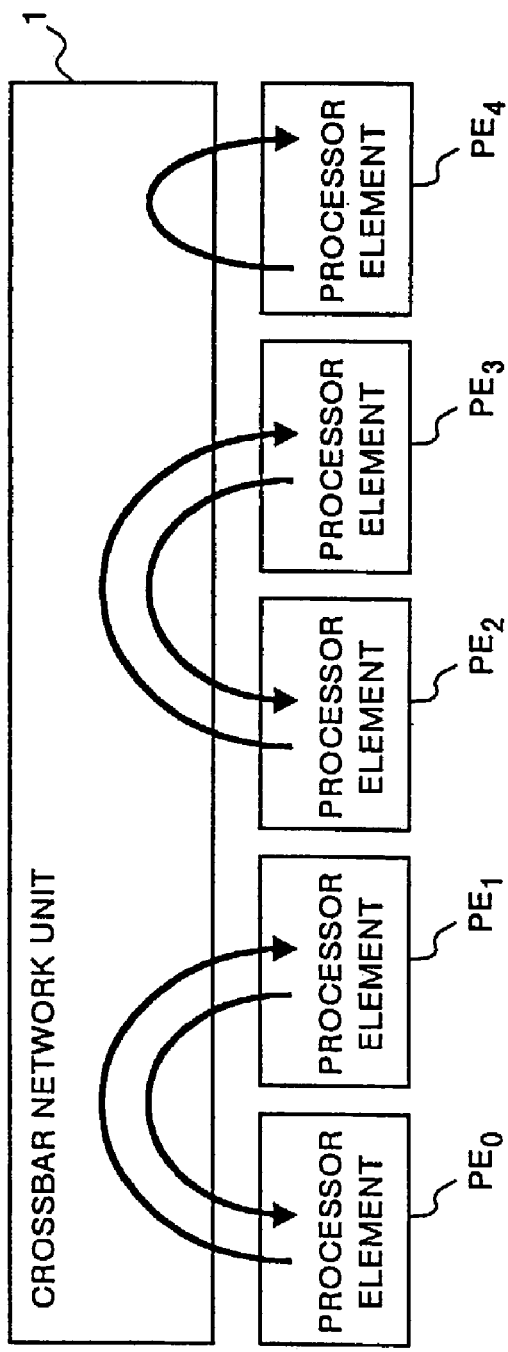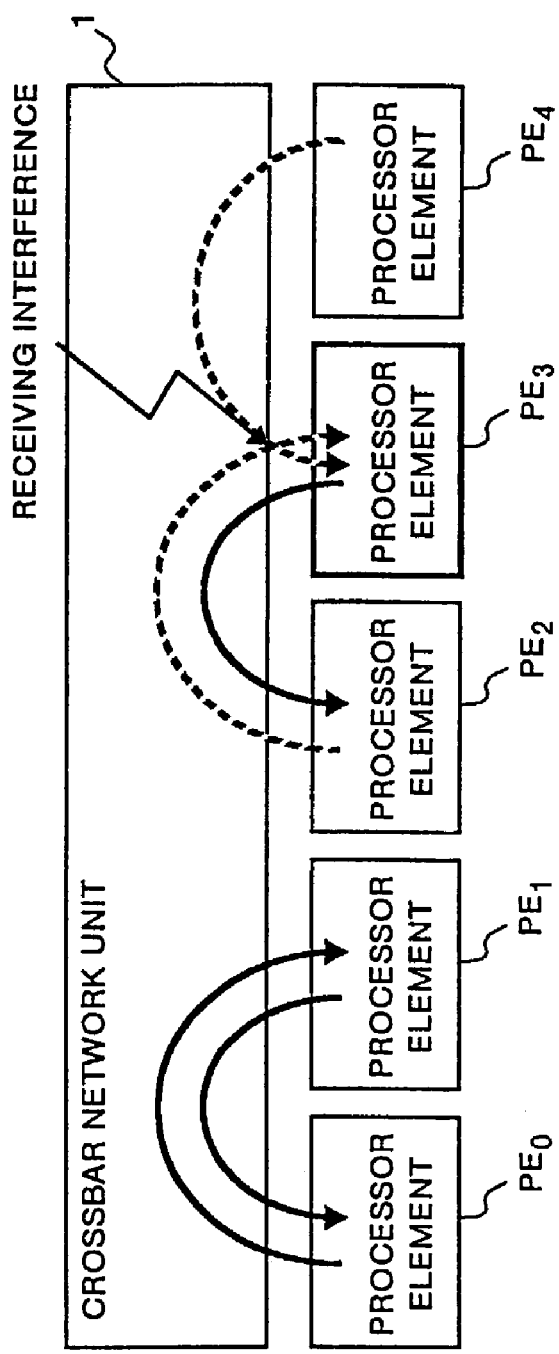

LOAD TESTING APPARATUS, COMPUTER READABLE RECORDING MEDIUM FOR RECORDING LOAD TEST PROGRAM, FAULT DIAGNOSIS APPARATUS, AND COMPUTER READABLE RECORDING MEDIUM FOR RECORDING FAULT DIAGNOSIS PROGRAM

This application is a divisional of application Ser. No. 09/513,695, filed Feb. 25, 2000, now U.S. Pat. No. 6,665,268.

FIELD OF THE INVENTION

The present invention relates to a load testing apparatus used for the load test or fault diagnosis of a parallel processor system, a computer readable recording medium for recording a load test program, a fault diagnosis apparatus, and a computer readable recording medium for recording a fault diagnosis program. More particularly, this invention relates to a load testing apparatus, a computer readable recording medium for recording a load test program, a fault diagnosis apparatus, and a computer readable recording medium for recording a fault diagnosis program, which can produce a highly reliable test result and identify a defective point with rapidity.

BACKGROUND OF THE INVENTION

In the field of science and technology including the atomic power, meteorology and aeronautics, a parallel processor system for arithmetically processing a vast quantity of data far exceeding the data processing capacity of a general-purpose mainframe computer is required. The parallel processor system is generally called the supercomputer, in which an ultrahigh speed arithmetic operation is realized by parallel processing of a plurality of processor elements interconnected through an inter-processor network (such as a crossbar network unit). The parallel processor system requires a specification capable of exhibiting at least a predetermined level of performance even in the state of high utilization rate of a CPU (Central Processing Unit), i.e. under a heavy load. Therefore, a load testing apparatus for checking the performance under heavy load is indispensable for designing, development and performance evaluation of the parallel processor system. Also, the parallel processor system is required to have means and a method of identifying a defective point rapidly in case of a fault.

FIG. 32A is a block diagram showing a configuration of the conventional parallel processor system described above. A crossbar network unit 1 and five processor elements $PE_0$ to $PE_4$ making up the parallel processor system are shown in FIG. 32A. The processor elements $PE_0$ to $PE_4$ are arithmetic elements for executing the parallel computation in accordance with a parallel algorithm, and each include a transmission unit and a receiving unit (not shown) for transmitting and receiving packets (data), respectively. The crossbar network unit 1 is for interconnecting the processor elements $PE_0$ to $PE_4$ and includes a group of N×N (5×5 in the shown case) crossbar switches (not shown). The incoming line side of the crossbar network unit 1 is connected to the transmission unit (not shown) of the processor elements $PE_0$ to $PE_4$, respectively, and the outgoing line side thereof is connected to the receiving unit (not shown) of the processor elements $PE_0$ to $PE_4$, respectively.

For the parallel processor system described above, a load test is conducted for checking the performance under load. In the load test, packets are transmitted from a predetermined processor element of a source to a processor element of a destination and thereby a pseudo-load is generated, and the performance is evaluated based on the comparison between the packet transmission time (measurement) and an expected value. theoretically determined.

Specifically, first, a plurality of sets (pairs) of the processor elements. $PE_0$ to $PE_4$ are determined by being extracted at random as shown in FIG. 32A. In the example shown in FIG. 32A and FIG. 32B, the following sets 1A to 5A are determined.

| | Source | Destination |
|---|---|---|
| (1A) | Processor element $PE_0$ and | processor element $PE_1$ |
| (2A) | Processor element $PE_1$ and | processor element $PE_0$ |
| (3A) | Processor element $PE_2$ and | processor element $PE_3$ |
| (4A) | Processor element $PE_3$ and | processor element $PE_2$ |
| (5A) | Processor element $PE_4$ and | processor element $PE_4$ |

The next step in the load test is to transmit packets from the processor elements $PE_0$ to $PE_4$ of the source in 1A to 5A above to the corresponding processor elements $PE_1$ to $PE_4$, respectively, of the destination at a time. As a result, the packets are exchanged by the crossbar network unit 1, and received by the processor elements $PE_1$ to $PE_4$ of the destination. In the process, the packet transmission time between each set of the processor elements is measured. In the case under consideration, a total of five measurements (transmission time) corresponding to 1A to 5A are obtained. These transmission time are compared with an expected value theoretically determined, and the performance of the parallel processor system is evaluated based on whether the difference between the transmission time and the expected value is in a tolerable range.

The expected value is a theoretical value of the transmission time which is expected to take for the packets to be transmitted between the processor elements in actual arithmetic operation. This expected value is a constant value of the theoretical transmission time plus a margin. The theoretical transmission time is the one between the processor elements which enables the parallel processor system to exhibit the maximum performance, and is calculated by a technique such as a simulation. The margin, on the other hand, is a value for absorbing the difference in transmission time caused by the difference of the physical distance between different sets of the processor elements described above.

The load test of the parallel processor system is desirably conducted under as heavy a condition as possible in order to assure proper evaluation of the performance under severe operating conditions. In the prior art, however, the processor elements $PE_0$ to $PE_4$ of the sources and destinations are combined at random as shown in FIG. 32A, and therefore, it is sometimes impossible to conduct the load test under heavy condition as shown in FIG. 32B, thereby leading to the disadvantage that the reliability of the test result is low.

Specifically, in the case shown in FIG. 32A, the processor elements of the source and the processor elements of the destination are combined in one-to-one relation, and packets are sent at the same time from all the source processor elements. Thus, the load test under heavy load can be conducted.

In the sets shown in FIG. 32B, on the other hand, a receiving interference is caused in the processor element $PE_3$, and therefore the load is reduced. Specifically, FIG.

32B illustrates a combination for packet transmission in which two processor elements $PE_2$ and $PE_4$ of the source send packets to one processor element $PE_3$ of the destination. In this combination, the two packets, which are sent from the processor elements $PE_2$ and $PE_4$ of the source, arrive at the single processor element $PE_3$ through the crossbar network unit 1. In the process, the processor element $PE_3$ of the destination which can receive only one packet at a time develops a receiving interference in which the two packets compete with each other.

Actually, however, the chance of the two packets arriving at the processor element $PE_3$ at the same time point is very slim due to the difference in transmission time. As a result, while the first arriving one of the two packets is received by the processor element $PE_3$, the other packet stands by. The combination causing this receiving interference, as compared with the sets shown in FIG. 32A, reduces the load and therefore a reliable test result cannot be obtained.

Also, in the conventional load test, an expected value (theoretical value) including a margin is applied uniformly to all the transmission time (measurements) between a plurality of sets of the processor elements, as described above. Actually, however, due to the difference in physical distance described above, the transmission time (measurement) is varied from one processor element set to another. In view of the fact that a predetermined expected value is used for varied transmission time, the conventional load test may produce a test result different from the reality, and therefore has the disadvantage of low reliability.

On the other hand, the conventional parallel processor system requires identification of a defective point based on the phenomenon presented at the time of a fault in which a packet is not sent from a processor element of the source or a packet sent from a processor element of the source fails to be received by a corresponding processor element of the destination. In the conventional parallel processor system, the configuration is complicated with the increase in the number of the processor elements involved, and the number of points to be checked increases to such an extent that a vast amount of labor and time are required before successfully identifying a defective point. Especially in the case of a fault of the crossbar network unit 1, a vast number of crossbar switches are required to be checked one by one and the workload required makes the identification of a defective point very difficult.

Further, in the case where a fault occurs in a processor element of the source, the address of a packet may change and therefore the particular packet may be sent erroneously to an entirely different destination. In such a case, the destination processor element which should otherwise receive the particular packet cannot receive it, and therefore detects a fault as a time out for receiving. On the other hand, the destination processor element that has received the packet erroneously sent thereto also detects a fault. In contrast, the processor element of the source that has actually developed a fault is regarded to be in normal operation since it has sent out the packet any way. In case of the secondary fault described above, it is more difficult to identify a defective point.

SUMMARY OF THE INVENTION

It is an object of the invention to provide a load testing apparatus, a computer readable recording medium for recording a load test program, a fault diagnosis apparatus, and a computer readable recording medium for recording a fault diagnosis program, which can produce a highly reliable test result and can identify a defective point with rapidity.

In order to achieve the object described above, according to one aspect of the present invention, the load testing apparatus comprises a transmission time measuring unit for measuring the transmission time between each set of arithmetic unit as an expected value based on the result of combining a plurality of arithmetic units accurately into a plurality of sets each including an arithmetic unit of the source and an arithmetic unit of the destination; a load test unit for sending packets from a plurality of arithmetic unit of the source to the corresponding arithmetic unit of the destination each constituting a set with the corresponding arithmetic unit of the source and measuring the transmission time between each set of arithmetic unit based on the result of accurate combination of the arithmetic unit on condition that no packet is sent from a plurality of arithmetic unit of the source to a single arithmetic unit of the destination; and a performance evaluation unit for evaluating the performance based on the result of comparing the transmission time of each set measured by the load testing unit with the corresponding expected value of each set.

According to the above invention, the transmission time between each set of arithmetic units is (actually) measured as an expected value by the transmission time measuring unit before the load test. In the load test, upon transmission of packets at a time from a plurality of sets of the arithmetic units of the source to the corresponding arithmetic units of the destination included in the sets, respectively, a plurality of packets are received by the arithmetic units of the destination, respectively, through a network. In the process, the packets are sent at a time on condition that no packet is sent from a plurality of arithmetic units of the source to a single arithmetic unit of the destination, and therefore a heavy load is imposed on the parallel processor system. Also, the load testing unit measures the transmission time between each set of the arithmetic units. Thus, the performance is evaluated by comparing the transmission time in each set measured by the load testing unit with the corresponding expected value for the particular set.

As described above, a load test can be conducted always under a heavy load in view of the fact that a plurality of packets are sent at a time on condition that no packet is sent from a plurality of arithmetic units of the source to a single arithmetic unit of the destination. Further, the performance is evaluated with the actual measurement of the transmission time of each set as an expected value, and therefore a highly reliable test result is obtained.

According to another aspect of the present invention, the load testing apparatus comprises a transmission time measuring unit for measuring the transmission time between each set of arithmetic units as an expected value based on the result of combining a plurality of arithmetic units accurately into a plurality of sets each including an arithmetic unit of the source and an arithmetic unit of the destination; a load test unit for sending packets from a plurality of arithmetic units of the source to the corresponding arithmetic unit of the destination each constituting a set with the corresponding arithmetic unit of the source in such a transmission timing that the packets arrive at the network at the same time and measuring the transmission time between each set of arithmetic units based on the result of accurate combination of the arithmetic units on condition that no packet is sent from a plurality of arithmetic units of the source to a single arithmetic unit of the destination; and a performance evaluation unit for evaluating the performance based on the result of comparing the transmission time of each set measured by the load testing unit with the corresponding expected value of each set.

According to the above invention, the transmission time between each set of arithmetic units is (actually) measured as an expected value by the transmission time measuring unit before the load test. In the load test, upon transmission of packets from a plurality of sets of the arithmetic units of the source to the corresponding arithmetic unit of the destination included in the sets in such a transmission timing that the packets arrive at the network at the same time, a plurality of packets arrive at the network at the same time. In the process, the packets are sent at a time on condition that no packet is sent from a plurality of arithmetic units of the source to a single arithmetic unit of the destination and the packets arrive at the network at the same time, and therefore a maximum load is imposed on the parallel processor system. Also, the load testing unit measures the transmission time between each set of the arithmetic unit. Thus, the performance is evaluated by comparing the transmission time of each set measured by the load testing unit with the corresponding expected value for the particular set.

As described above, a load test can be conducted always under a maximum load in view of the fact that a plurality of packets are sent on condition that no packet is sent from a plurality of arithmetic units of the source to a single arithmetic unit of the destination and that the packets arrives at the network at the same time. Further, the performance is evaluated based on the transmission time under maximum load with the actual measurement of the transmission time of each set as an expected value, and therefore a more highly reliable test result is obtained.

According to still another aspect of the present invention, the load testing apparatus comprises a transmission time measuring unit for measuring the transmission time between each set of arithmetic units as an expected value based on the result of combining a plurality of arithmetic units accurately into a plurality of sets each including an arithmetic unit of the source and an arithmetic unit of the destination; a load test unit for sending packets from an arithmetic unit of a specified set of the source longer in transmission time than the other sets of the source to the corresponding arithmetic unit of the destination while at the same time transmitting packets from a plurality of arithmetic units of the other sets to the corresponding arithmetic unit of the corresponding sets of the destination, respectively, at a time, and measuring the transmission time between each set of arithmetic unit including the specified set of arithmetic unit based on the result of accurate combination of the arithmetic unit on condition that no packet is sent from a plurality of arithmetic units of the source to a single arithmetic unit of the destination; and a performance evaluation unit for evaluating the performance based on the result of comparing the transmission time of the specific set of arithmetic unit and the transmission time of each other set measured by the load testing unit with the corresponding expected value of each set.

According to the above invention, the transmission time between each set of arithmetic units is (actually) measured as an expected value by the transmission time measuring unit before the load test. In the load test, a packet is sent from a specified set of arithmetic units of the source to the corresponding arithmetic unit of the destination while at the same time transmitting packets from a plurality of other sets of the arithmetic units of the source to the corresponding arithmetic unit of the destination, and then a plurality of packets are received by the corresponding arithmetic unit, respectively, of the destination through a network. Also, the load testing unit measures the transmission time between each set of the arithmetic units including the specified set of arithmetic units. Thus, the performance is evaluated based by comparing the transmission time of the specified set and each other set measured by the load testing unit with the corresponding expected value for each set.

As described above, while a packet is sent by a specified set of arithmetic units, packets are transmitted and the performance is evaluated by other than a specified set of arithmetic units, and therefore it is possible to determine the effect that the transmission of a packet by a specified set of arithmetic unit has on the transmission of packets by the other sets of arithmetic units.

According to still another aspect of the present invention, the load testing method comprises a transmission time measuring step of measuring the transmission time between each set of arithmetic units as an expected value based on the result of combining a plurality of arithmetic units accurately into a plurality of sets each including an arithmetic unit of the source and an arithmetic unit of the destination; a load test step of sending packets from a plurality of arithmetic units of the source to the corresponding arithmetic unit of the destination each constituting a set with the corresponding arithmetic unit of the source and measuring the transmission time between each set of arithmetic units based on the result of accurate combination of the arithmetic units on condition that no packet is sent from a plurality of arithmetic units of the source to a single arithmetic unit of the destination; and a performance evaluation step of evaluating the performance based on the result of comparing the transmission time of each set measured at the load test step with the corresponding expected value of each set.

According to the above invention, the transmission time between each set of arithmetic units is (actually) measured as an expected value in the transmission time measuring step before the load test. In the load test, upon transmission of packets at a time from a plurality of sets of the arithmetic units of the source to the corresponding arithmetic unit of the destination included in the sets, respectively, a plurality of packets are received by the corresponding arithmetic unit of the destination through a network, respectively. In the process, the packets are sent at a time on condition that no packet is sent from a plurality of arithmetic units of the source to a single arithmetic unit of the destination, and therefore a heavy load is imposed on the parallel processor system. Further, the transmission time between each set of the arithmetic units is measured in the load test step. Thus, the performance is evaluated based by comparing the transmission time of each set measured in the load test step with the corresponding expected value for the particular set.

As described above, a load test can be conducted always under a heavy load in view of the fact that a plurality of packets are sent at a time on condition that no packet is sent from a plurality of arithmetic units of the source to a single arithmetic units of the destination. Further, the performance is evaluated with the actual measurement of the transmission time of each set as an expected value, and therefore a highly reliable test result is obtained.

According to still another aspect of the present invention, there is provided a computer readable recording medium for recording a load test program, the load test program being adapted to enable the computer to execute the operation comprising a transmission time measuring step of measuring the transmission time between each set of arithmetic units as an expected value based on the result of combining a plurality of arithmetic units accurately into a plurality of sets each including an arithmetic unit of the source and an arithmetic unit of the destination; a load test step a sending packets from a plurality of arithmetic units of the source to the corresponding arithmetic unit of the destination each constituting a set with the corresponding arithmetic unit of the source in such a timing that the packets arrive the network at the same time and measuring the transmission time between each set of arithmetic units based on the result of accurate combination of the arithmetic units on condition that no packet is sent from a plurality of arithmetic units of the source to a single arithmetic unit of the destination; and a performance evaluation step a evaluating the performance by comparing the transmission time of each set measured in the load test step with the corresponding expected value of the particular set.

According to the above invention, the transmission time between each set of arithmetic units is (actually) measured as an expected value in the transmission time measuring step before the load test. In the load test, packets are sent from a plurality of sets of the arithmetic units of the source to the corresponding arithmetic unit of the destination included in the sets, respectively, in such a timing that the packets arrive at the network at the same time, and therefore a plurality of packets arrive at the network at the same time. In the process, a maximum load is imposed on the parallel processor system, in view of the fact that the packets are sent and arrive at the network at the same time on condition that no packet is sent from a plurality of arithmetic unit of the source to a single arithmetic unit of the destination. Further, the transmission time between each set of the arithmetic units is measured in the load test step. Thus, the performance is evaluated in the performance evaluation step by comparing the transmission time of each set measured in the load test step with the corresponding expected value for the particular set.

As described above, a load test can be conducted always under a maximum load in view of the fact that a plurality of packets are sent in such a timing as to arrive at the network at the same time on condition that no packet is sent from a plurality of arithmetic units of the source to a single arithmetic unit of the destination. Further, the performance is evaluated with the actual measurement of the transmission time of each set as an expected value based on the transmission time under a maximum load, and therefore a more highly reliable test result is obtained.

According to still another aspect of the present invention, there is provided a computer readable recording medium for recording a load test program, the load test program being adapted to enable the computer to execute the operation comprising a transmission time measuring step of measuring the transmission time between each set of arithmetic units as an expected value based on the result of combining a plurality of arithmetic units accurately into a plurality of sets each including an arithmetic unit of the source and an arithmetic unit of the destination; a load test step of sending packets from a specified set of arithmetic units of the source longer in transmission time than the other sets to the corresponding arithmetic unit of the destination of the same set while at the same time sending packets simultaneously from the other sets of a plurality of arithmetic units of the source to the corresponding arithmetic unit of the destination of the respective sets and measuring the transmission time between each set of arithmetic units including the transmission time between the specific set of arithmetic units based on the result of accurate combination of the arithmetic unit on condition that no packet is sent from a plurality of arithmetic units of the source to a single arithmetic unit of the destination; and a performance evaluation step of evaluating the performance based on the result of comparing the transmission time of the specific set of arithmetic units and the transmission time of each other set measured in the load test step with the corresponding expected value of the specific set and each other set.

According to the above invention, the transmission time between each set of arithmetic units is (actually) measured as an expected value in the transmission time measuring step before the load test. In the load test, packets are sent from a specified set of arithmetic units of the source while a plurality of other sets of the arithmetic units of the source send packets at a time to the corresponding arithmetic unit of the destination, respectively, and a plurality of packets are received by the corresponding arithmetic unit of the other sets of the destination through the network. Further; the transmission time between each set of the arithmetic units including the specific set of arithmetic units is measured in the load test step. Thus, the performance is evaluated in the performance evaluation step by comparing the transmission time of each set including the specified set measured in the load test step with the corresponding expected value for the particular set.

As described above, the performance is evaluated by sending a packet from a specified set of arithmetic units while at the same time sending packets simultaneously in the other sets of arithmetic units, and therefore it is possible to determine the effect that the transmission of a packet from the specific set of arithmetic units has on the packet transmission by the other sets of arithmetic units.

According to still another aspect of the present invention, the fault diagnosis apparatus comprises a set determining unit for determining a plurality of sets of an arithmetic unit of the source and an arithmetic unit of the destination accurately; a packet production unit for producing a packet corresponding to each set with an identifier attached thereto for identifying the particular set; a storage unit for storing the test information including an identifier, the information on the arithmetic unit of the source of the packet with the identifier attached thereto and the information on the arithmetic unit of the destination of the packet with the identifier attached thereto, a transmission control unit for transmitting the packet with the identifier attached thereto from a plurality of arithmetic units of the source to the corresponding arithmetic unit of the destination, an information collecting unit for collecting the information on the receiving of the packet with the identifier attached thereto by the corresponding arithmetic unit of the destination, and a fault diagnosis unit for diagnosing a fault by referring to the test information using, as a key, the identifier in the information collected by the information collecting unit.

According to the above invention, in the absence of a defective point, packets with an identifier attached thereto are transmitted from a plurality of arithmetic units of the source to the corresponding arithmetic unit of the destination in the same set. In this case, the packets with an identifier attached thereto are received by the corresponding arithmetic unit of the destination through a network, and therefore the information collecting unit acquires the collection result to the effect that all the packets with an identifier attached thereto have been normally received. As a result, the fault diagnosis unit can determine that there is no defective point. In the presence of a defective point, on the other hand, the arithmetic unit of the source include those which have normally received the packets with an identifier attached thereto and those which have not such packets. In this case, the information collecting unit collects the information on the receiving condition (presence or absence of receipt) of each arithmetic unit.

The fault diagnosis unit refers to the test information using, as a key, the identifier of the normally received packets and the identifier of the unreceived packets, grasps the relation between the arithmetic units of the source and the arithmetic units of the destination taking the aforementioned receiving condition into account and makes a fault diagnosis by specifying a defective point. In the case where the result of referring to the test result shows that the packets with an identifier attached thereto which should be transmitted from a given arithmetic unit of the source are not received by any of the arithmetic unit of the destination, for example, the particular single arithmetic unit of the source is identified as a defective point. Also, in the case where the result of referring to the test result shows that the packets with an identifier attached thereto sent from all the arithmetic units of the source are not received by a given arithmetic, unit of the destination, the particular arithmetic unit of the destination is identified as a defective point.

As described above, packets with an identifier attached thereto for specifying a set of a plurality of arithmetic units accurately are sent, and the relation between the arithmetic units of the source and the arithmetic units of the destination is grasped taking the receiving condition of the arithmetic unit of the destination into account based on the test information, and therefore a defective point can be identified with rapidity.

According to still another aspect of the present invention, there is provided a computer readable recording medium for recording a fault diagnosis program, the fault diagnosis program being adapted to enable the computer to execute the operation comprising a set determining step of determining a plurality of sets of an arithmetic unit of the source and an arithmetic unit of the destination accurately; a packet production step of producing a packet corresponding to each set with an identifier attached thereto for identifying the particular set; a storage step of storing the test information including the identifier, the information on the arithmetic unit of the source of the packet with the identifier attached thereto and the information on the arithmetic unit of the destination of the packet with the identifier attached thereto; a transmission control step of transmitting the packet with the identifier attached thereto from a plurality of arithmetic unit of the source at a time to the corresponding arithmetic unit of the destination; a information collecting step of collecting the information on the receiving of a packet with an identifier attached thereto by the corresponding arithmetic unit of the destination; and a fault diagnosis step of diagnosing a fault by referring to the test information using, as a key, the identifier in the result of information collected by the information collecting step.

According to the above invention, in the absence of a defective point, packets with an identifier attached thereto are transmitted from a plurality of arithmetic units of the source to the corresponding arithmetic unit of the destination in the same set. In this case, the packets with an identifier attached thereto are received by the corresponding arithmetic unit of the destination through a network, and therefore the information collecting step acquires the collection result to the effect that all the packets with an identifier attached thereto have been normally received. As a result, the fault diagnosis step can determine that there is no defective point. In the presence of a defective point, on the other hand, the arithmetic unit of the destination include those which have normally received the packets with an identifier attached thereto and those which have not received such packets. In this case, the information collecting step collects the information on the receiving condition (presence or absence of receipt) of the corresponding arithmetic unit.

The fault diagnosis step grasps the relation between the arithmetic unit of the source and the arithmetic unit of the destination taking the aforementioned receiving condition into account by referring to the test information using, as a key, the identifier attached to the normally received packets and the identifier attached to the unreceived packets, and makes a fault diagnosis by specifying a defective point. In the case where it is found, by referring to the test result, that the packets with an identifier attached thereto which should be transmitted from a given arithmetic unit of the source are not received by any of the arithmetic unit of the destination, for example, the particular arithmetic unit of the source is identified as a defective point. Also, in the case where the result of referring to the test information shows that the packets with an identifier attached thereto sent from all the arithmetic units of the source are not received by a given arithmetic unit of the destination, the particular arithmetic unit of the destination is identified as a defective point.

As described above, packets are sent with an identifier attached thereto for specifying a set of a plurality of arithmetic unit accurately, and the relation between the arithmetic unit of the source and the arithmetic unit of the destination is grasped taking the receiving condition of the arithmetic unit of the destination into account based on the test information, and therefore a defective point can be identified with rapidity.

Other objects and features of this invention will become apparent from the following description with reference to the accompanying drawings.

BRIEF DESCRIPTION OF THE DRAWINGS

FIG. 2 is a block diagram showing a configuration of a register group 11 shown in FIG. 1;

FIG. 3 is a block diagram showing a crossbar switch group 12 shown in FIG. 1;

FIG. 4 is a block diagram showing the relation between a master program MP and slave programs $SP_0$ to $SP_3$ according to the first embodiment;

FIG. 5A and FIG. 5B are block diagrams for explaining a method of measuring the transmission time in the two-way paths between processor elements;

FIG. 6 is a flowchart for explaining the process of measuring the transmission time in the two-way paths between processor elements;

FIG. 9A and FIG. 9B are block diagrams for explaining the operation according to the first embodiment;

FIG. 10 is a diagram showing a combination table according to the first embodiment;

FIG. 25 is a diagram showing an example of test information according to the fourth embodiment of the present invention;

FIG. 28 is a diagram showing the test result according to the fourth embodiment;

FIG. 31 is a block diagram showing a configuration according to a modification of the first to fourth embodiment of the present invention; and FIG. 32A and FIG. 32B are block diagrams showing the conventional configuration of the processor elements $PE_0$ to $PE_4$ and the crossbar network unit 1.

DESCRIPTION OF THE PREFERRED EMBODIMENTS

A load testing apparatus, a computer readable recording medium for recording a load test program, a fault diagnosis apparatus and a computer readable recording medium for recording a fault diagnosis program according to the present invention will be explained in detail below with reference to first to fourth embodiments shown in the accompanying drawings.

Figure 1:
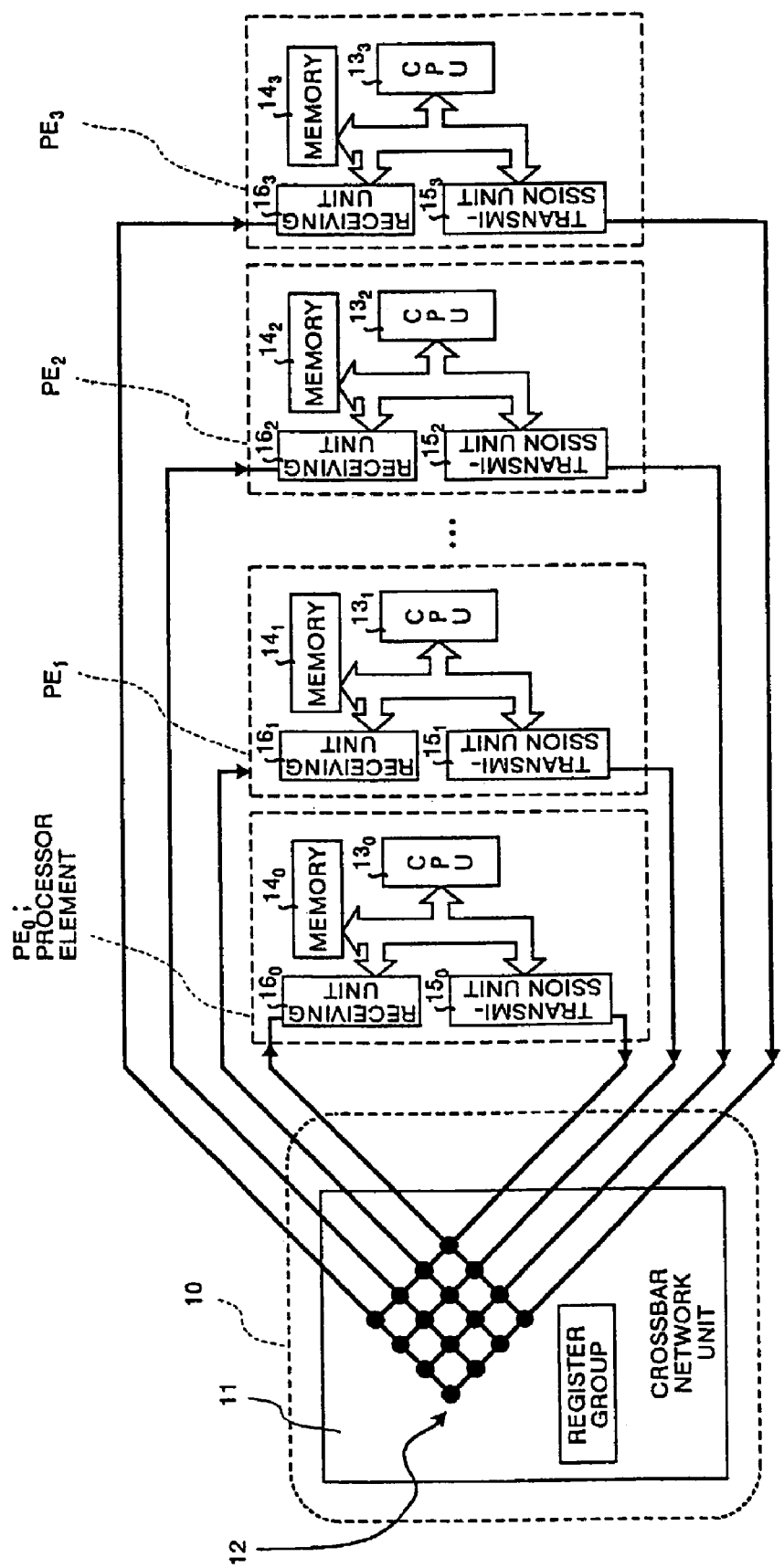
FIG. 1 is a block diagram showing a configuration according to a first embodiment of the present invention.

FIG. 1 is a block diagram showing a configuration according to a first embodiment of the present invention. A crossbar network unit 10 and processor elements $PE_0$ to $PE_3$ making up a parallel processor system are shown in FIG. 1. A load testing apparatus according to the first embodiment described below is for conducting a load test on this parallel processor system. The parallel processor system is a kind of supercomputer for realizing a super high-speed arithmetic operation by causing the processor elements $PE_0$ to $PE_3$ to execute the parallel processing.

In FIG. 1, the processor elements $PE_0$ to $PE_3$ are arithmetic elements for executing the parallel arithmetic operations in accordance with a parallel algorithm and each include a CPU, a memory, etc. Specifically, the processor element $PE_0$ includes a CPU $13_0$ for controlling the various parts and executing the arithmetic operation, a memory $14_0$ for storing a load test program, an arithmetic program, arithmetic data, etc., a transmission unit $15_0$ for transmitting the arithmetic data, etc. as packets under the control of the CPU $13_0$, and a receiving unit 130 for receiving the packets. The load test program is for conducting a load test on the parallel processor system and will be described in detail later.

Other processor elements $PE_1$ to $PE_3$ are also configured a similar way to the processor element $PE_0$. Specifically, the processor element $PE_1$ includes a CPU $13_1$ for controlling various parts in the load test, a memory $14_1$ for storing a load test program, etc., a transmission unit $15_1$ for transmitting packets, and a receiving unit $16_1$ for receiving the packets. In similar fashion, the processor element $PE_2$ includes a CPU $13_2$, a memory $14_2$, transmission unit $15_2$ and a receiving unit $16_2$, and the processor element $PE_3$ includes a CPU $13_3$, a memory $14_3$, a transmission unit $15_3$ and a receiving unit $16_3$.

The crossbar network unit 10 is a device for interconnecting the processor elements $PE_0$ to $PE_3$, and includes a register group 11 used for the synchronization processing described later and a group of crossbar switches 12 having N×N (4×4 in the drawing) switches. In the crossbar network unit 10, the incoming line side (transmission path side) is connected to the transmission units $15_0$ to $15_3$ of the processor elements $PE_0$ to $PE_3$, while the outgoing line side thereof (receiving path side) is connected to the receiving units $16_0$ to $16_3$ of the processor elements $PE_1$ to $PE_3$. In this way, the crossbar network unit 10 has N×N (4×4 in the drawing) switches for connecting an arbitrary pair of the input line (transmission unit) and the output line (receiving unit).

The register group 11 includes registers $11_{PE0}$ to $11_{PE3}$ shown in FIG. 2, and are used for assuring synchronization of the processor elements $PE_0$ to $PE_3$. These registers $11_{PE0}$ to $11_{PE3}$ correspond to the processor elements $PE_0$ to $PE_3$, respectively. The register $11_{PE0}$ stores "1" or "0" data in response to the access from the processor element $PE_0$. The processor element $PE_0$ can store "1" or "0" data only in the register $11_{PE0}$ but not in the other registers $11_{PE1}$ to $11_{PE3}$. In similar fashion, the registers $11_{PE1}$ to $11_{PE3}$ store "1" or "0" data in response to the access from the processor elements $PE_1$ to $PE_3$, respectively.

The register group 11 (registers $11_{PE0}$ to $11_{PE3}$) has the data stored therein adapted to be accessed by all the processor elements $PE_0$ to $PE_3$ in common. Specifically, the processor element $PE_0$ can access the data stored in all the registers $11_{PE0}$ to $11_{PE3}$. The other processor elements $PE_1$ to $PE_3$ can similarly access the data stored in all the registers $11_{PE0}$ to $11_{PE3}$. In the synchronization processing, the processor elements $PE_0$ to $PE_3$ write "1" data (or "0" data) individually in the registers $11_{PE0}$ to $11_{PE3}$. After that, the processor elements $PE_0$ to $PE_3$ poll the register group 11 (registers $11_{PE0}$ to $11_{PE3}$) at predetermined time intervals, and thus access the data held therein. The processor elements $PE_0$ to $PE_3$ then recognizes that a synchronization is secured when all the data held in the register group 11 assumes "1" (or "0").

The crossbar switch group 12, as shown in FIG. 3, has a total of 16 crossbar switches including $S_{00}$ to $S_{33}$ in the 4×4 arrangement, and interconnects an arbitrary set of the processor elements $PE_0$ to $PE_3$. The digit on the first of the subscript attached to each of the crossbar switches $S_{00}$ to $S_{33}$ corresponds to the subscript of the processor elements $PE_0$ to $PE_3$ at the transmitting end. In similar fashion, the digit on the second order of the subscript corresponds to the subscript of the processor elements $PE_0$ to $PE_3$ at the receiving end.

The crossbar switch $S_{01}$, for example, is a switch for interconnecting the processor element $PE_1$ at the transmitting end and the processor element $PE_0$ at the receiving end. In similar manner, the crossbar switch $S_{23}$ is a switch for interconnecting the processor element $PE_3$ at the transmitting end and the processor element $PE_2$ at the receiving end. The crossbar switches $S_{00}$, $S_{11}$, $S_{22}$ and $S_{33}$ interconnect the transmission unit and the receiving unit of the same processor elements $PE_0$, $PE_1$, $PE_2$, $PE_3$ at the receiving end and the transmitting end. The crossbar switch $S_{11}$, for example, is a switch for interconnecting the transmission unit $15_1$ and the receiving unit $16_1$ of the processor elements $PE_1$.

Now, the load test program described above will be explained with reference to FIG. 4. The load test program referred to herein indicates the master program MP and the slave programs $SP_0$ to $SP_3$ shown in FIG. 4. The master program MP and the slave programs $SP_0$ to $SP_3$ are in the master-slave relation to each other. The master program MP is for controlling the execution of the slave programs $SP_0$ to $SP_3$ and stored in the memory $14_0$ (see FIG. 1) of the processor element $PE_0$. This master program MP is executed by the CPU $13_0$ (see FIG. 1). The master program MP can be stored in the memory of any one of the processor elements $PE_0$ to $PE_3$. The slave programs $SP_0$ to $SP_3$, on the other hand, are stored in the memories $14_0$ to $14_3$ of the processor elements $PE_0$ to $PE_3$, respectively, and used for conducting a load test under the control of the master program MP. These slave programs $SP_0$ to $SP_3$ are executed by the CPUs $13_0$ to $13_3$, respectively.

Measurement of Transmission Time:

Now, the operation of the first embodiment will be explained. According to the first embodiment, the process for measuring the transmission time required for a load test is executed before the load test, which is conducted based on the transmission time thus measured. First, the measurement process will be explained with reference to FIGS. 5 to 8. In the measurement process, as shown in FIG. 5A and FIG. 5B, the processor element $PE_0$, i.e. one of the processor elements $PE_0$ to $PE_3$ is selected as a reference processor element, and the transmission time of packets in the two-way path between the reference processor element and other processor elements is measured. Further, in the measurement process, the packet transmission to and from a reference processor element is also measured. The transmission time herein is defined as the time required from the time when a packet is transmitted from a reference processor element of the source to the time when the packet transmitted from another processor element (reference processor element) is received by the reference processor element of the source. In other words, the transmission time herein indicates the one in a two-way path.

The two-way path is a return-trip route to and from another processor element. For example, it is a route leading from a reference processor element to the crossbar network unit 10 to another processor element to the crossbar network unit 10 back to the reference processor element. Also, the two-way path to and from a reference processor element is a return-trip route from the crossbar network unit 10. For example, it is a route leading from a reference processor element to the crossbar network unit 10 back to the reference processor element. FIG. 5A shows the case in which the reference processor element is the processor element $PE_0$, and FIG. 5B the case in which the reference processor element is constituted of the processor element $PE_1$. In similar fashion, the reference processor element is selected sequentially. For example, the processor element $PE_3$ is selected replacing the processor element $PE_2$ as a reference processor to thereby carry out the measurement process.

Now, the process of measuring the transmission time in the two-way path between processor elements will be explained with reference to the flowcharts of FIGS. 6 to 8. In FIG. 6, steps SA1 to SA6 are executed by the processor element $PE_0$ (master program MP) shown in FIG. 4. Steps SA1, SA7 to SA16 and SA6, on the other hand, are executed by a processor element (slave program) selected as a reference processor element. Further, steps SA1, SA17 to SA20 and SA6 are executed by processor elements (slave programs) other than the reference processor element.

Actually, the master program MP and the slave programs $SP_0$ to $SP_3$ are executed by the CPUs $13_0$ to $13_3$, respectively (see FIG. 1). In the description that follows, it is assumed by way of explanation that the master program MP and the slave programs $SP_0$ to $SP_3$ are executed by the processor elements $PE_0$ to $PE_3$, respectively.

Figure 7:
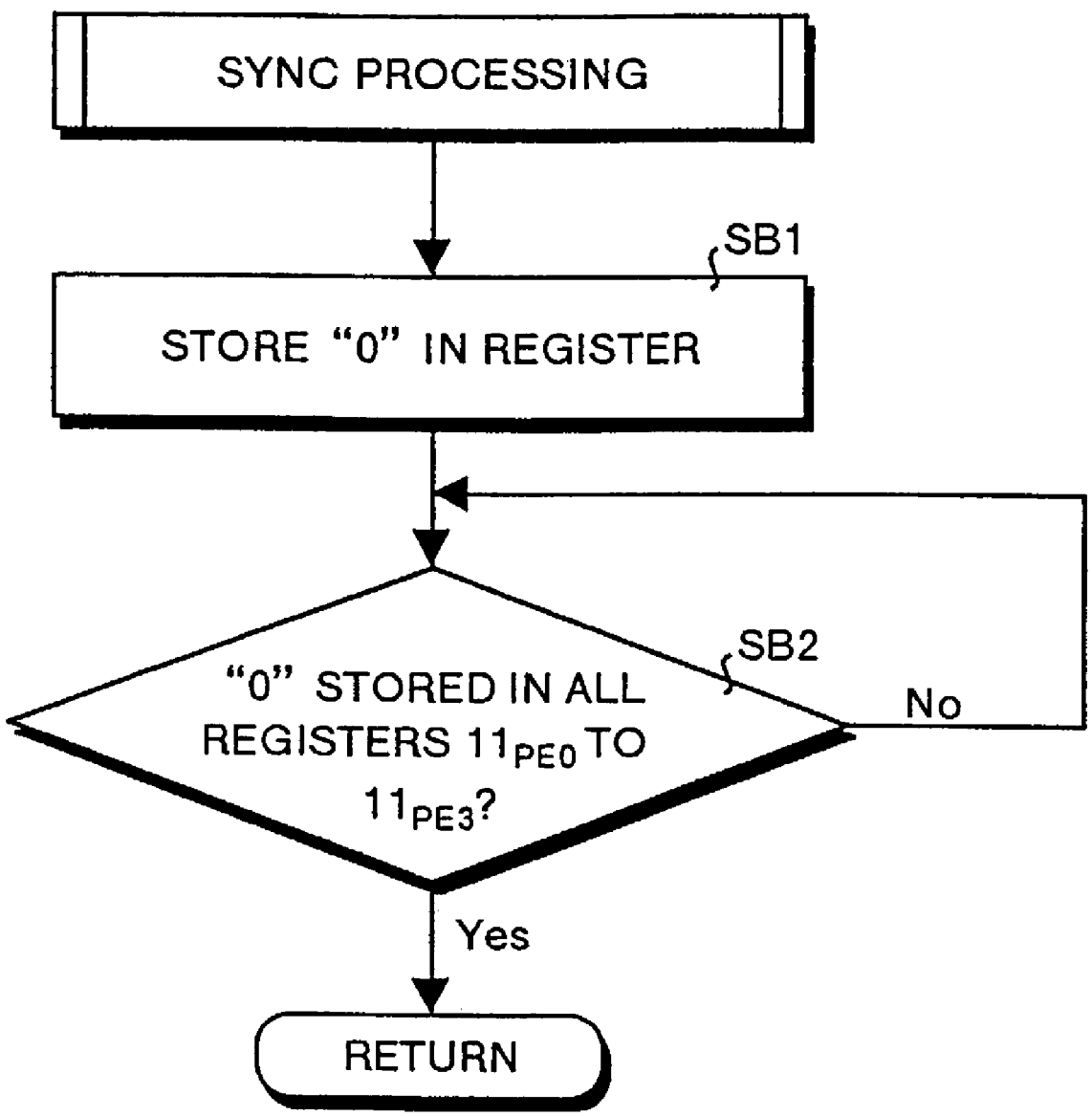
FIG. 7 is a flowchart for explaining the synchronization processing shown in FIG. 6.
Figure 8:
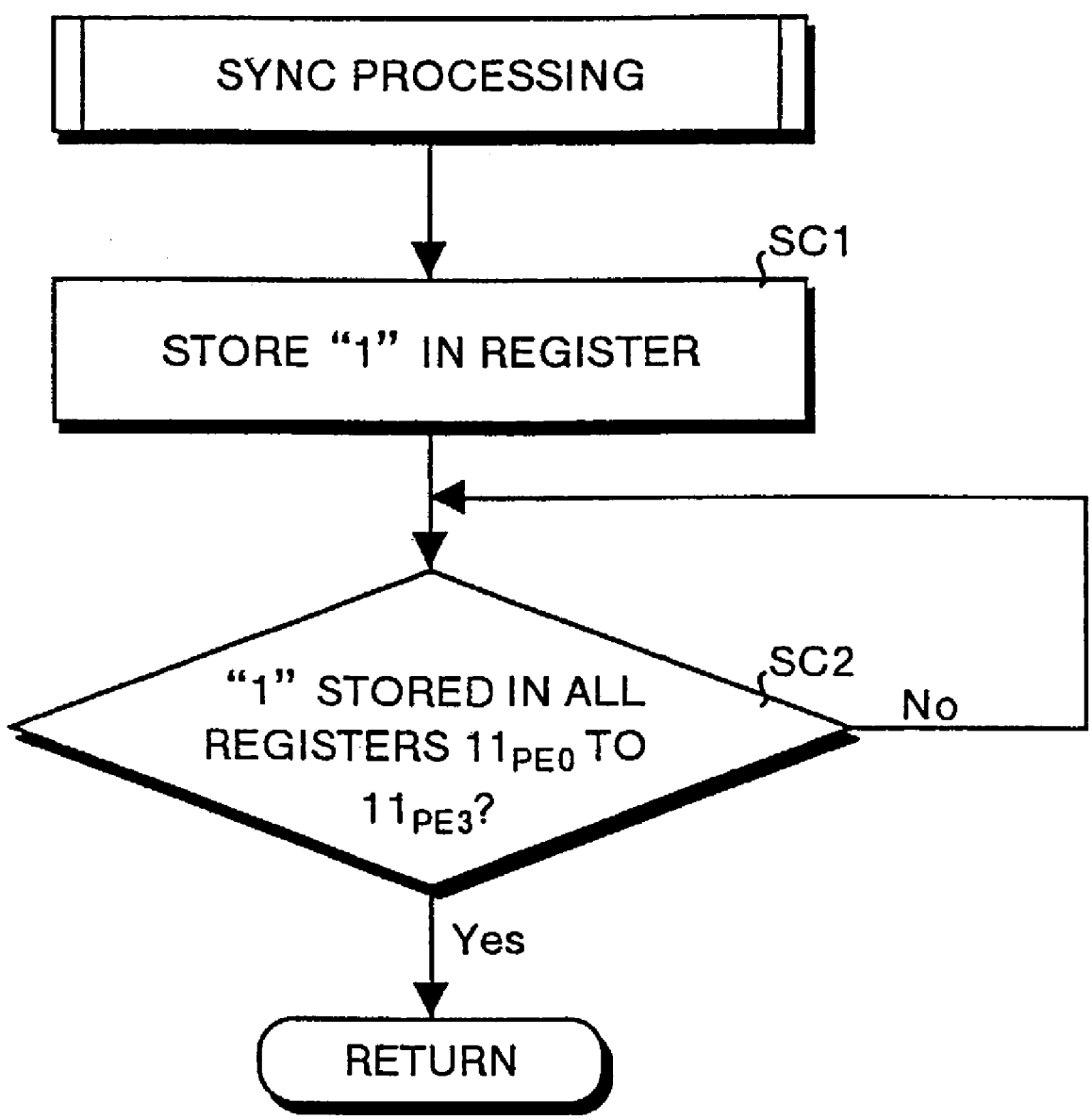
FIG. 8 is a flowchart for explaining the synchronization processing shown in FIG. 6.

Upon activation of the master program MP by the processor element $PE_0$ shown in FIG. 4, the processor element $PE_0$ (master program MP) instructs, in step SA1 shown in FIG. 6, the processor elements $PE_0$ (slave program $SP_0$) to $PE_3$ (slave program $SP_3$) to execute the synchronization process (see FIG. 7). As a result, in step SB1 shown in FIG. 7, the processor elements $PE_0$ to $PE_3$ access the crossbar network unit 10 shown in FIG. 2, so that "0" data is stored in the registers $11_{PE0}$ to $11_{PE3}$, after which the process proceeds to step SB2. The timing at which "0" data is stored is varied among the registers $11_{PE0}$ to $11_{PE3}$ due to the difference in access time.

In step SB2, the processor elements $PE_0$ to $PE_3$ poll the register group 11 at predetermined time intervals to determine whether the "0" data is stored in all the registers $11_{PE0}$ to $11_{PE3}$, and the determination step is repeated until the answer becomes YES. Once "0" data are stored in all the registers $11_{PE0}$ to $11_{PE3}$, the processor elements $PE_0$ to $PE_3$ assume that the answer in step SB2 is YES, and the process is returned to the main routine shown in FIG. 6. In other words, the processor elements $PE_0$ to $PE_3$ are synchronized at this time point.

In step SA2 shown in FIG. 6, the processor element $PE_0$ (master program MP) selects one of the processor elements $PE_0$ to $PE_3$ as a reference processor element. Also, the processor element $PE_0$ (master program MP) instructs the reference processor element to start the measurement work, while at the same time instructing the other processor elements to start the reply process. The reply process is defined as a process for transmitting a return packet to a reference processor element after receiving the packet transmitted from the reference processor element.

In this case, in step SA2, the processor element $PE_0$ (master program MP) is assumed to have selected the processor element $PE_0$ (slave program $SP_0$) shown in FIG. 5A as a reference processor element. In step SA2, therefore, the processor element $PE_0$ (master program MP) instructs the processor element $PE_0$ (slave program $SP_0$) to start the measurement work and the other processor elements $PE_1$ to $PE_3$ (slave programs $SP_1$ to $SP_3$) to start the reply process, after which the process proceeds to step SA3. In step SA3, the processor element $PE_0$ (master program MP) determines whether a notification of measurement end has been received from the reference processor element (in this case, the processor element $PE_0$ (slave program $SP_0$)). Since no notification of measurement end is received, however, the same process is repeated by the processor element $PE_0$ (master program MP) in step SA3.

In response to an instruction to start the measurement work in step SA2, the processor element $PE_0$ (slave program $SP_0$) determines the answer as YES in step SA7, and the process proceeds to step SA8. Concurrently with this process, upon instruction to start the reply process in step SA2, the other processor elements $PE_1$ to $PE_3$ determines the answer as YES in step SA17, and the process proceeds to step SA18. In step SA18, the other processor elements $PE_1$ to $PE_3$ determines whether a packet has been received from the reference processor element (processor element $PE_0$). Since no packet has been received, the result of determination is NO, and the process of determination is repeated.

In step SA8, the processor element $PE_0$ records the transmission time of the packet to be transmitted to the processor $PE_3$, for example, among the processor elements $PE_1$ to $PE_3$ shown in FIG. 5A, after which the process proceeds to step SA9. In step SA9, the processor element $PE_0$ transmits the packet addressed to the processor element $PE_3$ from the transmission unit $15_0$ (see FIG. 1), after which the process proceeds to step SA10. In step SA10, the processor element $PE_0$ determines whether a reply packet is received from the processor element $PE_3$ or not. Since no such packet is not received, the determination is NO, and the process is repeated. The packet addressed to the processor element $PE_3$ is transmitted to the processor element $PE_3$ through the crossbar network unit 10 by turning on the crossbar switch $S_{30}$ shown in FIG. 3.

Upon receipt of the packet by the receiving unit $16_3$ (see FIG. 1) of the processor element $PE_3$, the processor element $PE_3$ determines the answer in step SA18 as YES and the process proceeds to step SA19. In step SA19, the processor element $PE_3$ transmits the reply packet from the transmission unit $15_3$ (see FIG. 1) to the processor element $PE_0$, after which the process proceeds to step SA20. In step SA20, the processor element $PE_3$ determines whether an instruction to end the measurement is received or not from the processor unit $PE_0$ (master program MP). Since no such instruction is received, the determination is NO, followed by proceeding to step SA17.

The packet addressed to the processor element $PE_0$ is transmitted to the processor element $PE_0$ through the crossbar network unit 10 by turning on the crossbar switch $S_{03}$ shown in FIG. 3. Upon receipt of the packet by the receiving unit $16_0$ (see FIG. 1) of the processor element $PE_0$, the processor element $PE_0$ determines the answer in step SA10 as YES, and the process proceeds to step SA11. In step SA11, the processor element $PE_0$, after recording the receiving time of the reply packet, the process proceeds to step SA12. In step SA12, it is determined whether the number of times the packets addressed to the processor element $PE_3$ has been transmitted has reached a specified number $n_1$ (5, for example).

In this case, the number of times transmitted is one, and therefore the processor element $PE_0$ gives an answer NO, followed by returning to step SA8. After that, until the answer in step SA12 becomes YES, the process for transmitting packets to the same processor element $PE_3$, recording the transmission time and recording the receiving time is performed by the processor element $PE_0$ in steps SA8 to SA11. In this case, the processor element $PE_0$ performs the process of transmitting packets while changing the data length thereof each time of transmission. Transmitting packets while changing the data length in this way is in order to reduce the error of the transmission time (measurement result) described later.

When the number of times packets are transmitted to the process element $PE_3$ reaches a specified number $n_1$ (5), the processor element $PE_0$ gives an answer YES in step SA12, and the process proceeds to step SA13. By this time point, the data on the transmission time and the receiving time for a total of five sessions of transmission between the processor element $PE_0$ and the processor element $PE_3$ is recorded. In step SA13, the processor element $PE_0$ determines whether packets have been transmitted to all the processor elements ($PE_0$ to $PE_3$) or not. Packets are transmitted only to the processor element $PE_3$, and therefore, the processor element $PE_0$ selects the processor element $PE_2$ shown in FIG. 5A as the candidate for the next destination, and giving an answer NO in step SA13, followed by returning to step SA8.

In step SA8, the processor element $PE_0$ records the transmission time of packets to be transmitted to the next processor element $PE_2$ shown in FIG. 5A, after which the process proceeds to step SA9. In step SA9, the processor element $PE_0$ transmits the packet to the processor element $PE_2$ from the transmission unit $15_0$ (see FIG. 1), after which the process proceeds to step SA10. In step SA10, the processor element $PE_0$ determines whether the reply packet from the processor element $PE_2$ has been received or not. Since no such packet has been received, the determination is NO, and the process is repeated. The packets addressed to the processor element $PE_2$ are sent to the processor element $PE_2$ through the crossbar network unit 10 as the result of turning on the crossbar switch $S_{20}$ shown in FIG. 3.

Upon receipt of a packet by the receiving unit $16_2$ (see FIG. 1) of the processor element $PE_2$, the processor element $PE_2$ turns YES the determination in step SA18, and the process proceeds to step SA19. In step SA19, the processor element $PE_2$ transmits the reply packet to the processor element $PE_0$ from the transmission unit $15_2$ (see FIG. 1), after which the process proceeds to step SA20. In step SA20, the processor element $PE_2$ determines whether or not an instruction to end the measurement is given from the processor element $PE_0$ (master program MP). Since such an instruction is not given, the determination is NO, and the process returns to step SA17.

After that, in steps SA8 to SA12 and SA17 to SA19, as in the case of the processor element $PE_3$ described above, packets are transmitted and received between the processor element $PE_0$ and the processor element $PE_2$. When the number of times packets are transmitted to the processor element $PE_2$ reaches the specified number $n_1$, the processor element $PE_0$ turns the answer in step SA12 to YES, and the process proceeds to step SA13. By this time point, the data on the transmission time and the receiving time is recorded for a total of five sessions between the processor element $PE_0$ and the processor element $PE_2$. In step SA13, the processor element $PE_0$ selects the processor element $PE_1$ shown in FIG. 5A as the next candidate for the destination, after which the determination is turned NO, and the process returns to step SA8.

After that, in steps SA8 to SA12, packets are transmitted and received between the processor element $PE_0$ and the processor element $PE_1$. When the number of times the packets are sent to the processor element $PE_1$ reaches the specified number $n_1$, the processor element $PE_0$ turns YES the determination in step SA12, and proceeds to step SA13. In step SA13, the processor element $PE_0$, after selecting the processor element $PE_0$, i.e. its own self, as shown in FIG. 5A as a candidate for the last destination, turns NO the determination, followed by returning to step SA8.

In step SA8, the processor element $PE_0$ records the transmission time of packets to be transmitted to itself shown in FIG. 5A, after which the process proceeds to step SA9. In step SA9, the processor element $PE_0$ transmits the packets to itself from the transmission unit $15_0$ (see FIG. 1), and proceeds to step SA10. In step SA10, the processor element $PE_0$ determines whether the packet to itself has been received or not. Since no such packets have been received, the determination is NO, and the process is repeated. The packet addressed to the processor element $PE_0$ is transmitted back to the processor element $PE_0$ from the crossbar network unit 10 by turning on the crossbar switch $S_{00}$ shown in FIG. 3.

Upon receipt of the packets described above by the receiving unit $16_0$ (see FIG. 1) of the processor element $PE_0$, the processor element $PE_0$ turns the determination to YES in step SA10, and proceeds to step SA11. In step SA11, the processor element $PE_0$, after recording the receiving time of the packet, proceeds to step SA12. In step SA12, the processor element $PE_0$ turns the determination to NO, and returns to step SA8. After that, until the determination in step SA12 turns YES, the processor element $PE_0$ performs the process of transmitting packets to itself, recording the transmission time and the receiving time in steps SA8 to SA11.

The processor element $PE_0$ (reference processor element), after completely transmitting the packets to all the processor elements $PE_0$ to $PE_3$, turns YES the determination in step SA13, and proceeds to step SA14. In step SA14, the processor element $PE_0$ totalizes the packet transmission time in the two-way paths in the following 1a to 4a, produces the expected value data and proceeds to step SA15.

(1a) Two-way path between processor element $PE_0$ and processor element $PE_3$ (2a) Two-way path between processor element $PE_0$ and processor element $PE_2$ (3a) Two-way path between processor element $PE_0$ and processor element $PE_1$ (4a) Two-way path between processor element $PE_0$ and processor element $PE_0$ Specifically, the processor element $PE_0$ determines the transmission time in the two-way path of 1a as the difference between the packet receiving time (step SA11) from the processor element $PE_3$ and the packet transmission time (step SA8) to the processor element $PE_3$. In the process, the transmission time equivalent to the specified number $n_1$ (step SA12) is determined for the two-way path of 1a. Then, the processor element $PE_0$, based on the transmission time for the specified number $n_1$ described above, produces the expected value data for the two-way path of 1a. This expected value data is the transmission time which is considered to be actually required for packet transmission in the two-way path of 1a, and is the data used for the load test described later. As an example, the expected value data described above is an average transmission time for the specified number $n_1$. Also, the processor element $PE_0$ determines the transmission time and the expected value data for the two-way paths of 2a to 4a by the same technique as for the two-way path 1a described above. For each of the two-way paths 1a to 4a, it is assumed that the expected value data time(1) to time(4) as shown in FIG. 5A is obtained.

In step SA15, the processor element $PE_0$ (slave program $SP_0$) notifies the processor element $PE_0$ (master program MP) of the expected value data time(1) to time(4) and the end of measurement, and then proceeds to step SA16. In step SA16, the processor element $PE_0$ (slave program $SP_0$) determines whether an instruction is given by the processor element $PE_0$ (master program MP) to end the measurement or not. Since the determination is NO, the process returns to step SA7.

On the other hand, upon receipt of an instruction from the processor $PE_0$ (slave program $SP_0$) to end the measurement with the expected value data time(1) to time(4), the processor element $PE_0$ (master program MP) stores the expected value data time(1) to time(4) in the memory $14_0$ (see FIG. 1), and then turning YES the determination in step SA3, proceeds to step SA4. In step SA4, the processor element $PE_0$ (master program MP) determines whether the measurement for all the processor elements (reference processor elements) has been completed or not. In the case under consideration, it is determined whether the measurement has been carried out with each of the processor elements $PE_0$ to $PE_3$ as a reference processor element or not. Since only the measurement is effected with the processor element $PE_0$ (slave program $SP_0$) as a reference processor element, the processor element $PE_0$ (master program MP) determines NO in step SA4, and returns to step SA2.

In step SA2, the processor element $PE_0$ (master program MP) selects the processor element $PE_1$ shown in FIG. 5B as the next reference processor element from among the processor elements $PE_0$ to $PE_3$. Then, the processor element $PE_0$, in the same manner as the operation described above, instructs the processor element $PE_1$ (reference processor element) to start the measurement, while at the same time giving an instruction to the other processor elements to start the reply process. As a result, the as in the case of the processor element $PE_0$ (reference processor element), the measurement is conducted with the processor element $PE_1$ as a reference processor element. Specifically, in this measurement session, as shown in FIG. 5B, the expected value data time(5) to time(8) for the following two-way paths 1b to 4b are determined.

(1b) Two-way path between processor element $PE_1$ and processor element $PE_0$ (2b) Two-way path between processor element $PE_1$ and processor element $PE_3$ (3b) Two-way path between processor element $PE_1$ and processor element $PE_2$ (4b) Two-way path between processor element $PE_1$ and processor element $PE_1$ Upon complete measurement for the processor element $PE_1$ (reference processor element) and upon receipt of the notification of the end of measurement from the processor element $PE_1$, the processor element $PE_0$ determines NO in step SA4 and returns to step SA2 for repeating the same process. Specifically, in the case under consideration, the measurement is carried out for the processor element $PE_3$ (reference processor element) following the processor element $PE_2$ (reference processor element). Thus, the expected value data for the two-way paths of 1c to 4c and 1d to 4d shown below are obtained.

(1c) Two-way path between processor element $PE_2$ and processor element $PE_1$ (2c) Two-way path between processor element $PE_2$ and processor element $PE_0$ (3c) Two-way path between processor element $PE_2$ and processor element $PE_3$ (4c) Two-way path between processor element $PE_2$ and processor element $PE_2$ (1d) Two-way path between processor element $PE_3$ and processor element $PE_2$ (2d) Two-way path between processor element $PE_3$ and processor element $PE_1$ (3d) Two-way path between processor element $PE_3$ and processor element $PE_0$ (4d) Two-way path between processor element $PE_3$ and processor element $PE_3$ Upon complete measurement work with each of the processor elements $PE_0$ to $PE_3$ as a reference processor element, the processor element $PE_0$ turns YES the determination in step SA4, and proceeds to step SA5. In step SA5, the processor element $PE_0$ (master program MP) instructs the processor elements $PE_0$ to $PE_3$ (slave programs $SP_0$ to $SP_3$) to end the measurement, and then proceeds to step SA6. On the other hand, upon receipt of an instruction to end the measurement from the processor element $PE_0$ (master program MP), the processor elements $PE_0$ to $PE_3$ (slave programs $SP_0$ to $SP_3$) turns YES the determination in steps SA16 and SA20, and proceed to step SA6.

In step SA6, as in step SA1 described above, the synchronization process (see FIG. 8) is executed. Specifically, in step SC1 shown in FIG. 8, the processor elements $PE_0$ to $PE_3$ access the crossbar network unit 10 shown in FIG. 2 and thus store "1" data in each of the registers $11_{PE0}$ to $11_{PE3}$, and then proceed to step SC2. In step SC2, the processor elements $PE_0$ to $PE_3$ poll the register group 11 at predetermined time intervals, and thus determine whether all the registers $11_{PE0}$ to $11_{PE3}$ store "1" data or not, and repeats the process until the determination turns YES. Once the "1" data is stored in all of the registers $11_{PE0}$ to $11_{PE3}$, the processor elements $PE_0$ to $PE_3$ turn YES the determination in step SC2 thereby to complete the series of measurement process. The expected value data obtained by this measurement process is stored in the memory $14_0$ of the processor element $PE_0$.

Load Test:

Now, a load test based on the expected value data (transmission time) obtained by the process of measuring the transmission time described above will be explained with reference to FIGS. 9 to 11. In this load test, as shown in FIG. 9A, sets are determined between the processor elements $PE_0$ to $PE_3$, and packets are sent at a time between each set of the processor elements. Further, in this load test, as in the aforementioned measurement process, the transmission time in the two-way paths between the processor elements is measured, and compared with the expected value data thereby to evaluate the load characteristic. What should be noted here is that the measurement process and the load test, in both of which the transmission time is measured, have different conditions for transmission time measurement. Specifically, in the measurement process, the transmission time is measured sequentially for each set of processor elements. In the load test, by contrast, the transmission time is measured at a time between a plurality of sets of processor elements.

In the example of FIG. 9A, the sets of 1e to 4e below are shown.

|  | Source | Destination |
| --- | --- | --- |
| (1e) | Processor element $PE_0$ and | processor element $PE_1$ |
| (2e) | Processor element $PE_1$ and | processor element $PE_0$ |
| (3e) | Processor element $PE_2$ and | processor element $PE_3$ |
| (4e) | Processor element $PE_3$ and | processor element $PE_2$ |

As shown in the combination table (see FIG. 10), there are a total of 24 sets 1 to 24 in set number, between the processor elements $PE_0$ to $PE_3$. The sets shown in FIG. 9A correspond to the set 8 in the combination table of FIG. 10. Specifically, the PE numbers (0-1, 1-0, 2-3, 3-2) of the set number 8 shown in FIG. 10 correspond to 1e to 4e described above. The numeral before the hyphen in each PE number indicates the subscript of the source, while the numeral after the hyphen indicates the subscript of the destination. Also, the combination table of FIG. 10 is stored in the memory $14_0$ of the processor element $PE_0$ and referred to during execution of the master program MP.

Also, with the increase in the number of processor elements, the number of sets (set number) in the combination table (see FIG. 10) increases. Thus, as long as the sets are comparatively few in number, the load test can be conducted for all the sets in a short time, while in the case where the sets are great in number, a vast length of time is consumed before the load test is completed for all the sets. In view of this, several sets are selected from the sets in the combination table to shorten the load test time. In the case where the time required for the load test can be neglected, however, the load test maybe conduced for all the sets in the combination table.

Now, the load test for the set of the processor elements shown in FIG. 9A will be briefly explained. In FIG. 9A, the processor elements $PE_0$ to $PE_3$ (sources) of 1e to 4e above transmit packets at a time to the processor elements $PE_1$ to $PE_2$ (destinations). Upon receipt of the packets, the processor elements $PE_1$ to $PE_2$ (destinations) transmit the packets to the processor elements $PE_0$ to $PE_3$ (sources). Upon receipt of the packets, the processor elements $PE_0$ to $PE_3$ (sources) determine the difference between the packet receiving time and transmission time as the transmission time, and compares the transmission time with the expected value data thereby to evaluate the load characteristic.

Figure 11:
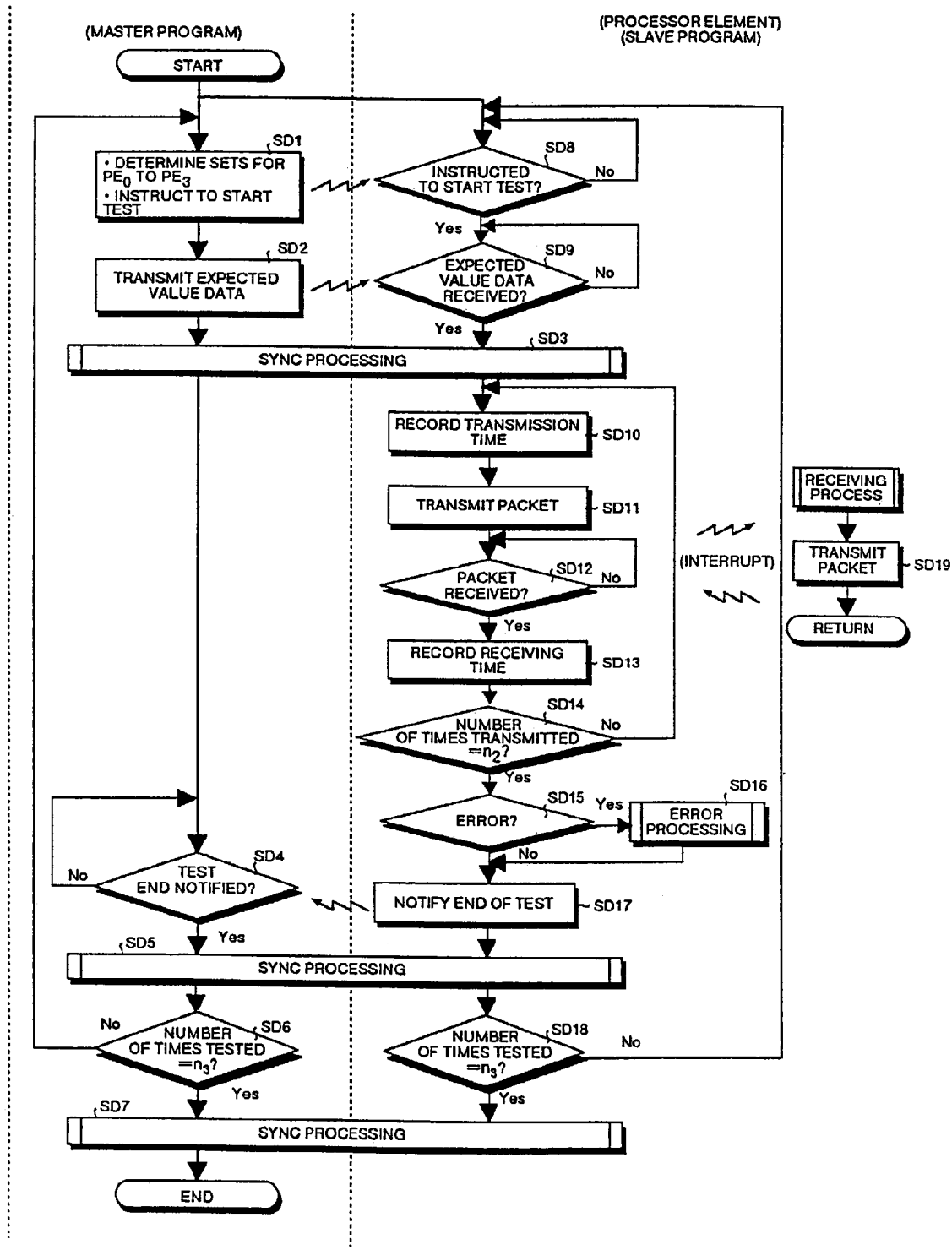
FIG. 11 is a flowchart for explaining the operation according to the first embodiment.

Now, the load test will be explained in detail with reference to the flowchart of FIG. 11. Steps SD1 to SD7 of FIG. 11 represent the process executed by the processor element $PE_0$ (master program MP) shown in FIG. 4. Steps SD8 to SD 19, SD3, SD5 and SD7 are the process executed by the processor elements $PE_0$ to $PE_3$ (slave programs $SP_0$ to $SP_3$) shown in FIG. 4.

Upon completion of the measurement process (see FIG. 6) described above, the processor element $PE_0$ (master program MP) executes the process of step SD1 shown in FIG. 11, while the processor elements $PE_0$ to $PE_3$ (slave programs $SP_0$ to $SP_3$) execute the process of step SD8. In step SD8, the processor elements $PE_0$ to $PE_3$ (slave programs $SP_0$ to $SP_3$) determine whether an instruction is given from the processor element $PE_0$ (master program MP) to start the test, and since the determination is NO, and therefore the same process for determination is repeated.

In step SD1, on the other hand, the processor element $PE_0$ (master program MP) determines sets of the processor elements $PE_0$ to $PE_3$ by referring to the combination table (see FIG. 10). In this case, the processor element $PE_0$ (master program MP) selects a set (0-1, 1-0, 2-3, 3-2) of set number 8, for example, from the combination table of FIG. 10. Thus, as shown in FIG. 9A, the first load test is conducted based on the combination of set number 8.

Then, the processor element $PE_0$ (master program MP), after notifying the processor elements $PE_0$ to $PE_3$ (slave programs $SP_0$ to $SP_3$) of the combination of set number 8 and the start of the test, proceeds to step SD2. As a result, the processor elements $PE_0$ to $PE_3$ (slave programs $SP_0$ to $SP_3$), after recognizing the combination of set number 8 (see FIG. 9A) in the first load test, turns YES the determination in step SD8, and proceeds to step SD9. In step SD9, the processor elements $PE_0$ to $PE_3$ (slave programs $SP_0$ to $SP_3$) determine whether the expected value data (expected value of transmission time) have been received from the processor element $PE_0$ (master program MP) or not. Since the determination is NO, the same process is repeated.

Also, in step SD2, the processor element $PE_0$ (master program MP) reads the expected value data corresponding to the combination of set number 8 from the memory $14_0$ (see FIG. 1) for each of the processor elements $PE_0$ to $PE_3$ (slave programs $SP_0$ to $SP_3$). The processor element $PE_0$ (master program MP) then transmits the expected value data to the processor elements $PE_0$ to $PE_3$ (slave programs $SP_0$ to $SP_3$), after which the process proceeds to step SD3. The processor elements $PE_1$ to $PE_3$ (slave programs $SP_0$ to $SP_3$), upon receipt of the expected value data, turn YES the determination in step SD9 and proceed to step SD3.

In step SD3, the processor element $PE_0$ (master program MP) and the processor elements $PE_0$ to $PE_3$ (slave programs $SP_0$ to $SP_3$) execute the synchronization process as in step SA1 (see FIG. 6). Once the synchronization is secured in this synchronization process, the processor element $PE_0$ (master program MP) proceeds to step SD4. In step SD4, the processor element $PE_0$ (master program MP) determines whether it has received the notification of the completion of the test from the processor elements $PE_0$ to $PE_3$ (slave programs $SP_0$ to $SP_3$). The determination is NO, and therefore the same process is repeated.

Also, once the synchronization is secured in the synchronization process of step SD3, the processor elements $PE_0$ to $PE_3$ (slave programs $SP_0$ to $SP_3$) proceed to step SD10. In step SD10, the processor elements $PE_0$ to $PE_3$ (slave programs $SP_0$ to $SP_3$) record the time of packet transmission to the processor elements of the destinations indicated in 1e to 4e above, and proceed to step SD11.

In step D11, the processor elements $PE_0$ to $PE_3$ (slave programs $SP_0$ to $SP_3$) transmit the packets to the processor elements of the destination shown in 1e to 4e at a time based on the combination of the set number 8, after which the process proceeds to step SD12. Specifically, as shown in FIG. 9A, packets are sent at a time from the processor element $PE_0$ to the processor element $PE_1$, from the processor element $PE_1$ to the processor element $PE_0$, from the processor element $PE_2$ to the processor element $PE_3$, and from the processor element $PE_3$ to the processor element $PE_2$. In this way, in the load test, a heavy load on the crossbar network unit 10 is intentionally created by sending out the packets at the same time from the processor elements $PE_0$ to $PE_3$ (slave programs $SP_0$ to $SP_3$).

In step SD12, the processor elements $PE_0$ to $PE_3$ of the source determine whether a reply packet has been received from the corresponding processor elements $PE_0$ to $PE_3$ of the destination in the same set, and repeats the process until they receive the particular reply packet.

The packets sent from the processor elements $PE_0$ to $PE_3$ of the source are transmitted to the processor elements $PE_0$ to $PE_3$, respectively, of the destination by turning on the crossbar switches $S_{10}$, $S_{01}$, $S_{32}$ and $S_{23}$, respectively, of the crossbar network unit 10 shown in FIG. 3. The processor elements $PE_0$ to $PE_3$ of the destination, upon receipt of the packets from the processor elements $PE_0$ to $PE_3$ of the source, generates an interrupt and executes the process of step SD19.

Specifically, in step SD19, the processor elements $PE_0$ to $PE_3$ of the destination sends the reply packets to the corresponding processor elements $PE_0$ to $PE_3$ of the source, respectively. These reply packets are sent to the processor elements $PE_0$ to $PE_3$ of the source by turning on the crossbar switches $S_{01}$, $S_{10}$, $S_{32}$ and $S_{23}$, respectively, of the crossbar network unit 10 shown in FIG. 3.

The processor elements $PE_0$ to $PE_3$ of the source, upon receipt of the reply packets from the processor elements $PE_0$ to $PE_3$, respectively, of the destination, turns YES the determination in step SD12, and proceed to step SD13. In step SD13, the processor elements $PE_0$ to $PE_3$ of the source, after recording the receiving time of the reply packets, proceed to step SD14. In step SD14, the processor elements $PE_0$ to $PE_3$ of the source determine whether the number of times the packets are transmitted to the processor elements $PE_0$ to $PE_3$ of the destination has reached a specified number $n_2$ (five, for example). Since the number of times transmitted is one in the case under consideration, the processor elements $PE_0$ to $PE_3$ of the source turn NO the determination and return to step SD10.

After that, the processor elements $PE_0$ to $PE_3$ of the source execute the process of sending packets to the processor elements $PE_0$ to $PE_3$ of the same destination, recording the transmission time and recording the receiving time of the reply packet (see steps SD10 to SD13) until the determination in step SD14 turns YES. In the case under consideration, the processor elements $PE_0$ to $PE_3$ of the source perform the process of sending packets while changing the data length thereof for each transmission in order to reduce the error of the transmission time.

When the number of times the packets are transmitted to the processor elements $PE_0$ to $PE_3$ of the destination reaches the specified number $n_2$ (five), the processor elements $PE_0$ to $PE_3$ of the source turn YES the determination in step SD14, and proceed to step SD15. In step SD15, the processor elements $PE_0$ to $PE_3$ of the source totalize the packet transmission time in each of the following two-way paths (1f) to (4f) corresponding to the set number 8 (see FIG. 10). This transmission time is a measurement under heavy load.

|      | Source                                              | Destination              |
| ---- | --------------------------------------------------- | ------------------------ |
| (1f) | Two-way path between processor element $PE_0$ and   | processor element $PE_1$ |
| (2f) | Two-way path between processor element $PE_1$ and   | processor element $PE_0$ |
| (3f) | Two-way path between processor element $PE_3$ and   | processor element $PE_2$ |
| (4f) | Two-way path between processor element $PE_3$ and   | processor element $PE_2$ |

Specifically, the processor element $PE_0$ of the source determines the transmission time in terms of the difference between the packet receiving time (step SD13) from the processor element $PE_1$ of the destination and the transmission time (step SD10) to the destination processor element $PE_1$ in the two-way path 1f. In the two-way path 1f, however, the transmission time for the specified number $n_2$ (step SD14) is determined. The processor element $PE_0$ of the source takes an average transmission time for the specified number $n_2$ thereby to determine the transmission time making up the result of measurement for the two-way path 1f. In similar fashion, the processor elements $PE_1$ to $PE_3$ of the source determine the transmission time for the one-way paths 2f to 4f, respectively, in the form of the result of measurement.

Then, the processor elements $PE_0$ to $PE_3$ of the source compare the transmission time thus determined with the expected value data (step SD9) corresponding to each two-way path and thus evaluate the performance under heavy load. Based on this performance evaluation, the presence or absence of an error is determined. Specifically, for the two-way path if, the processor element $PE_0$ of the source compares the transmission time constituting the measurement result with the expected value data time(3) indicated in FIG. 5A and FIG. 5B corresponds to the particular two-way path. In the case where the difference is not more than a specified value, it is determined that the desired characteristic has been obtained, and in the case where the difference is not less than the specified value, on the other hand, it is determined that an error has occurred. One cited cause of the error is the receiving interference shown in FIG. 32A and FIG. 32B. Also, the presence or absence of an error is determined for the processor elements $PE_1$ to $PE_3$ of the source by the same technique as for the processor element $PE_0$.

In the case where an error has occurred, the processor elements $PE_0$ to $PE_3$ of the source determine the answer as YES in step SD15, and proceeds to step SD16. In step SD16, the processor elements $PE_0$ to $PE_3$ of the source cause the error information to be displayed on a display unit (not shown) or a buzzer (not shown) to sound or otherwise process the error thereby to inform the tester of the error in detail, after which the process proceeds to step SD17. The error information is defined as the information for specifying the two-way path and the processor element that has developed the error, transmission time and the expected value data. In the absence of an error, on the other hand, the processor elements $PE_0$ to $PE_3$ of the source determine the answer in step SD15 as NO and proceeds to step SD17.

In step SD17, the processor elements $PE_0$ to $PE_3$ of the source notify the processor element $PE_0$ (master program MP) of the end of the test on the set number 8 (see FIG. 10 and FIG. 9A), after which the process proceeds to step SD5. As a result, the processor element $PE_0$ (master program MP) determines the answer in step SD4 as YES and proceeds to step SD5. In step SD5, the processor element $PE_0$ (master program MP) and the processor elements $PE_0$ to $PE_3$ (slave programs $SP_0$ to $SP_3$) perform the synchronization process as in step SA6 (see FIG. 6). Once the synchronization is secured in this synchronization process, the processor $PE_0$ (master program MP) proceeds to step SD6.

In step SD6, the processor element $PE_0$ (master program MP) determines whether the number of times the test is conducted has reached a specified number $n_3$ (two, for example) or not. The number of times the test is conducted is counted as 1 when a test is conducted on the combination of one set number shown in FIG. 10. In the case under consideration, the test for the combination of set number 8 (see FIG. 10) has been conducted only once, and therefore the processor element $PE_0$ (master program MP) determines the answer in step SD6 as NO, and returns to step SD1. In the case where the specified number $n_3$ is set to 24, the test is conducted for all the set numbers 1 to 24 in the combination table of FIG. 10.

Also, once the synchronization is secured in the synchronization process of step SD5, the process elements $PE_0$ to $PE_3$ (slave programs $SP_0$ to $SP_3$) proceed to step SD18. In step SD18, the processor elements $PE_0$ to $PE_3$ (slave programs $SP_0$ to $SP_3$) determine whether the number of tests has reached the specified number $n_3$ as in step SD6. In the case under consideration, the answer is NO and the process returns to step SD8.

In step SD1, as in the foregoing operation, the processor element $PE_0$ (master program MP) selects the combination (0-3, 1-2, 2-1, 3-0) of the set number 24 by referring to the combination table (see FIG. 10). Thus, the second load test shown in FIG. 9B is conducted based on the combination of the set number 24. In the example shown in FIG. 9B, the following sets 1g to 4g are illustrated.

|      | Source | Destination |
| --- | --- | --- |
| (1g) | Processor element $PE_0$ and | processor element $PE_3$ |
| (2g) | Processor element $PE_1$ and | processor element $PE_2$ |
| (3g) | Processor element $PE_2$ and | processor element $PE_1$ |
| (4g) | Processor element $PE_3$ and | processor element $PE_0$ |

Then, in step SD1, the processor element $PE_0$ (master program MP) notifies the processor elements $PE_0$ to $PE_3$ (slave programs $SP_0$ to $SP_3$) of the combination of the set number 24 and the start of the test, after which the process proceeds to step SD2. As a result, the processor elements $PE_0$ to $PE_3$ (slave programs $SP_0$ to $SP_3$) recognize the combination of the set number 24 (see FIG. 9B) in the second load test, after which the answer in step SD8 is determined as YES and then the process proceeds to step SD9. In step SD9, the processor elements $PE_0$ to $PE_3$ (slave programs $SP_0$ to $SP_3$) determine whether the expected value data (expected value of the transmission time) has been received from the processor element $PE_0$ (master program MP) or not. In the case under consideration, the determination is NO and the same process is repeated.

Also, in step SD2, the processor element $PE_0$ (master program MP) reads the expected value data corresponding to the combination of the set number 24 from the memory $14_0$ (see FIG. 1) for each of the processor elements $PE_0$ to $PE_3$ (slave programs $SP_0$ to $SP_3$). The processor element $PE_0$ (master program MP) transmits the expected value data to the processor elements $PE_0$ to $PE_3$ (slave programs $SP_0$ to $SP_3$) and then proceeds to step SD3. The processor elements $PE_0$ to $PE_3$ (slave programs $SP_0$ to $SF_3$), upon receipt of the expected value data, determines the answer in step SD9 as YES and proceeds to step SD3.

In step SD3, the processor element $PE_0$ (master program MP) and the processor elements $PE_0$ to $PE_3$ (slave programs $SP_0$ to $SP_3$) execute the synchronization process. After that, as in the case of set number 8 described above, the measurement is conducted for the set number 24. Specifically, the processor elements $PE_0$ to $PE_3$ of the source perform the process of transmitting packets to the processor elements $PE_0$ to $PE_3$ of the same destination, recording the transmission time and recording the receiving time of the reply packet until the answer in step SD14 turns YES (see steps SD10 to SD13).

When the number of times the packets are transmitted to the processor elements $PE_0$ to $PE_3$ of the destination reaches the specified number $n_2$ (5), the processor elements $PE_0$ to $PE_3$ of the source determine the answer in step SD14 as YES, and proceed to step SD15. In step SD15, the processor elements $PE_0$ to $PE_3$ of the source, as in the case of the set number 8 (see FIG. 10), determine whether there is an error or not by comparing the packet transmission time in the following two-way paths 1h to 4h for the set number 24 with the expected value data.

|      | Source | Destination |
| --- | --- | --- |
| (1h) | Two-way path between processor element $PE_0$ and | processor element $PE_3$ |
| (2h) | Two-way path between processor element $PE_1$ and | processor element $PE_2$ |

-continued

| | Source | Destination |
|---|---|---|
| (3h) | Two-way path between processor element $PE_2$ and | processor element $PE_1$ |
| (4h) | Two-way path between processor element $PE_3$ and | processor element $PE_0$ |

In the case where an error has occurred, the processor elements $PE_0$ to $PE_3$ of the source determine the answer in step SD15 as YES, and proceed to step SD16, in which the error is processed and the process proceeds to step SD17. In the case where no error has occurred, on the other hand, the processor elements $PE_0$ to $PE_3$ of the source determine the answer in step SD15 as NO and proceed to step SD17.

In step SD17, the processor elements $PE_0$ to $PE_3$ of the source notify the processor element $PE_0$ (master program MP) of the end of the test for the set number 24 (see FIG. 10 and FIG. 9B), and then proceed to step SD5. As a result, the processor element $PE_0$ (master program MP) determines the answer in step SD4 as YES, and proceeds to step SD5. In step SD5, the processor elements $PE_0$ to $PE_3$, as in step SA6 (see FIG. 6), performs the synchronization process and then proceeds to step SD6.

Assume that the number of tests (two) has reached the specified number $n_3$ (2, for example). In step SD6, therefore, the processor element $PE_0$ (master program MP) determines the answer as YES and proceeds to step SD7. In similar fashion, in step SD18, the processor elements $PE_0$ to $PE_3$ (slave programs $SP_0$ to $SP_3$) determine the answer as YES, and proceed to step SD7. In step SD7, the processor element $PE_0$ (master program MP) and the processor elements $PE_0$ to $PE_3$ (slave programs $SP_0$ to $SP_3$), like in step SA1 (see FIG. 6), perform the synchronization process and thus end a series of load tests.

As explained above, according to the first embodiment, packets are transmitted from the processors $PE_0$ to $PE_3$ at the same time on condition that no packets are sent from a plurality of source processor elements to a single destination processor element, and therefore the load test can be conducted always under heavy load. Further, according to the first embodiment, the result of actual measurement is used as an expected value for performance evaluation, and therefore a highly reliable test result is obtained.

In the first embodiment described above, as shown in FIG. 9A and FIG. 9B, a detailed explanation was given about the case in which the processor elements $PE_0$ to $PE_3$ of the source transmit packets at the same time to the processor elements $PE_0$ to $PE_3$ of the destination, so that a heavy load condition was created for conducting a load test. For further improving the reliability of the load test result, a load test is conducted under a maximum load by rendering a plurality of packets to arrive at the crossbar network unit 10 at the same time. In the first embodiment, however, the transmission distance and the transmission characteristic are different for different sets of the crossbar network unit 10 and the processor elements $PE_0$ to $PE_3$, respectively, and therefore the time of arrival at the crossbar network unit 10 is varied from one packet to another, with the result that no maximum load cannot be realized. An example of conducting the load test under maximum load will be explained below as a second embodiment.

Figure 12:
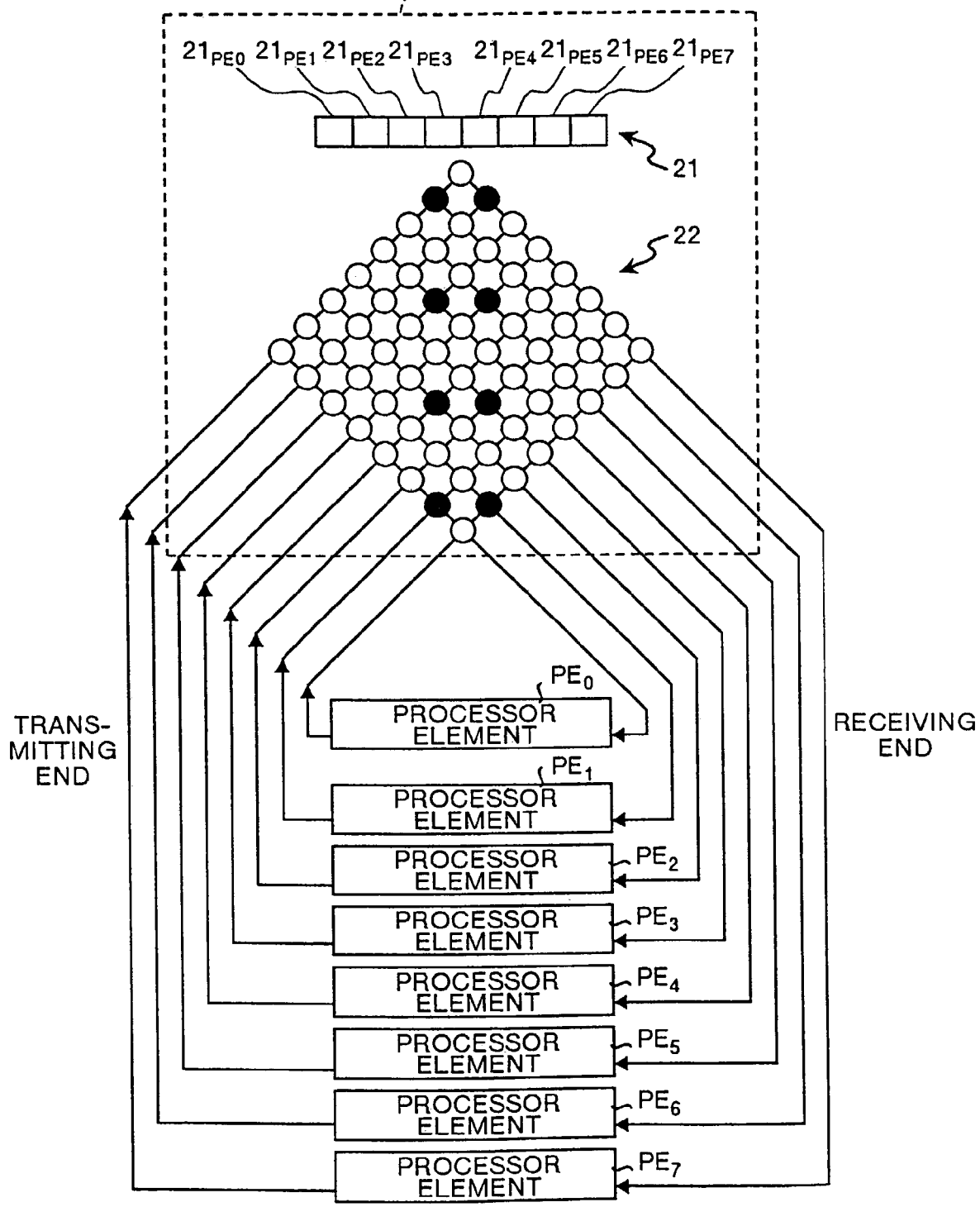
FIG. 12 is a block diagram showing a configuration according to the second embodiment of the present invention.

FIG. 12 is a block diagram showing a configuration according to the second embodiment of the present invention. The basic configuration of the parallel processor system shown in FIG. 12 is similar to that of FIG. 1. The parallel processor system of FIG. 12, however, comprises eight processor elements $PE_0$ to $PE_7$, as compared with four processor elements included in the parallel processor system of FIG. 1. With the increase in the number of processor elements, the configuration of the crossbar network unit 20 is somewhat different from the crossbar network unit 10 (see FIG. 1).

In FIG. 12, the processor elements $PE_0$ to $PE_7$ are arithmetic elements for executing the parallel arithmetic operation according to a parallel algorithm and have the same configuration as the processor element $PE_0$ (see FIG. 1). The crossbar network unit 20 is a device for interconnecting the processor elements $PE_0$ to $PE_7$, and like the register group 11 (see FIG. 2), includes a register group 21 used for synchronization process and a crossbar switch group 22 configured with N×N (8×8 in the drawing) switches. The incoming line side (transmission side) of the crossbar network system 20 is connected to the transmission units (not shown) of the processor elements $PE_0$ to $PE_7$, respectively, while the outgoing line side (receiving side) thereof is connected to the receiving unit (not shown) of the processor elements $PE_0$ to $PE_7$, respectively. In this way, the crossbar network unit 20 is configured with N×N (8×8 in the drawing) switches and adapted to connect an arbitrary input line (transmission unit) and an arbitrary output line (receiving unit) with each other.

The register group 21 is configured with registers $21_{PE0}$ to $21_{PE7}$ used for synchronizing the processor elements $PE_0$ to $PE_7$. The registers $21_{PE0}$ to $21_{PE7}$ correspond to the processor elements $PE_0$ to $PE_7$, respectively. The register $21_{PE0}$ is adapted to store "1" data or "0" data in response to the access from the processor element $PE_0$. The processor element $PE_0$ can store "1" or "0" data only in the register $21_{PE0}$ but not in the other registers $21_{PE1}$ to $21_{PE7}$. In similar fashion, the registers $21_{PE1}$ to $21_{PE7}$ are adapted to store "1" or "0" data in response to the access by the processor elements $PE_1$ to $PE_7$, respectively.

Also, the data stored in the register group 21 (registers $21_{PE0}$ to $21_{PE7}$) can be accessed by any of the processor elements $PE_0$ to $PE_7$. Specifically, the processor element $PE_0$ can access the data stored in all the registers $21_{PE0}$ to $21_{PE7}$. This is also the case with the other processor elements $PE_1$ to $PE_7$ each of which can access the data stored in any of the registers $21_{PE0}$ to $21_{PE7}$. In the synchronization process, the processor elements $PE_0$ to $PE_7$ write the "1" (or "0") data individually in the registers $21_{PE0}$ to $21_{PE7}$. After that, the processor elements $PE_0$ to $PE_7$ poll the register group 21 (registers $21_{PE0}$ to $21_{PE7}$) at regular time intervals and thus accesses the data held therein. When all the data held in the register group 21 has come to assume "1" (or "0"), the processor elements $PE_0$ to $PE_7$ recognize that the synchronization is secured.

Figure 13:
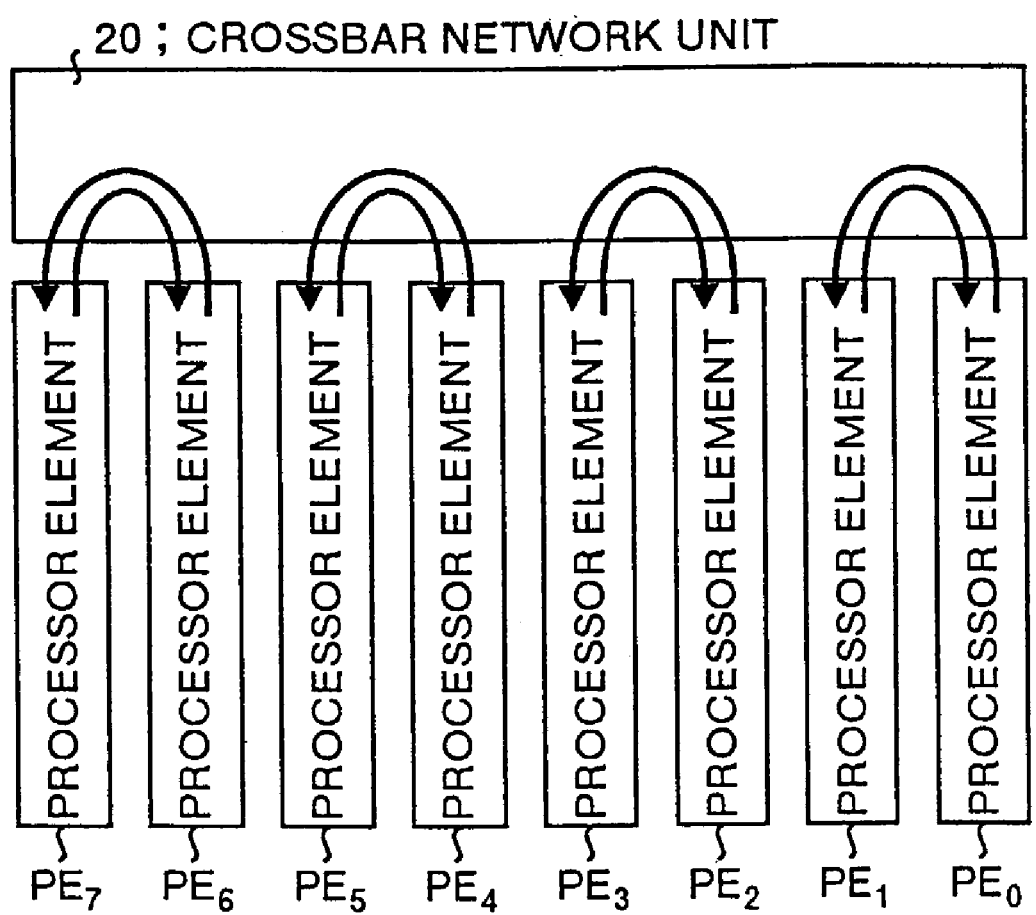
FIG. 13 is a block diagram showing a general configuration according to the second embodiment.

The crossbar switch group 22 has a total of 64 (=8×8) crossbar switches and interconnects an arbitrary set of the processor elements $PE_0$ to $PE_7$. This crossbar switch group 22 has the same basic function as the crossbar switch group 12 (see FIG. 3). In the crossbar switch group 22 shown in FIG. 12, a plurality of crossbar switches are designated by black circles and white circles. The black circle indicates the turn-on state of a particular crossbar switch, and the white circle the turn-off state thereof. Thus, in the example of FIG. 12, the processor elements $PE_0$ to $PE_7$ are connected in the manner as shown in FIG. 13.

Also, the memories (not shown) of the processor elements $PE_0$ to $PE_7$ shown in FIG. 12, respectively, have stored therein, like in the case of FIG. 4, a load test program including a master program and slave programs. Specifically, the memory of the processor element $PE_0$ has stored therein a master program and a slave program, while each memory of the processor elements $PE_1$ to $PE_7$ has stored therein a slave program.

Figure 14:
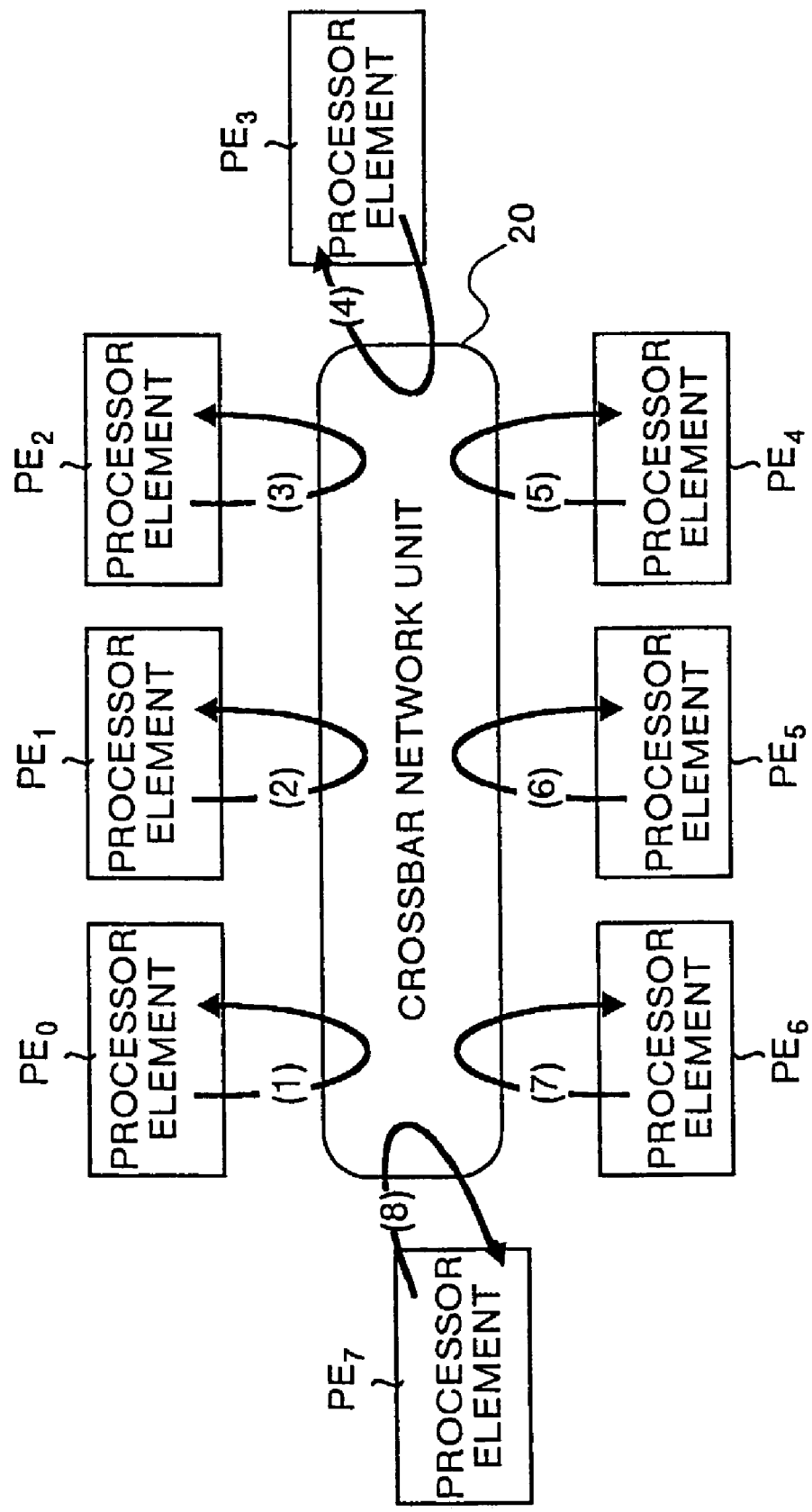
FIG. 14 is a block diagram for explaining a method of measuring the transmission time in the two-way paths between processor elements and a crossbar network unit.
Figure 15:
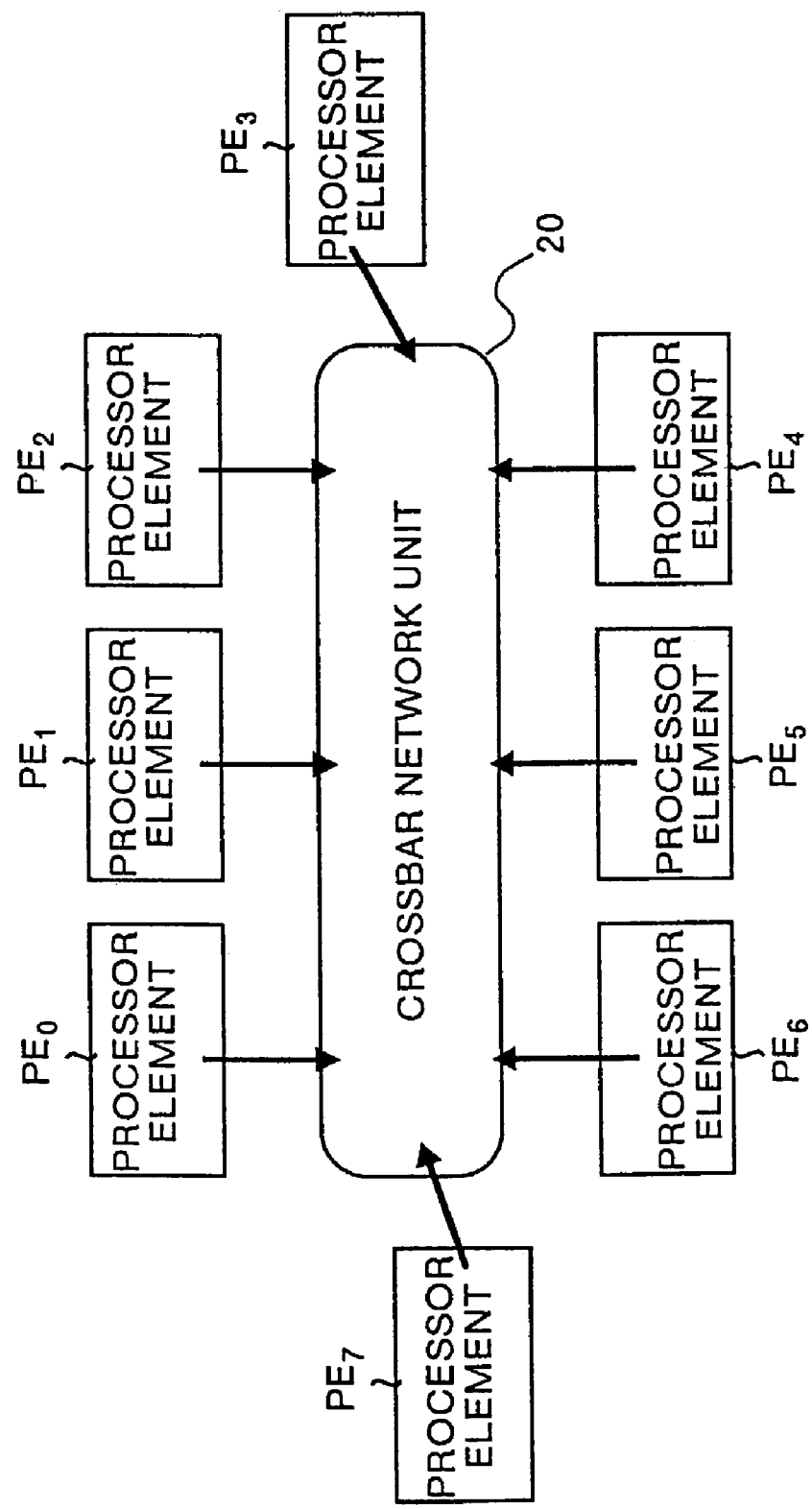
FIG. 15 is a block diagram for explaining the operation according to the second embodiment.

Measurement of Transmission Time:

Now, the operation of the second embodiment will be explained. In the second embodiment, the process for measuring the transmission time required for the load test is performed (see FIG. 14), followed by the measurement process similar to that of the first embodiment (see FIG. 6), before conducting the load test (see FIG. 15). First, the measurement process will be explained with reference to FIG. 14. In this measurement process, as shown in FIG. 14, the processor elements $PE_0$ to $PE_7$ are selected sequentially as a reference processor element, and the packet transmission time in the two-way path between the selected reference processor element and the crossbar network unit 10 is measured. In other words, the transmission time in each of the two-way paths 1i to 8i described below is measured.

(1i) Two-way path between processor element $PE_0$ and crossbar network unit 10
(2i) Two-way path between processor element $PE_1$ and crossbar network unit 10
(3i) Two-way path between processor element $PE_2$ and crossbar network unit 10
(4i) Two-way path between processor element $PE_3$ and crossbar network unit 10
(5i) Two-way path between processor element $PE_4$ and crossbar network unit 10
(6i) Two-way path between processor element $PE_5$ and crossbar network unit 10
(7i) Two-way path between processor element $PE_6$ and crossbar network unit 10
(8i) Two-way path between processor element $PE_7$ and crossbar network unit 10

The transmission time is defined as the time length required from the time point when a packet is transmitted by a reference processor element to the time point when the packet returned by the crossbar network unit 10 is received by the same reference processor element. The two-way path is the return-trip route from the crossbar network unit 10, for example, from the reference processor element to the crossbar network unit 10 and back to the reference processor element.

Figure 16:
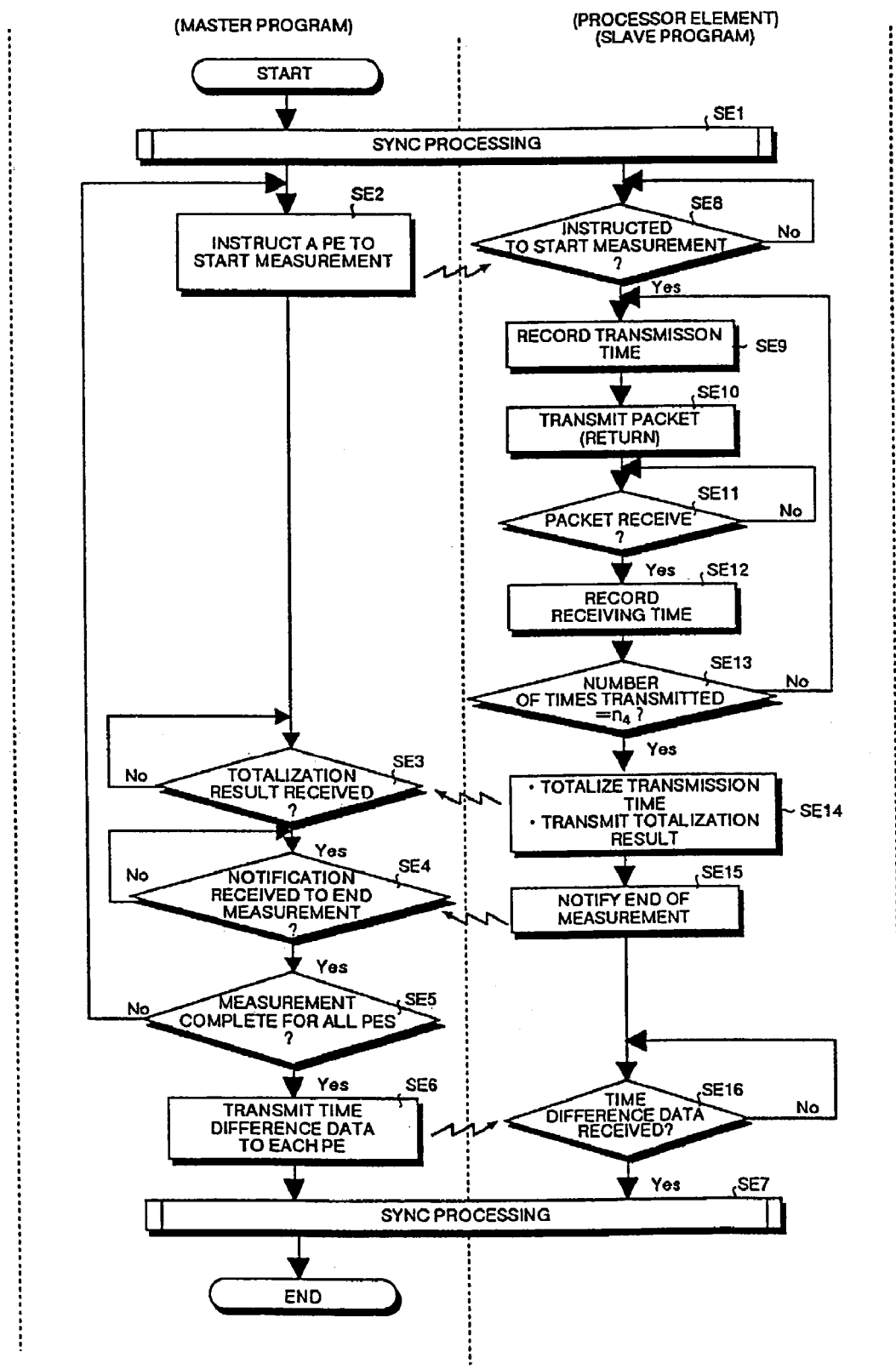
FIG. 16 is a flowchart for explaining the process of measuring the transmission time in the two-way paths between a processor element and a crossbar network unit.

Now, the process for measuring the transmission time in the two-way path between the processor element and the crossbar network unit will be explained with reference to the flowchart of FIG. 16. In FIG. 16, steps SE1 to SE7 represent the process executed by the processor elements $PE_0$ (master program) shown in FIG. 14. On the other hand, steps SE1, SE8 to SE16 and SE7 are the process executed by the processor element (slave program) selected as a reference processor element.

In the processor element $PE_0$ shown in FIG. 14, assume that the master program is activated. In step SE1 shown in FIG. 16, the processor element $PE_0$ (master program) instructs the processor elements $PE_0$ to $PE_7$ (slave programs) to perform the synchronization process. The processor elements $PE_0$ to $PE_7$, like in step SA1 (see FIG. 6), perform the synchronization process by accessing the registers $21_{PE0}$ to $21_{PE7}$ shown in FIG. 12, respectively. Upon complete synchronization, the processor element $PE_0$ (master program) proceeds to step SE2. At the same time, the processor elements $PE_0$ to $PE_7$ (slave programs) proceed to step SE8, and determine whether an instruction is given by the processor element $PE_0$ (master program) to start the measurement or not. The determination is NO in the case under consideration, and therefore the process is repeated.

In step SE2, the processor element $PE_0$ (master program) selects one of the processor elements $PE_0$ to $PE_7$ as a reference processor element, and then instructs the reference processor element to start the measurement. Assume that the processor element $PE_0$ (master program) has selected the processor element $PE_0$ (slave program) shown in FIG. 14 as a reference processor element in step SE2. In step SE2, therefore, the processor element $PE_0$ (master program) instructs the processor element $PE_0$ (slave program) to start the measurement, and then proceeds to step SE3. Thus, in this case, the transmission time in the two-way path 1i is measured. In step SE3, the processor element $PE_0$ (master program) determines whether the totalization of the transmission time has been received from the reference processor element (the processor element $PE_0$ in this case) or not. The determination is NO, and the same determination process is repeated.

Upon receipt of an instruction to start the measurement, the processor element $PE_0$ (slave program) determines the answer as YES in step SE8, and proceeds to step SE9. In step SE9, the processor element $PE_0$ (slave program), as shown in FIG. 14, records the transmission time of the packet to be transmitted to itself, and then proceeds to step SE10. In step SE10, the processor element $PE_0$ transmits the packet to itself from the transmission unit (not shown), and then proceeds to step SE11. In step SE11, the processor element $PE_0$ determines whether the packet addressed to itself has been received or not. Since such a packet has not been so received, the determination is NO, followed by repeating the process. The packet addressed to the processor element $PE_0$ is returned back to the processor element $PE_0$ from the crossbar network unit 10 by turning on (see black circle) the crossbar switches shown in FIG. 12.

Upon receipt of the packet by the receiving unit (not shown) of the processor element $PE_0$, the processor element $PE_0$ determines the answer in step SE11 as YES and proceeds to step SE12. Instep SE12, the processor element $PE_0$ records the packet receiving time, and then proceeds to step SE13. In step SE13, it is determined whether the number of times the packets addressed to the processor element $PE_0$ is transmitted has reached a specified number $n_4$ (5, for example) or not.

In the case under consideration, the number of times the packet is sent is one, and therefore the processor element $PE_0$ determines the answer as NO and returns to step SE9. After that, until the determination in step SE13 turns YES, the processor element $PE_0$ performs the process for transmitting a packet to itself and recording the transmission time and the receiving time in steps SE9 to SE12. In the process, in order to reduce the error of the transmission time (measurement), the processor element $PE_0$ performs the process for transmitting packets while changing the data length of the packet each time.

Once the determination in step SE13 turns YES, the processor element $PE_0$ proceeds to step SE14. In step SE14, the processor element $PE_0$ totalizes the packet transmission time in the two-way path 1i described above. Specifically, the processor element $PE_0$ determines the transmission time in the two-way path 1i as the difference between the packet receiving time (step SE12) and the packet transmission time (step SE9). For the two-way path 1i, the transmission time is determined for the specified number $n_4$ (step SE13). The totalization of a plurality of transmission time lengths thus determined is transmitted by the processor element $PE_0$ (slave program) to the processor element $PE_0$ (master program), after which the process proceeds to step SE15.

Upon receipt of the totalization of the transmission time lengths for the two-way path 1i, the processor element $PE_0$ (master program) turns YES the determination in step SE3, and proceeds to step SE4. In step SE4, the processor element $PE_0$ (master program) determines whether it has received or not the notification from the reference processor element (the processor element $PE_0$ (slave program) in this case) that the measurement has been completed, and in the case where the determination is NO, the same process is repeated.

In step SE15, the processor element $PE_0$ (slave program) notifies the processor element $PE_0$ (master program) of the completion of the measurement for the transmission path 1i, and then proceeds to step SE16. Upon receipt of the notification of completion of the measurement described above, the processor element $PE_0$ (master program) turns YES the determination in step SE4, and proceeds to step SE5. In step SE16, the processor element $PE_0$ (slave program) determines whether the time difference data has been received from the processor element $PE_0$ (master program) or not. Since the determination is NO, the same process is repeated. The time difference data is defined as the data on the time difference between a reference transmission time and each of the transmission time lengths (1) to (8), the reference transmission time being the longest one of the transmission time lengths (1) to (8) shown in FIG. 14. The transmission time lengths (1) to (8) and the time difference data will be described in more detail later.

In step SE5, the processor element $PE_0$ (master program) determines whether the measurement has been completed for each of the processor elements $PE_0$ to $PE_7$ as a reference processor element. In the case under consideration, the measurement has been completed only with the processor element $PE_0$ (slave program) as a reference processor element. Therefore, the processor element $PE_0$ (master program) determines the answer in step SE5 as NO, and returns to step SE2.

In step SE2, the processor element $PE_0$ (master program) selects the processor element $PE_1$ of FIG. 14 as the next reference processor element from among the processor elements $PE_1$ to $PE_7$. Then, the processor element $PE_0$ (master program), in the same manner as the operation described above, instructs the processor element $PE_1$ (reference processor element) to start the measurement. As in the case where the processor element $PE_0$ (master program) is a reference processor element, the measurement is made with the processor element $PE_1$ as a reference processor element. In other words, in this case, the transmission time in the two-way path 2i is measured.

Upon complete measurement for 2i and upon receipt of the totalization of the transmission time from the processor element $PE_1$, the processor element $PE_0$ (master program) determines the answer in step SE3 as YES, and proceeds to step SE4. Upon receipt of the notification of the complete measurement from the processor element $PE_1$, the processor element $PE_0$ (master program) determines the answer in step SE4 as YES and proceeds to step SE5. In step SE5, the processor element $PE_0$ (master program) determines the answer as NO, and returns to step SE2. After that, like in the operation described above, the transmission time is measured sequentially with each of the processor elements $PE_2$ to $PE_7$ as a reference processor element. Thus, in this case, the transmission time is determined for all the two-way paths 3i to 8i.

Upon complete measurement with each of the processor elements $PE_0$ to $PE_7$ as a reference processor element, the processor element $PE_0$ (master program) turns the answer in step SE5 as YES and proceeds to step SE6. In step SE6, the processor element $PE_0$ (master program) determines the time difference data for each of the processor elements $PE_0$ to $PE_7$ (slave programs). In determining the time difference data, the processor element $PE_0$ (master program) employs the average value of the transmission time totalized for each of the two-way paths 1i to 8i.

Then, the processor element $PE_0$ (master program) divides each average value by 2 thereby to produce the transmission time lengths (1) to (8) shown in FIG. 14. The transmission time (1) is for the one-way path from the processor element $PE_0$ to the crossbar network unit 10, and the transmission time (2) is for the one-way path from the processor element $PE_1$ to the crossbar network unit 10. In similar fashion, the transmission time (8) is for the one-way path from the processor element $PE_7$ to the crossbar network unit 10.

Then, the processor element $PE_0$ (master program) determines the longest one of the transmission time lengths (1) to (8) in FIG. 14 as a reference transmission time. It is assumed here that the transmission time (1) is determined as a reference transmission time. In the case where there are two or more longest transmission time, any one of them can be employed as a reference transmission time. Then, the processor element $PE_0$ (master program) determines the difference between the reference transmission time (transmission time (1) in the case under consideration) and each of the transmission time lengths (1) to (8). An example of the time difference data for the processor elements $PE_0$ and $PE_7$ is shown below.

| (Processor element) | (time difference data) |
|---|---|
| Processor element $PE_0$ | ±0 |
| Processor element $PE_1$ | +2 |
| Processor element $PE_2$ | +2 |
| Processor element $PE_3$ | +4 |
| Processor element $PE_4$ | ±0 |
| Processor element $PE_5$ | +2 |
| Processor element $PE_6$ | +2 |
| Processor element $PE_7$ | +3 |

Then, the processor element $PE_0$ (master program) transmits the time difference data described above to each of the processor elements $PE_0$ to $PE_0$ (slave programs), and then proceeds to step SE7. In step SE16, the processor elements $PE_0$ to $PE_7$ (slave programs), upon receipt of the time difference data, store them in the memories thereof (not shown), respectively, and then determining the answer as YES, proceeds to step SE7. In step SE7, the processor elements $PE_0$ to $PE_7$, like in step SA6 (see FIG. 6), perform the synchronization process and thus ends a series of measurement process.

Then, according to the second embodiment, the measurement process similar to the measurement process (see FIG. 6) of the transmission time described above is carried out thereby to produce the expected value data as described above. In the first embodiment, the range in which the expected value data is calculated is determined as the processor elements $PE_0$ to $PE_3$. According to the second embodiment, on the other hand, the expected value data is produced in the range covering the processor elements $PE_0$ to $PE_7$. The expected value data thus produced is stored in the memory (not shown) of the processor element $PE_0$ (see FIG. 15).

Load Test:

Now, a load test conducted based on the time difference data obtained by the measurement process (see FIG. 16) described above and the expected value data obtained by the measurement process (see FIG. 6) will be explained with reference to the flowchart of FIG. 17. The load test described in detail below is conducted, as in the first embodiment, in such a manner that sets are determined out of the processor elements $PE_0$ to $PE_7$ and packets are transmitted between each set of processor elements, as shown in FIG. 13.

Unlike in the first embodiment in which packets are transmitted at a time when starting the test, according to the second embodiment, packets are sent by staggering the packet transmission time for each processor element based on the time difference data so that all the packets arrive simultaneously at the crossbar network unit 20. In the second embodiment, therefore, the load test is conducted while the crossbar network unit 20 is under maximum load. Also, in the load test according to the second embodiment, like the first embodiment, the transmission time is measured for the two-way path between the processor elements, and compared with the expected value data thereby to evaluate the load characteristic.

Figure 17:
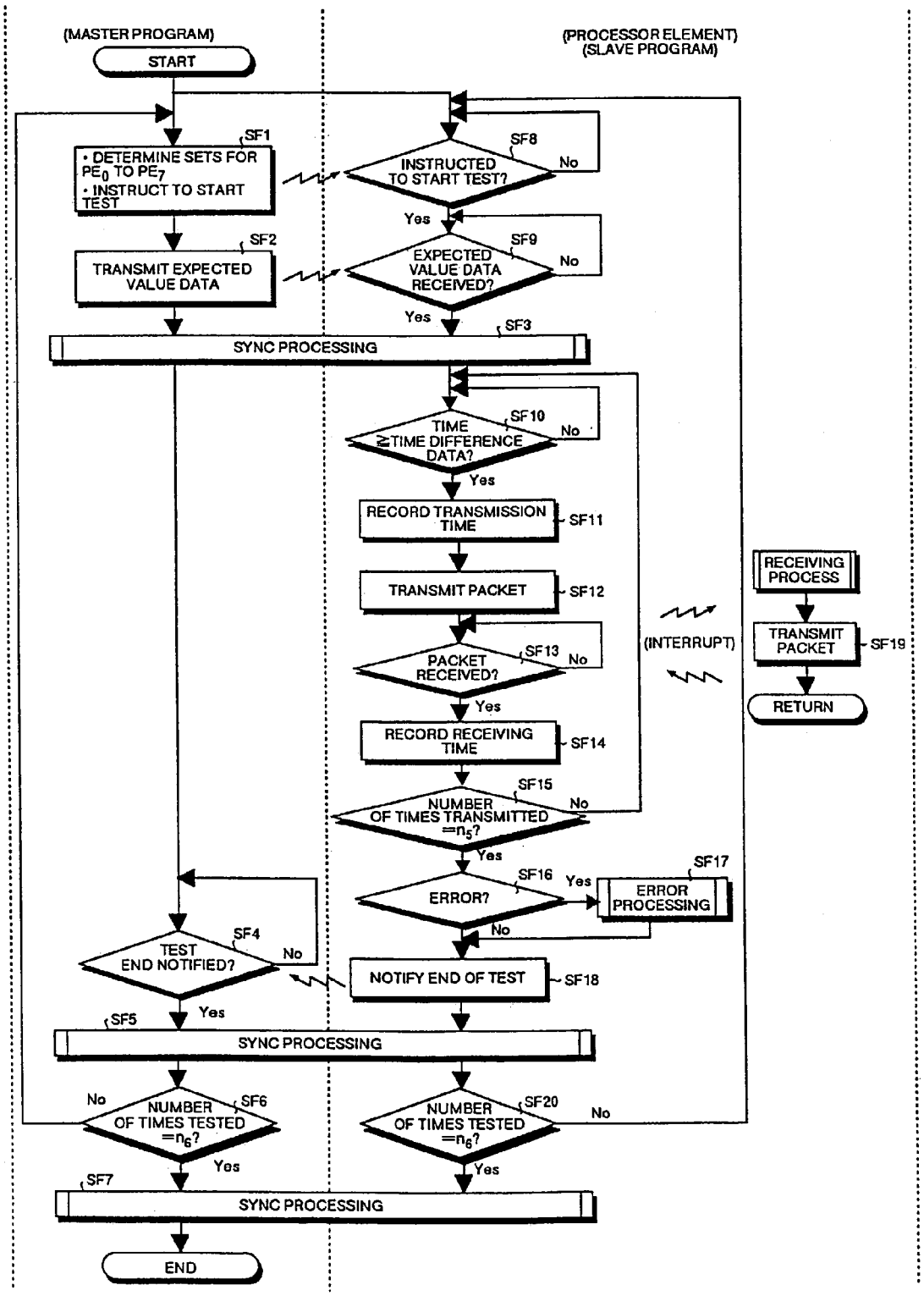
FIG. 17 is a flowchart for explaining the operation according to the second embodiment.

The process of steps SF1 to SF7 shown in FIG. 17 is executed by the processor element $PE_0$ (master program) shown in FIG. 14, while the process of steps SF3, SF8 to SF19, SF20, SF5 and SF7 is executed by the processor elements $PE_0$ to $PE_7$ (slave programs) shown in FIG. 14.

Upon complete measurement process as described above (see FIGS. 6 and 16), the processor element $PE_0$ (master program) executes the process of step SF1 shown in FIG. 17, while the processor elements $PE_0$ to $PE_7$ (slave programs) execute the process of step SF8. In step SF8, the processor elements $PE_0$ to $PE_7$ (slave programs) determine whether an instruction is given by the processor element $PE_0$ (master program) to start the test. In the case under consideration, the answer is NO and the process is repeated.

In step SF1, on the other hand, the processor element $PE_0$ (master program) refers to the combination table (not shown) to determine the sets from the processor elements $PE_0$ to $PE_7$. This combination table is similar to that shown in FIG. 10 except that the range of combination is the processor elements $PE_0$ to $PE_7$. In this case, the processor element $PE_0$ (master program) selects the sets as shown in FIG. 13, for example, from the combination table. The sets in the case under consideration are as designated by 1j to 8j below.

|      | Source | Destination |
|------|--------|-------------|
| (1j) | Processor element $PE_0$ and | processor element $PE_1$ |
| (2j) | Processor element $PE_1$ and | processor element $PE_0$ |
| (3j) | Processor element $PE_3$ and | processor element $PE_3$ |
| (4j) | Processor element $PE_3$ and | processor element $PE_2$ |
| (5j) | Processor element $PE_4$ and | processor element $PE_5$ |
| (6j) | Processor element $PE_5$ and | processor element $PE_4$ |
| (7j) | Processor element $PE_6$ and | processor element $PE_7$ |
| (8j) | Processor element $PE_7$ and | processor element $PE_6$ |

In step SF1, the processor element $PE_0$ (master program) notifies the processor elements $PE_0$ to $PE_7$ (slave programs) of the sets 1j to 8j (see FIG. 13), instructs them to start the test, and then proceeds to step SF2. As a result the processor elements $PE_0$ to $PE_7$ (slave programs) recognize the combinations in the load test, after which the answer in step SF8 is turned YES, and the process proceeds to step SF9. In step SF9, the processor elements $PE_0$ to $PE_7$ (slave programs) determine whether the expected value data (expected value data of the transmission time) have been received from the processor element $PE_0$ (master program) or not. Since the determination is NO, the same process is repeated.

In step SF2, the processor element $PE_0$ (master program) reads the expected value data corresponding to the sets 1j to 8j from a memory (not shown) for each of the processor elements $PE_0$ to $PE_7$ (slave programs). Then, the processor element $PE_0$ (master program) transmits the expected value data to the processor elements $PE_0$ to $PE_7$ (slave programs), respectively, and then proceeds to step SF3. In step SF9, upon receipt of the expected value data, the processor elements $PE_0$ to $PE_7$ (slave programs) turns the determination to YES and proceed to step SF3.

In step SF3, the processor element $PE_0$ (master program) and the processor elements $PE_0$ to $PE_7$ (slave programs) perform the synchronization process in the same manner as in step SD1 (see FIG. 11). Once the synchronization is secured in this synchronization process, the processor element $PE_0$ (master program) proceeds to step SF4. In step SF4, the processor element $PE_0$ (master program) determines whether the notification of the test completion has been received from the processor elements $PE_0$ to $PE_7$ (slave programs). The determination is NO and the process is repeated.

Also, once the synchronization is secured in step SF3, the processor elements $PE_0$ to $PE_7$ (slave programs) start to count on timer (not shown) and then proceed to step SF10. In step SF10, the processor elements $PE_0$ to $PE_7$ (slave programs) determine whether the time on each timer (count) is not less than the time difference data described above, and in the case where this determination is NO, the same process is repeated. The relation between the processor elements and the time difference data is shown below again.

| (Processor element) | (time difference data) |
|---|---|
| Processor element $PE_0$ | ±0 |
| Processor element $PE_1$ | +2 |
| Processor element $PE_2$ | +2 |
| Processor element $PE_3$ | +4 |
| Processor element $PE_4$ | ±0 |
| Processor element $PE_5$ | +2 |
| Processor element $PE_6$ | +2 |
| Processor element $PE_7$ | +3 |

Specifically, the time difference for the processor element $PE_0$ (slave program) is ±0, and therefore immediately after the time on timer (count) becomes 0 or more, the determination in step SF10 turns YES, and the process proceeds to step SF11. Then, the packet transmission time to the destination processor element $PE_0$ shown in 1j above is recorded, after which the process proceeds to step SF12. In step SF12, the processor element $PE_0$ (slave program) sends the packet to the destination processor element $PE_0$ as indicated in 1j. In this way, the processor element $PE_0$ with the time difference of ±0 transmits, immediately after complete synchronization in step SF3, a packet to the destination processor element $PE_1$, followed by proceeding to step SF13.

Also, the processor element $PE_1$, for which the time difference is +2, stands by while keeping the determination in step SF10 at NO until the time on timer (count) becomes 2 or more. When the count becomes 2 or more, the processor element $PE_1$ turns YES the determination in step SF10, and proceeds to step SF11, in which the packet transmission time to the destination processor element $PE_0$ indicated in 2j is recorded and then the process proceeds to step SF12.

In step SF12, the processor element $PE_1$ transmits packets to the destination processor element $PE_0$ indicated in 2j above. In this way, the processor element $PE_1$, for which the time difference is +2, upon complete synchronization in step SF3, stands by for the time length corresponding to the time difference data (+2), and then transmits packets to the destination processor element $PE_0$, followed by proceeding to step SF13. In similar fashion, the processor elements $PE_2$ to $PE_7$ stand by for the time length corresponding to the time difference data, and then send packets to the corresponding destination processor elements, respectively, followed by proceeding to step SF13.

In step SF12, the packets sent at different time points, respectively, from the processor elements $PE_0$ to $PE_7$ reach the crossbar network unit 20 shown in FIG. 12 at the same time point. As a result, a total of eight crossbar switches indicated by black circles in the crossbar switch group 22 of the crossbar network unit 20 are turned on at the same time. In other words, the crossbar network unit 20 is under maximum load in this case. Each packet is sent to the destination processor elements $PE_0$ to $PE_7$.

In step SF13, the source processor elements $PE_0$ to $PE_7$ determine whether the reply packets have been received or not from the corresponding destination processor elements $PE_0$ to $PE_7$, respectively, and until the reply packets have been received, repeat the same process. Upon receipt of the reply packets from the source processor elements $PE_0$ to $PE_7$, the destination processor elements $PE_0$ to $PE_7$ generate an interrupt and execute the process of step SF19. Specifically, in step SF19, the destination processor elements $PE_0$ to $PE_7$ send the reply packets to the corresponding source processor elements $PE_0$ to $PE_7$, respectively. These reply packets are transmitted to the source processor elements $PE_0$ to $PE_7$, respectively, upon turning on of the crossbar switch group 22 of the crossbar network unit 20 shown in FIG. 12.

The source processor elements $PE_0$ to $PE_7$, upon receipt of the reply packets from the destination processor elements $PE_0$ to $PE_7$, respectively, turn YES the determination in step SF13, and then proceed to step SF14. In step SF14, the source processor elements $PE_0$ to $PE_7$, after recording the receiving time of the reply packets, proceed to step SF15. In step SF15, the source processor elements $PE_0$ to $PE_7$ determine whether the number of times the packets are sent to the corresponding destination processor elements $PE_0$ to $PE_7$, respectively, has reached a specified number $n_5$ (5, for example) or not. Since the number of times so transmitted is 1, the source processor elements $PE_0$ to $PE_7$ determine the answer as NO and return to step SF10.

After that, until the determination in step SF15 turns YES, the source processor elements $PE_0$ to $PE_7$ perform the process of sending packets to the same corresponding destination processor elements $PE_0$ to $PE_7$, respectively, recording the transmission time, and recording the receiving time of the reply packets (steps SF10 to SF14). In the case under consideration, the source processor elements $PE_0$ to $PE_7$ perform the process for transmitting the packets while changing the data length thereof for each transmission in order to reduce the transmission time error.

Once the number of times the packets are sent to the destination processor elements $PE_0$ to $PE_7$ reaches the specified number $n_5$ (5), the source processor elements $PE_0$ to $PE_7$ turn YES the determination in step SF15, and proceed to step SF16. In step SF16, the source processor elements $PE_0$ to $PE_7$ totalize the packet transmission time for each of the two-way paths designated by 1k to 8k below. This transmission time is the measurement under maximum load.

| | Source | Destination |
|---|---|---|
| (1k) | Two-way path between processor element $PE_0$ and | processor element $PE_1$ |
| (2k) | Two-way path between processor element $PE_1$ and | processor element $PE_0$ |
| (3k) | Two-way path between processor element $PE_2$ and | processor element $PE_3$ |
| (4k) | Two-way path between processor element $PE_3$ and | processor element $PE_2$ |
| (5k) | Two-way path between processor element $PE_4$ and | processor element $PE_5$ |
| (6k) | Two-way path between processor element $PE_5$ and | processor element $PE_4$ |
| (7k) | Two-way path between processor element $PE_6$ and | processor element $PE_7$ |
| (8k) | Two-way path between processor element $PE_7$ and | processor element $PE_6$ |

Then, the source processor elements $PE_0$ to $PE_7$ compare the transmission time determined by the same method as in step SD15 (see FIG. 11) with the expected value data (see step SF9) corresponding to each two-way path thereby to evaluate the performance under maximum load, and determines the presence or absence of an error based on the result of the performance evaluation. In the case where an error has occurred, the source processor elements $PE_0$ to $PE_7$ turn YES the determination in step SF16, and proceed to step SF17, where as in step SD16 (see FIG. 11), the error processing is performed, followed by proceeding to step SF18. In the absence of an error, on the other hand, the source processor elements $PE_0$ to $PE_7$ turn NO the determination in step SF16 and proceed to step SF18.

In step SF18, the source processor elements $PE_0$ to $PE_7$ notify the processor element $PE_0$ (master program) of the completion of the test for the sets 1j to 8j, and then proceeds to step SF5. As a result, the processor element $PE_0$ (master program) determines the answer in step SF4 as YES, and proceeds to step SF5. In step SF5, the processor element $PE_0$ (master program) and the processor elements $PE_0$ to $PE_7$ (slave programs) perform the synchronization process in the same manner as in step SD5 (see FIG. 11). Once the synchronization is secured in this process, the processor element $PE_0$ (master program) proceeds to step SF6.

In step SF6, the processor element $PE_0$ (master program) determines whether the number of times the test is conducted has reached a specified number $n_6$ (one, for example). In the case Under consideration, the answer is YES, and the process proceeds to step SF7. In the case where the specified number $n_6$ is set to 2 or more, on the other hand, the processor element $PE_0$ (master program) determines the answer as NO, and returns to step SF1 to conduct the test for the other sets in the combination table in the same manner as in the operation described above.

Also, once the synchronization is secured in step SF5, the processor elements $PE_0$ to $PE_7$ (slave programs) proceed to step SF20. In step SF20, the processor elements $PE_0$ to $PE_7$ (slave programs), like in step SF6, determine whether the number of times the test is conducted has reached the specified number $n_6$ or not. Since the answer is YES, the process proceeds to step SF7. In the case where the specified number $n_6$ is set to 2 or more, on the other hand, the processor elements $PE_0$ to $PE_7$ (slave programs) return to step SF8, and conduct the test for the other sets in the combination table in the same manner as the operation described above. In step SF7, the processor element $PE_0$ (master program) and the processor elements $PE_0$ to $PE_7$ (slave programs) perform the synchronization process in the same manner as in step SD7 (see FIG. 11), after which the series of the load test are completed.

As described above, according to the second embodiment, a plurality of packets are sent at such transmission timings that the packets arrive at the crossbar network unit 20 at the same time point on condition that no packet is transmitted from a plurality of source processor elements to a single destination processor element. As a result, the load test can be conducted always under maximum load. Further, according to the second embodiment, the performance is evaluated using an actual measurement as an expected value based on the transmission time under maximum load, and therefore the test result of higher reliability is obtained.

The third embodiment is explained below. In the aforementioned first embodiment, as shown in FIG. 9A and FIG. 9B, sets between source processor elements and destination processor elements are determined from among the processor elements $PE_0$ to $PE_3$ and packets are sent at a time from the source processor elements to the destination processor elements. In this way, a high load state is generated before conducting a load test, as described in detail above. According to the second embodiment, on the other hand, an example was described in which a load test is conducted under maximum load with a plurality of packets arriving simultaneously at the crossbar network unit 20 shown in FIG. 12. In the description of the third embodiment that follows, on the other hand, the first and second embodiments are combined and a load test is conducted with emphasis placed on the transmission route having a long transmission time.

Figure 18:
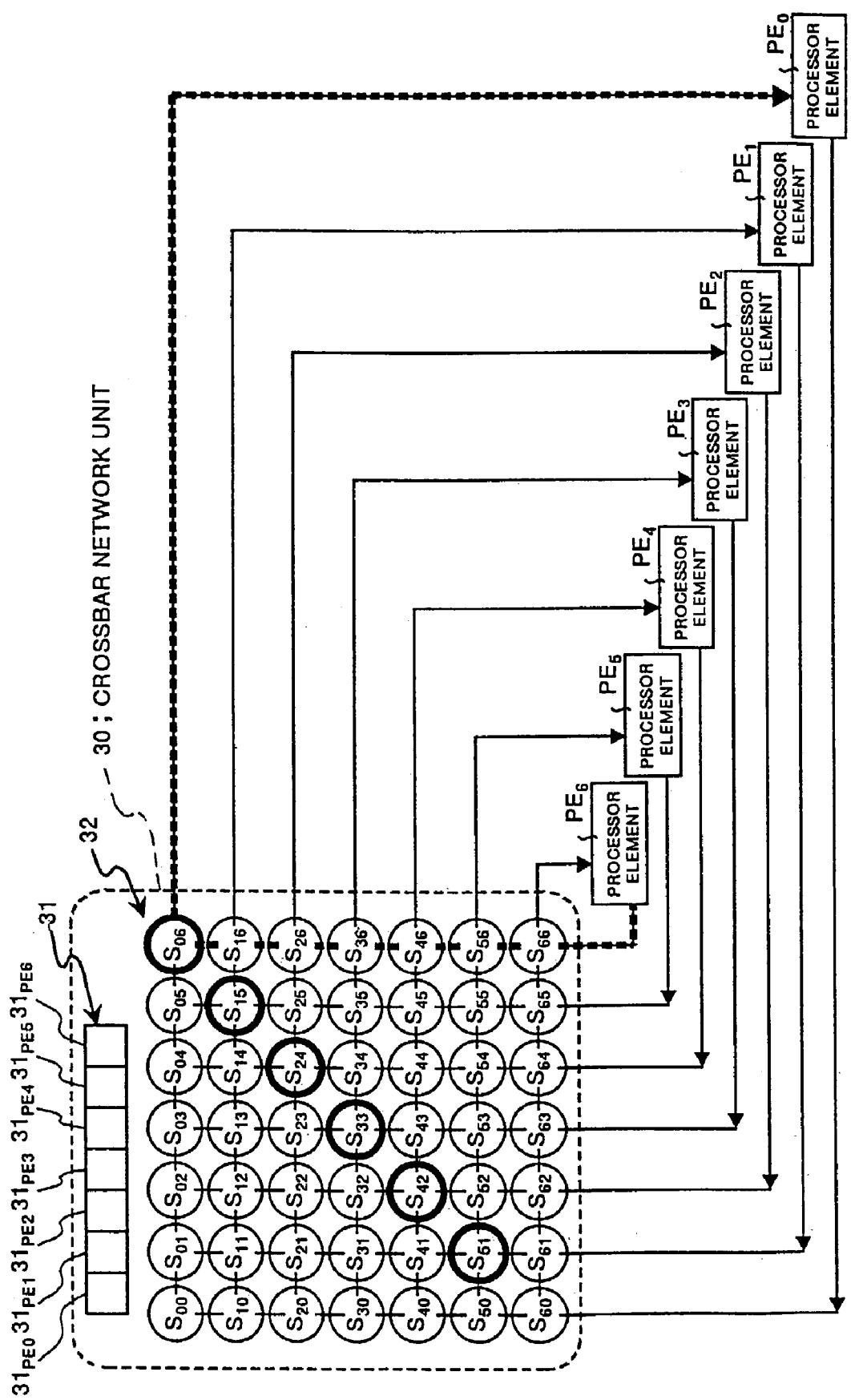
FIG. 18 is a block diagram showing a configuration according to a third embodiment of the present invention.

FIG. 18 is a block diagram showing a configuration according to the third embodiment of the present invention. The basic configuration of the parallel processor system shown in this diagram is similar to that of FIG. 1, except that the parallel processor system shown in FIG. 18 has seven processor elements $PE_0$ to $PE_6$, or three more than the parallel processor system shown in FIG. 1. Also, with the increase in the number of processor elements, the configuration of the crossbar network unit 30 is somewhat different from that of the crossbar network unit 10 (see FIG. 1).

In FIG. 18, the processor elements $PE_0$ to $PE_6$ are arithmetic elements for executing the arithmetic operations in parallel in accordance with the parallel algorithm and have the same configuration as the processor element $PE_0$ (see FIG. 1). The crossbar network unit 30 is a device for connecting the processor elements $PE_0$ to $PE_6$ to each other, and like the register group 11 (see FIG. 2), has a register group 31 and a crossbar switch group 32 configured with N×N (7×7 in the diagram) switches.

In this crossbar network unit 30, the incoming line side (transmission side) is connected to the transmission unit (not shown) of the processor elements $PE_0$ to $PE_6$, respectively, while the outgoing line side (receiving side) is connected to the receiving unit (not shown) of the processor elements $PE_0$ to $PE_6$, respectively. In this way, the crossbar network unit 30 has a switch configuration of N×N (7×7 in the diagram) switches for connecting an arbitrary input line (transmission unit) and an arbitrary output line (receiving unit) to each other.

The register group 31 includes registers $31_{PE0}$ to $31_{PE6}$ which are used for synchronizing the processor elements $PE_0$ to $PE_6$. The registers $31_{PE0}$ to $31_{PE6}$ correspond to the processor elements $PE_0$ to $PE_6$, respectively. The register $31_{PE0}$ stores "1" or "0" data in response to the access from the processor element $PE_0$. The processor element $PE_0$ can store "1" or "0" data only in the register $31_{PE0}$, but not in the other registers $31_{PE1}$ to $31_{PE6}$. In similar fashion, the registers $31_{PE1}$ to $31_{PE6}$ store "1" or "0" data in response to access from the processor elements $PE_1$ to $PE_6$, respectively.

Also, the data stored in register group 31 (registers $31_{PE0}$ to $31_{PE6}$) can be accessed by any of the processor elements $PE_0$ to $PE_6$. Specifically, the processor element $PE_0$ can access the data stored in all the registers $31_{PE0}$ to $31_{PE6}$. The other processor elements $PE_0$ to $PE_6$ can similarly access the data stored in all the registers $31_{PE0}$ to $31_{PE6}$.

In the synchronization process, the processor elements $PE_0$ to $PE_6$ write "1" (or "0") data individually in the registers $31_{PE0}$ to $31_{PE6}$. After that, the processor elements $PE_0$ to $PE_6$ poll the register group 31 (registers $31_{PE0}$ to $31_{PE6}$) at regular time intervals and thus access the data held therein. When all the data held in the register group 31 assume "1" (or "0") state, the processor elements $PE_0$ to $PE_6$ recognize that the synchronization is secured. The crossbar switch group 32 has a total of 49 (=7×7) crossbar switches $S_{00}$ to $S_{66}$ for interconnecting an arbitrary set of the processor elements $PE_0$ to $PE_6$. The basic function of the crossbar switch group 32 is similar to that of the crossbar switch 12 (see FIG. 3).

Also, the memories (not shown) of the processor elements $PE_0$ to $PE_6$ shown in FIG. 18 each have stored therein a load test program including a master program and a slave program as in FIG. 4. Specifically, a master program and a slave program are stored in the memory of the processor element $PE_0$, and a slave program is stored in each of the memories of the processor elements $PE_1$ to $PE_6$.

Figure 19:
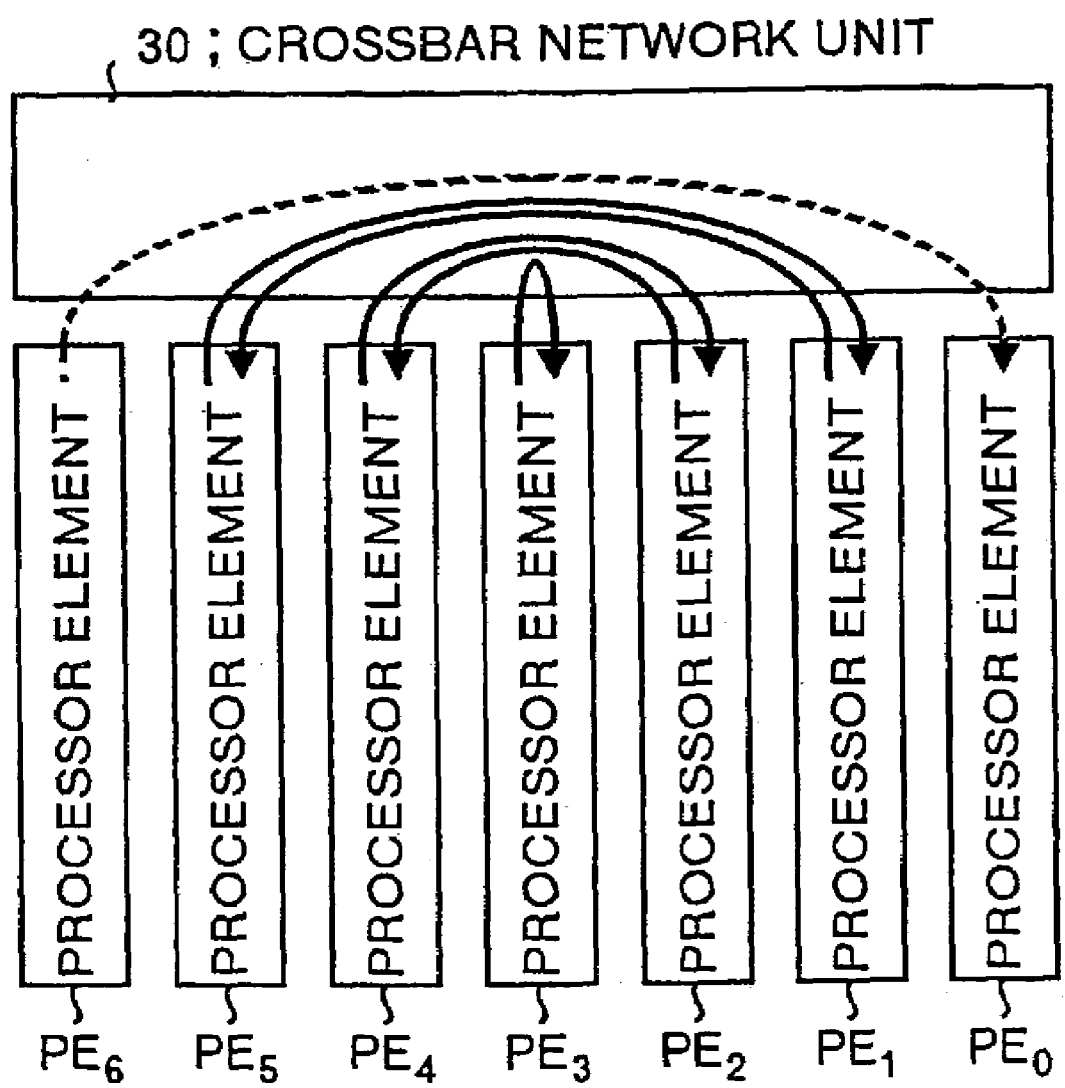
FIG. 19 is a block diagram for explaining the operation according to the third embodiment.

Now, the operation of the third embodiment will be explained with reference to the flowcharts of FIGS. 19, 20 and 21. In the third embodiment, the process for measurement (see FIG. 6) similar to that of the first embodiment is followed by the process for measurement (see FIG. 16) similar to that of the second embodiment, after which another measurement process (see FIG. 21) is executed. After conducting the series of the measurement processes, a load test is conducted. In the third embodiment, as shown in FIG. 19, the load test is conducted on the transmission route of long transmission time (for example, the route from the processor element $PE_6$ to processor element $PE_0$) as compared with other transmission routes. Specifically, in the example shown in FIG. 19, packets are transmitted from the processor element $PE_6$ to the processor element $PE_0$, while at the same time being transmitted between the other processor elements.

Figure 20:
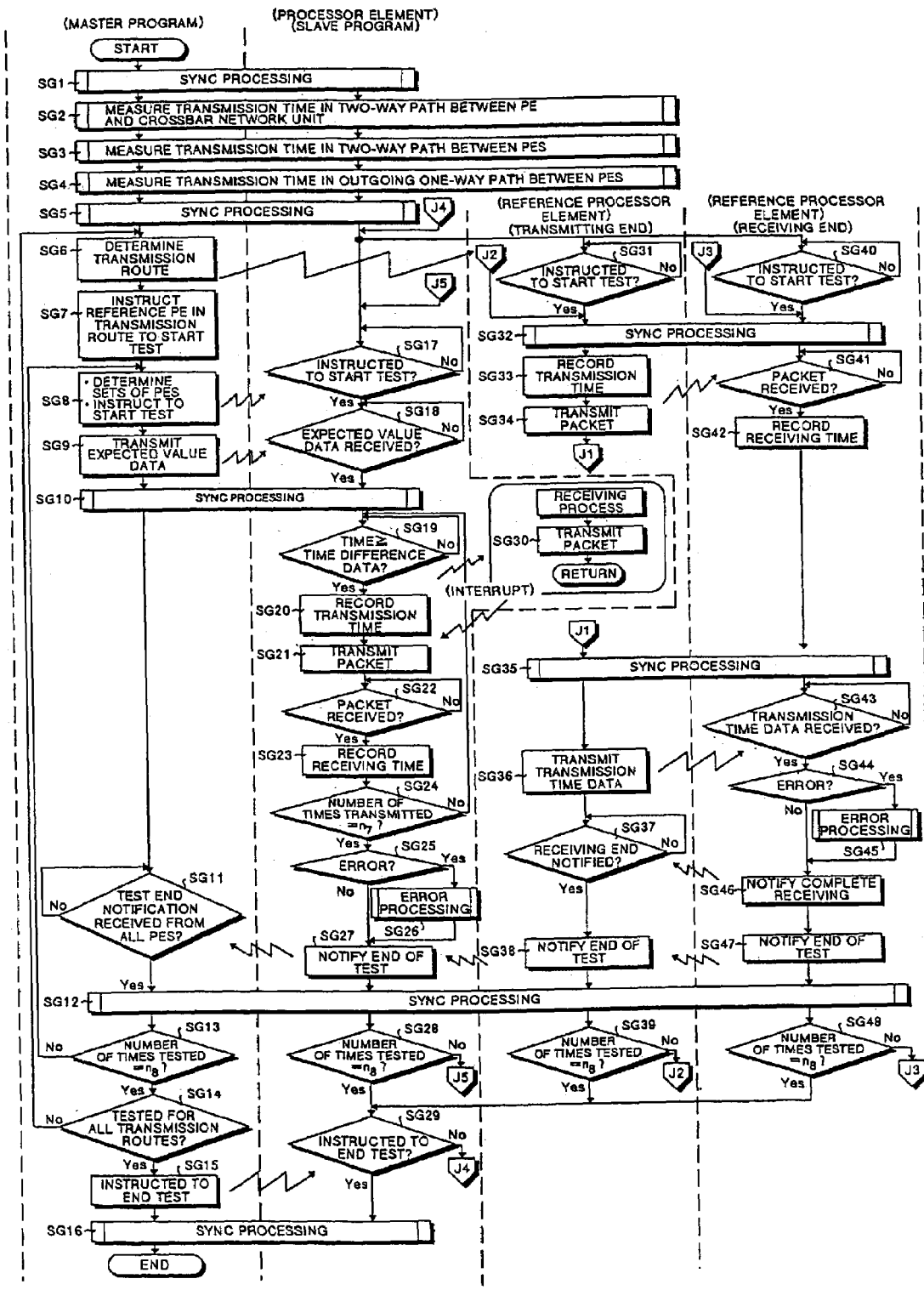
FIG. 20 is a flowchart for explaining the operation according to the third embodiment.

Also, steps SG1 to SG16 shown in FIG. 20 represent the process executed by the processor element $PE_0$ (master program) shown in FIG. 18. Steps SG17 to SG48, SG1 to SG5, SG10, SG12 and SG16, on the other hand, are the process executed by the processor elements $PE_0$ to $PE_6$ (slave programs) shown in FIG. 18.

Once the master program is activated in the processor element $PE_0$ shown in FIG. 18, the processor elements $PE_0$ to $PE_6$ perform the synchronization process as in the operation described above in step SG1 of FIG. 20, after which the process proceeds to step SG2. In step SG2, the processor elements $PE_0$ to $PE_6$ execute the process of measuring the transmission time in the two-way path between a processor element and the crossbar network unit in accordance with the flowchart shown in FIG. 16, and then proceed to step SG3.

In this measurement process, as in the second embodiment, the time difference data corresponding to the processor elements $PE_0$ to $PE_6$, respectively, are determined.

Unlike in the second embodiment in which the range for determining the time difference data is set from the processor elements $PE_0$ to $PE_7$, the range for determining the time difference data covers the processor elements $PE_0$ to $PE_6$ in the third embodiment. The time difference data thus obtained are stored in the memories of the processor elements $PE_0$ to $PE_6$, respectively.

In step SG3, the processor elements $PE_0$ to $PE_6$ execute the process of measuring the transmission time in the two-way path between the processor elements in accordance with the flowchart shown in FIG. 6, and then proceed to step SG4. In this process, as in the first embodiment, the expected value data described above is produced. According to the first embodiment, the range for determining the expected value data is set to cover the processor elements $PE_0$ to $PE_3$. In the third embodiment, in contrast, the range is set from the processor elements $PE_0$ to $PE_6$ to produce the expected value data. The expected value data thus produced are stored in the memory (not shown) of the processor element $PE_0$ (see FIG. 18).

Figure 21:
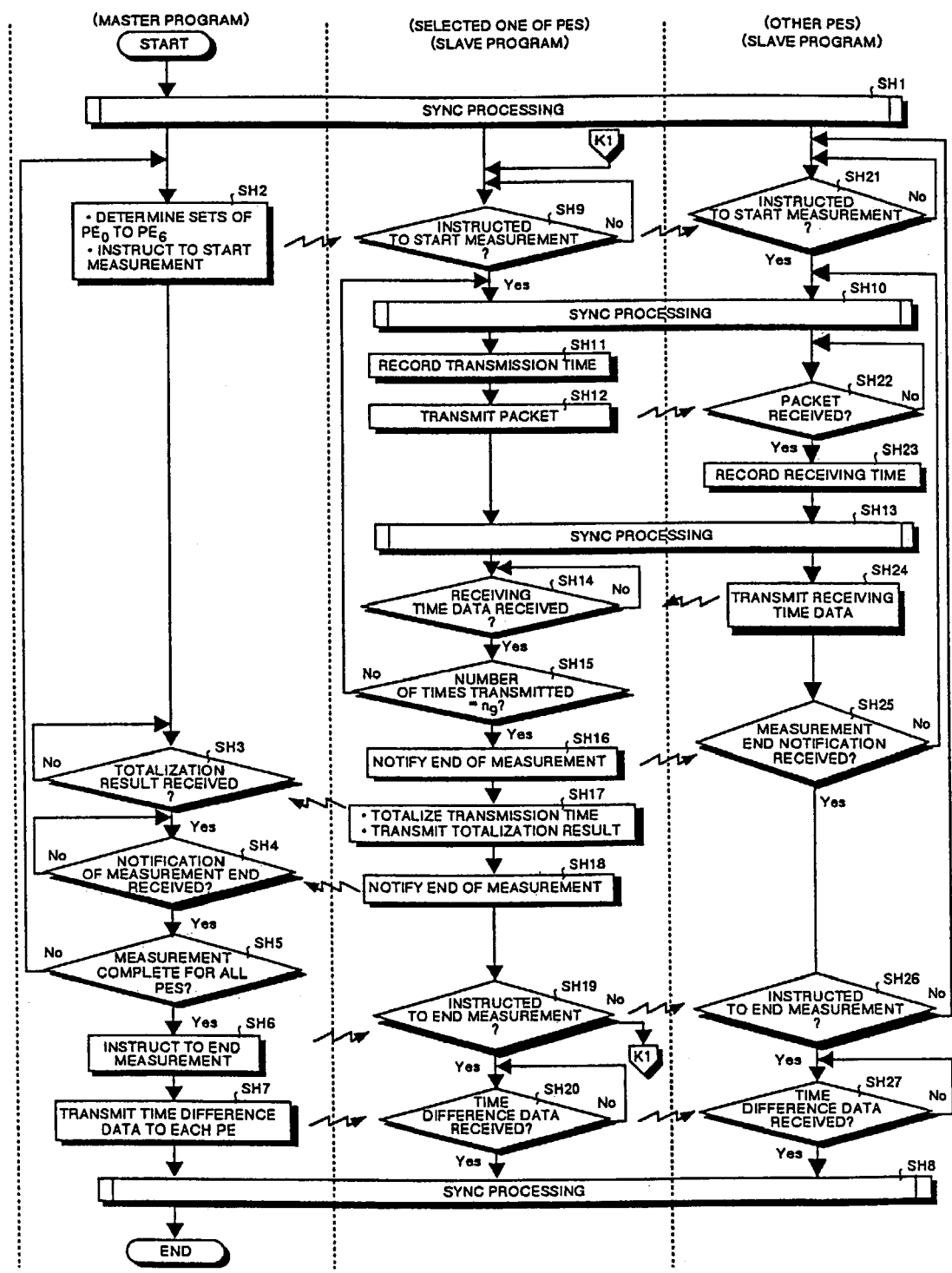
FIG. 21 is a flowchart for explaining the process of measuring the transmission time in the two-way paths between processor elements.

In step SG4, the processor elements $PE_0$ to $PE_6$ execute the process for measuring the transmission time in the one-way path between the processor elements in accordance with the flowchart of FIG. 21. In this measurement process, one set of processor elements is selected out of the processor elements $PE_0$ to $PE_6$, so that the packet transmission time in the outgoing one-way path is measured between the particular set of the processor element (at transmitting end) and the processor element (at receiving end).

In FIG. 21, steps SH1 to SH8 represent the process executed by the processor element $PE_0$ (master program) shown in FIG. 18. Steps SH1, SH9 to SH20 and SH8, on the other hand, represent the process executed by one processor element (transmitting end) of a set of processor elements. Further, steps SH1, SH21 to SH27, SH10, SH13 and SH8 are the process executed by the other processor (at the receiving end) of the same set.

In step SH1 shown in FIG. 21, the processor elements $PE_0$ to $PE_6$ execute the synchronization process in the same manner as the aforementioned operation and then proceed to steps SH2, SH9 and SH21, respectively. In step SH2 shown in FIG. 21, the processor element $PE_0$ (master program) determines a set for measuring the transmission time by selecting the particular set from the pairs of the processor elements $PE_0$ to $PE_6$ shown in FIG. 18.

In the case under consideration, assume that a set including the processor element $PE_6$ (transmitting end) and the processor $PE_0$ (receiving end) shown in FIG. 18 has been selected. The processor element $PE_0$ (master program) instructs the two processor elements (the processor element $PE_6$ at the transmitting end and the processor element $PE_0$ at the receiving end in this case) making up a set to start the measurement, and then proceeds to step SH3. In step SH3, the processor element $PE_0$ (master program) determines whether the totalization of the transmission time described later has been received from the processor element at the transmitting end (the processor element $PE_6$ in this case) or not. Since the determination is NO, the process is repeated.

Upon receipt of the instruction by the processor element $PE_0$ (master program) to start the measurement, the processor element $PE_6$ (at the transmitting end) determines the answer as YES in step SH9, and proceeds to step SH10. In parallel with this process, the processor element $PE_0$ (at the receiving end) determines the answer as YES in step SH21, and proceeds to step SH10. In step SH10, the processor elements $PE_6$ and $PE_0$, after performing the synchronization process, proceed to steps SH11 and SH22, respectively.

In step SH11, the processor element $PE_6$ (at the transmitting end) records the transmission time point at which a packet is to be transmitted to the processor element $PE_0$ (at the receiving end) making up the same set, after which the process proceeds to step SH12. In step SH12, the processor element $PE_6$ transmits the packet addressed to the processor element $PE_0$ from the transmission unit (not shown), and then proceeds to step SH13. The packet addressed to the processor element $PE_0$ is sent to the processor element $PE_0$ through the crossbar network unit 30 by turning on the crossbar switch $S_{06}$ shown in FIG. 18.

Upon receipt of the packet by the receiving unit (not shown) of the processor element $PE_0$, the processor element $PE_0$ determines the answer as YES in step SH22, and then proceeds to step SH23. In step SH23, the processor element $PE_0$ (at the receiving end), after recording the receiving time, proceeds to step SH13. In step SH13, the processor element $PE_6$ and the processor element $PE_0$, after performing the synchronization operation, proceed to steps SH14 and SH24, respectively. In step SH14, the processor element $PE_6$ (at the transmitting end) determines whether the receiving time data has been received from the processor element $PE_0$ (at the receiving end). Since the determination is NO, the same process is repeated.

In step SH24, the processor element $PE_0$ (at the receiving end) transmits the receiving time data indicating the packet receiving time to the processor element $PE_6$ (transmitting end), after which the process proceeds to step SH25. In step SH25, the processor element $PE_0$ determines whether the notification of the end of the measurement has been received from the processor element $PE_6$. In this case; the determination is NO, and the process returns to step SH10. Upon receipt of the receiving time data, the processor element $PE_6$ determines the answer in step SH14 as YES, and proceeds to step SH15. In step SH15, it is determined whether the number of times the packet is sent to the processor element $PE_0$ has reached the specified number $n_9$ (5, for example) or not.

Since the number of times transmitted is one, the processor element $PE_6$ determines the answer as NO, and returns to step SH10. After that, until the determination in step SH15 turns YES, the processor element $PE_6$ performs the process for transmitting the packets to the same processor element $PE_0$ and the process for receiving the receiving time data, while the processor element $PE_0$ performs the process for receiving the packet and the process for transmitting the receiving time data. In this case, the processor element $PE_6$ performs the process for sending packets while changing the packet data length for each transmission.

When the number of times the packets are sent to the processor element $PE_0$ reaches the specified number $n_9$ (5), the processor element $PE_6$ determines the answer as YES in step SH15, and proceeds to step SH16. By this time point, the data on a total of five transmission time points and receiving time points for the outgoing one-way path from the processor element $PE_6$ to the processor element $PE_0$ have been stored.

In step SH16, the processor element $PE_6$, after notifying the processor element $PE_0$ of the completion of the measurement, proceeds to step SH17. As a result, in step SH25, the processor element $PE_0$ determines the answer as YES, and proceeds to step SH26. In step SH26, the processor element $PE_0$ (at the receiving end) determines whether an instruction is given or not by the processor element $PE_0$ (master program) to end the measurement. Since the determination is NO, the process returns to step SH21.

In step SH17, the processor element $PE_6$ totalizes the packet transmission time for the outgoing one-way path between the processor element $PE_6$ and the processor element $PE_0$, after which the result of the totalization is sent to the processor element $PE_0$ (master program), and then the process proceeds to step SH18. In this case, the processor element $PE_6$ determines, as the transmission time, the difference between the receiving time data (step SH14) and the packet transmission time (step SH11) addressed to the processor element $PE_0$ for the outgoing one-way path.

Upon receipt of the totalization result, in step SH3, the processor element $PE_0$ (master program) stores the totalization result in a memory (not shown), and the process proceeds to step SH4. In step SH4, the processor element $PE_0$ (master program) determines whether the notification of the end of the measurement has been received from the processor element $PE_6$ (at the transmitting end). Since the determination is NO, the process is repeated.

In step SH18, on the other hand, the processor element $PE_6$ notifies the processor element $PE_0$ (master program) of the end of the measurement, after which the process proceeds to step SH19. In step SH19, the processor element $PE_6$ determines whether an instruction has been given by the processor element. $PE_0$ (master program) to end the measurement. Since the answer is NO, the process returns to step SH9.

Upon receipt of an instruction to end the measurement from the processor element $PE_6$ (at the transmitting end), the processor element $PE_0$ (master program) determines the answer as YES in step SH4, and proceeds to step SH5. In steps SH5, the processor element $PE_0$ (master program) determines whether the measurement has been completed for all the sets of two of the processor elements $PE_0$ to $PE_6$ shown in FIG. 18. In the case under consideration, the measurement is complete only for the set including the processor element $PE_6$ (at the transmitting end) and the processor element $PE_0$ (at the receiving end). Therefore, the processor element $PE_0$ (master program) turns NO the answer in step SH5, and returns to step SH2. After that, in the same manner as in the operation described above, the transmission time for the other sets is measured.

Upon completion of the measurement for all the sets, the processor element $PE_0$ (master program) determines the answer in step SH5 as YES, and proceeds to step SH6. In step SH6, the processor element $PE_0$ (master program), after instructing the processor elements $PE_0$ to $PE_6$ (slave programs) to end the measurement, proceeds to step SH7. As a result, in steps SH19 and SH26, the processor elements $PE_0$ to $PE_6$ (slave programs) determines the answer as YES, and proceed to steps SH20 and SH27. In steps SH20 and SH27, the processor elements $PE_0$ to $PE_6$ (slave programs) determine whether the time difference data has been received from the processor element $PE_0$ (master program). Since the answer is NO, the same process is repeated.

In step SH7, the processor element $PE_0$ (master program) takes an average of the result of the totalization for each set of the processor elements $PE_0$ to $PE_6$ shown in FIG. 18 thereby to determine the measurement (transmission time) for the outgoing one-way path. Specifically, in the case under consideration, a plurality of measurements for a plurality of sets are determined. Then, the processor element $PE_0$ (master program) takes the difference between the plurality of measurements, and this difference is transmitted to the processor elements $PE_0$ to $PE_6$ (slave programs) as the time difference data, after which the process proceeds to step SH18. Upon receipt of the time difference data, in steps SH20 and SH27, the processor elements $PE_0$ to $PE_6$ (slave programs) determine the answer as YES and proceed to step SH18. In step SH18, the processor elements $PE_0$ to $PE_6$, after performing the synchronization process, return to the main routine shown in FIG. 20.

In step SG5 shown in FIG. 20, the processor elements $PE_0$ to $PE_6$ performs the synchronization process. Upon complete synchronization process, the processor element $PE_0$ (master program) executes the process of step SG6. At the same time, the processor elements $PE_0$ to $PE_6$ (slave programs) execute the process of steps SG17, SG31 and SG40. In steps SG17, SG31 and SG40, the processor elements $PE_0$ to $PE_6$ (slave programs) determine whether an instruction has been given from the processor element $PE_0$ (master program) to start the test. The answer is NO, and therefore the same process is repeated.

The process of steps SG31 and SG40 is executed by the corresponding reference processor element (at the transmitting end) and the corresponding reference processor element (at the receiving end) of the same set, and the process of step SG17 is executed by the processor elements other than the two reference processor elements of the same set. The two reference processor elements making up the same set are selected out of the processor elements $PE_0$ to $PE_6$.

In step SG6, the processor element $PE_0$ (master program), after determining the transmission route, proceeds to step SG7. The transmission route is defined as the outgoing one-way path between the processor elements described with reference to the process of step SG4 above. Also, the criterion for determining a transmission route is that the transmission time for the particular transmission route (one-way path) is longer than the transmission time for the two-way path between the processor elements other than the particular set of processor elements in the same transmission route. In determining a transmission route, the measurement in step SG4 is used as the transmission time for the transmission route (one-way path), and the measurement in step SG3 (the transmission time for the outgoing one-way path) is used as the transmission time for the two-way path between the processor elements.

Assume that the outgoing one-way path from the processor element $PE_6$ to the processor element $PE_0$ shown in FIG. 19 has been selected as a transmission route. In the example shown in FIG. 19, the transmission time for the outgoing one-way path from the processor element $PE_6$ to the processor element $PE_0$ is longer than the transmission time for the two-way path between the other processor elements. In such a case, the other processing elements are the processor elements $PE_0$ to $PE_5$.

In step SG7, the processor element $PE_0$ (master program) instructs the reference processor element for the transmission route to start the test. In such a case, the transmission route is the outgoing one-way path from the processor element $PE_6$ to the processor element $PE_0$ shown in FIG. 19. The reference processor elements referred to herein indicate the processor element $PE_6$ located at the transmitting end of the transmission route and the processor element $PE_0$ located at the receiving end, respectively. In step SG7, therefore, the processor element $PE_0$ (master program) instructs the processor element $PE_6$ (at the transmitting end) and the processor element $PE_0$ (at the receiving end) to start the test, and then proceeds to step SH8.

Upon receipt of an instruction to start the test, in steps SG31 and SG40, the processor element $PE_6$ (at the transmitting end) and the processor element $PE_0$ (at the receiving end) determine the answer as YES and proceed to step SG32. In step SG32, the processor element $PE_6$ (at the transmitting end) and the processor element $PE_0$ (at the receiving end), after performing the synchronization process, proceed to steps SG33 and SG41, respectively.

In step SG33, the processor element $PE_6$ (at transmitting end) records the transmission time of the packet to be transmitted to the corresponding processor element $PE_0$ (at the receiving end) in the same set, and then proceeds to step SG34. In step SG34, the processor element $PE_6$, after transmitting the packet from the transmission unit (not shown) to the processor element $PE_0$, proceeds to step SG35. The packet addressed to the processor element $PE_0$ is sent to the processor element $PE_0$ through the crossbar network unit 30 by turning on the crossbar switch $S_{06}$ shown in FIG. 18. Also, in step SG41, the processor element $PE_0$ (at the receiving end) determines whether the packet from the processor element $PE_6$ has been received or not. The answer is NO, and therefore the process is repeated.

In step SG8, on the other hand, the processor element $PE_0$ (master program) determines sets of a plurality of processor elements (the processor elements $PE_1$ to $PE_5$ in this case) except for the reference processor elements (the processor elements $PE_6$ and $PE_0$ in this case) by referring to the combination table. This combination table is similar to the combination table shown in FIG. 10 except that the range of combination covers the processor elements $PE_0$ to $PE_6$. In this case, the processor element $PE_0$ (master program) selects the sets shown in FIG. 19. In such a case, the following sets 11 to 51 are obtained.

|   | Source | Destination |
|---|---|---|
| (11) | Processor element $PE_1$ and | processor element $PE_5$ |
| (21) | Processor element $PE_5$ and | processor element $PE_1$ |
| (31) | Processor element $PE_2$ and | processor element $PE_4$ |
| (41) | Processor element $PE_4$ and | processor element $PE_2$ |
| (51) | Processor element $PE_3$ and | processor element $PE_3$ |

Then, in step SG8, the processor element $PE_0$ (master program) notifies the processor elements $PE_1$ to $PE_5$ (slave programs) of the sets 11 to 51 (see FIG. 19) and the start of the test, and then proceeds to step SG9. As a result, the processor elements $PE_0$ to $PE_5$ (slave programs), after recognizing the sets in the load test, determines the answer as YES in step SG17, followed by proceeding to step SG18. In step SG18, the processor elements $PE_1$ to $PE_5$ (slave programs) determine whether the expected value data (expected value of the transmission time) have been received from the processor element $PE_0$ (master program) or not. The determination is NO, and therefore the same process is repeated.

In step SG9, the processor element $PE_0$ (master program) reads the expected value data corresponding to the sets 11 to 51 from the memories (not shown) for each of the processor elements $PE_1$ to $PE_5$ (slave programs) The processor element $PE_0$ (master program) then transmits the expected value data to each of the processor elements $PE_1$ to $PE_5$ (slave programs), and then proceeds to step SG10. Upon receipt of the expected value data, the processor elements $PE_1$ to $PE_5$ (slave programs) determine the answer as YES in step SG18 and proceed to step SG10.

In step SG10, the processor element $PE_0$ (master program) and the processor elements $PE_1$ to $PE_5$ (slave programs) perform the synchronization process. Once the synchronization is secured, the processor element $PE_0$ (master program) proceeds to step SG11. In step SG11, the processor element $PE_0$ (master program) determines whether the notification of the end of the test has been received from all the processor elements $PE_0$ to $PE_6$ (slave programs). The answer is NO and the process is repeated.

Upon securing of synchronization in step SG10, on the other hand, the processor elements $PE_1$ to $PE_5$ (slave programs) start to count on a timer (not shown), and then proceed to step SG19. In step SG19, the processor elements $PE_1$ to $PE_5$ (slave programs), like in steps SF10 (see FIG. 17), determine whether the time on the timer (count) thereof is not less than the time difference data obtained in step SG2. In the case where the answer is NO, the same process is repeated. Specifically, the processor elements $PE_1$ to $PE_5$, as in the second embodiment, stand by for a time length corresponding to the time difference data. Once the time on the timer (count) exceeds the time difference data, the processor elements $PE_1$ to $PE_5$ determine the answer as YES and proceeds to step SG20.

In step SG20, the processor elements $PE_1$ to $PE_5$, like in step SF11 (see FIG. 17), and record the transmission time of packets to the destination processor elements $PE_1$ to $PE_5$, and then proceed to step SF21. In step SF21, the processor elements $PE_1$ to $PE_5$ transmit the packets to the destination processor elements $PE_1$ to $PE_5$, respectively. The transmission time is varied from one packet to another as in the second embodiment described above. Also, each packet is transmitted while the packet is being transmitted from the processor element $PE_6$ shown in FIG. 18 to the processor element $PE_0$, i.e. while the crossbar switch $S_{06}$ of the crossbar network unit 30 is in turn-on state.

The packets that have been transmitted at different time points from the processor elements $PE_1$ to $PE_5$ in step SG21 reach the crossbar network unit 30 shown in FIG. 18 at the same time. As a result, the crossbar switches $S_{51}$, $S_{15}$, $S_{42}$, $S_{24}$, $S_{33}$ in the crossbar switch group 32 of the crossbar network unit 30 turn on at the same time. Specifically, in the case under consideration, the crossbar network unit 30 is under maximum load, and the packets are sent to the destination processor elements $PE_1$ to $PE_5$, respectively.

In step SG22, the source processor elements $PE_1$ to $PE_5$ determine whether the reply packets from the destination processor elements $PE_1$ to $PE_5$ have been received or not, and until the reply packets are so received, repeat the same process for determination. The destination processor elements $PE_1$ to $PE_5$, upon receipt of the packets from the source processor elements $PE_1$ to $PE_5$, generate an interrupt and execute the process of step SG30. Specifically, in step SG30, the destination processor elements $PE_1$ to $PE_5$ transmit the reply packets, respectively, to the source processor elements $PE_1$ to $PE_5$. These reply packets are sent to the source processor elements $PE_1$ to $PE_5$ through the crossbar network unit 30 shown in FIG. 18.

The source processor elements $PE_1$ to $PE_5$, upon receipt of the reply packets from the destination processor elements $PE_1$ to $PE_5$, respectively, determine the answer in step SG22 as YES and proceed to step SG23, respectively. Until the source processor elements $PE_1$ to $PE_5$ have received all the reply packets, the processor element $PE_0$ (at the receiving end) cannot receive the packets from the processor element $PE_6$ at the transmitting end. This is in view of the fact that the transmission route is determined in step. SG6 according to the criterion described above.

In step SG23, the source processor elements $PE_1$ to $PE_5$, after recording the receiving time of the reply packets, respectively, proceed to step SG24. In step SG24, the source processor elements $PE_1$ to $PE_5$ determine whether the number of times the packets are sent to the destination processor elements $PE_1$ to $PE_5$ have reached the specified number $n_7$ (5, for example) or not. Since the number of times transmitted is one, the source processor elements $PE_1$ to $PE_5$ determine the answer as NO and return to step SG19.

After that, until the determination in step SG24 turns YES, the source processor elements $PE_1$ to $PE_5$ perform the process for sending packets to the same destination processor elements $PE_1$ to $PE_5$, recording the transmission time and recording the receiving time of the reply packets (steps SG19 to SG23). In this case, the source processor elements $PE_1$ to $PE_5$ transmit the packets while changing the data length of the packet each time of transmission in order to reduce the error of the transmission time. Then, when the number of times the packets are sent to the destination processor elements $PE_1$ to $PE_5$ reaches a specified number $n_1$ (5), the source processor elements $PE_0$ to $PE_6$ determine the answer in step SG24 as YES and proceed to step SG25.

Also, the processor element $PE_0$ (at the receiving end), upon receipt of the packet from the processor element $PE_6$ (at the transmitting end), determines the answer in step SG41 as YES and proceeds to step SG42. By the time point when the determination in step SG41 turns YES, the source processor elements $PE_1$ to $PE_5$ have received the reply packets. In step SG42, the processor element $PE_0$ (at the receiving end) records the packet receiving time and then proceeds to step SG35.

In step SG35, the processor element $PE_6$ (at the transmitting end) and the processor element $PE_0$ (at the receiving end), after performing the synchronization process, proceed to steps SG36 and SG43. In step SG36, the processor element $PE_6$ (at the transmitting end), after sending to the processor element $PE_0$ the transmission time data indicating the transmission time of the packet addressed to the processor element $PE_0$, proceeds to step SG37. Upon receipt of the transmission time data, the processor element $PE_0$ determines the answer in step SG43 as YES and proceeds to step SG44.

In step SG37, the processor element $PE_6$ determines whether the notification of the end of receipt has been received from the processor element $PE_0$. In this case, the determination is NO, and the process is repeated. Also, in step SG44, the processor element $PE_0$ determines, first of all, the difference between the time when the packet is received from the processor element $PE_6$ (see step SG42) and the transmission time data of the particular packet (see step SG43) as the transmission time for the outgoing one-way path from the processor element $PE_6$ to the processor element $PE_0$.

Then, the processor element $PE_0$, like in step SD15 (see FIG. 11), evaluates the performance by comparing the aforementioned transmission time with the transmission time for the outgoing one-way path determined in step SG4 (see FIG. 21). After that, the processor element $PE_0$, based on the result of the performance evaluation, determines the presence or absence of an error. In the case where an error has occurred, the processor element $PE_0$ turns YES the determination in step SG44 and proceeds to step SG45, and as in step SD16 (see FIG. 11), processes the error, followed by proceeding to step SG46. In the case where no error has occurred, on the other hand, the processor element $PE_0$ determines the answer in step SG44 as NO and proceeds to step SG46.

In step SG46, the processor element $PE_0$ notifies the processor element $PE_6$ of the end of the receiving, and then proceeds to step SG47. In step SG47, the processor element $PE_0$ (slave program) notifies the processor element $PE_0$ (master program) of the end of the test, and then proceeds to step SG12. Also, upon receipt of the notification from the processor element $PE_0$ that the receiving has ended, the processor element $PE_6$ determines the answer in step SG37 as YES, and proceeds to step SG38. In step SG38, the processor element $PE_6$ notifies the processor element $PE_1$ (master program) of the end of the test, and then proceeds to step SG12.

In step SG25, on the other hand, the processor elements $PE_1$ to $PE_5$ determine the presence or absence of an error by the same method as in step SD15 (see FIG. 11). In the case where an error has occurred, the processor elements $PE_0$ to $PE_5$ determine the answer in step SG25 as YES, and proceed to step SG26. After processing the error in the same manner as in step SD16 (see FIG. 11), the process proceeds to step SG27. In the absence of an error, on the other hand, the processor elements $PE_1$ to $PE_5$ determine the answer in step SG25 as NO, and proceed to step SG27. In step SG27, the processor elements $PE_1$ to $PE_5$ notify the processor element $PE_0$ (master program) of the end of the test, and then proceed to step SG12.

Upon receipt of the notification of the end of the test from all the processor elements $PE_0$ to $PE_6$ (slave programs), the processor element $PE_0$ (master program) determines the answer in step SG11 as YES and proceeds to step SG12. In step SG12, the processor elements $PE_0$ to $PE_6$ perform the synchronization process. Upon complete synchronization process, the processor element $PE_0$ (master program) proceeds to step SG13 and determines whether the number of times the test is conducted for the particular transmission route (between the processor element $PE_6$ and the processor element $PE_0$ in this case; see FIG. 18) has reached a specified number $n_8$ or not. In the case where the determination is NO, the process returns to step SG8 for repeating the same process of steps.

Upon complete synchronization process, the processor elements $PE_1$ to $PE_5$ (slave programs) proceed to step SG28 and determines whether the number of times the test is conducted for the particular transmission route has reached the specified number $n_8$. In the case where the determination is NO, the process returns to step SG17 and the same process of steps as mentioned above is repeated. Further, upon complete synchronization process, the processor element $PE_6$ (at the transmitting end) proceeds to step SG39, and determines whether the number of times the test is conducted has reached the specified number $n_8$. In the case where the determination is NO, the process returns to step SG32 for repeating the same process of steps as mentioned above. In similar fashion, upon complete synchronization process, the processor element $PE_0$ (at the receiving end) proceeds to step SG48 and determines whether the number of times the test is conducted has reached the specified number $n_8$. In the case where the determination is NO, the process returns to step SG32 and the same process of steps as mentioned above is repeated.

Once the number of times the test is conducted reaches the specified number $n_8$ for the particular route, the determination in steps SG13, SG28, SG39 and S48 turns YES. As a result, in step SG14, the processor element $PE_0$ (master program) determines whether the test has been completed for all the transmission routes satisfying the conditions for determining the transmission route described above with reference to step SG6, and in the case where the determination is NO, the process returns to step SG6.

Then, in and after step SG6, the test is conducted for another transmission route. In step SG29, the processor elements $PE_0$ to $PE_6$ (slave programs) determine whether an instruction to end the test has been received from the processor element $PE_0$ (master program) or not. In the case where the determination is NO, the process returns to steps SG17, SG31 and SG40, respectively, and the test is conducted for another transmission route.

Upon completion of the test for all the transmission routes, the processor element $PE_0$ (master program) determines YES as the determination of step SG14, and proceeds to step SG15. In step SG15, the processor element $PE_0$ (master program) instructs the processor elements $PE_0$ to $PE_6$ (slave programs) to end the test, and then proceeds to step SG16. Upon receipt of the instruction to end the test, the processor elements $PE_0$ to $PE_6$ (slave programs) determine the answer in step SG29 as YES and proceed to step SG16. In step SG16, the processor elements $PE_0$ to $PE_6$ perform the synchronization process and end a series of the load tests.

As described above, according to this embodiment, while packets are transmitted between a specified set of processor elements (between the processor element $PE_0$ and the processor element $PE_6$ shown in FIG. 19, for example) having a longer transmission time than the other sets, packets are transmitted and the performance is evaluated for the other sets. Therefore, it is possible to determine the effect of the packet transmission for a specified set that has on the packet transmission for the other sets.

Figure 22:
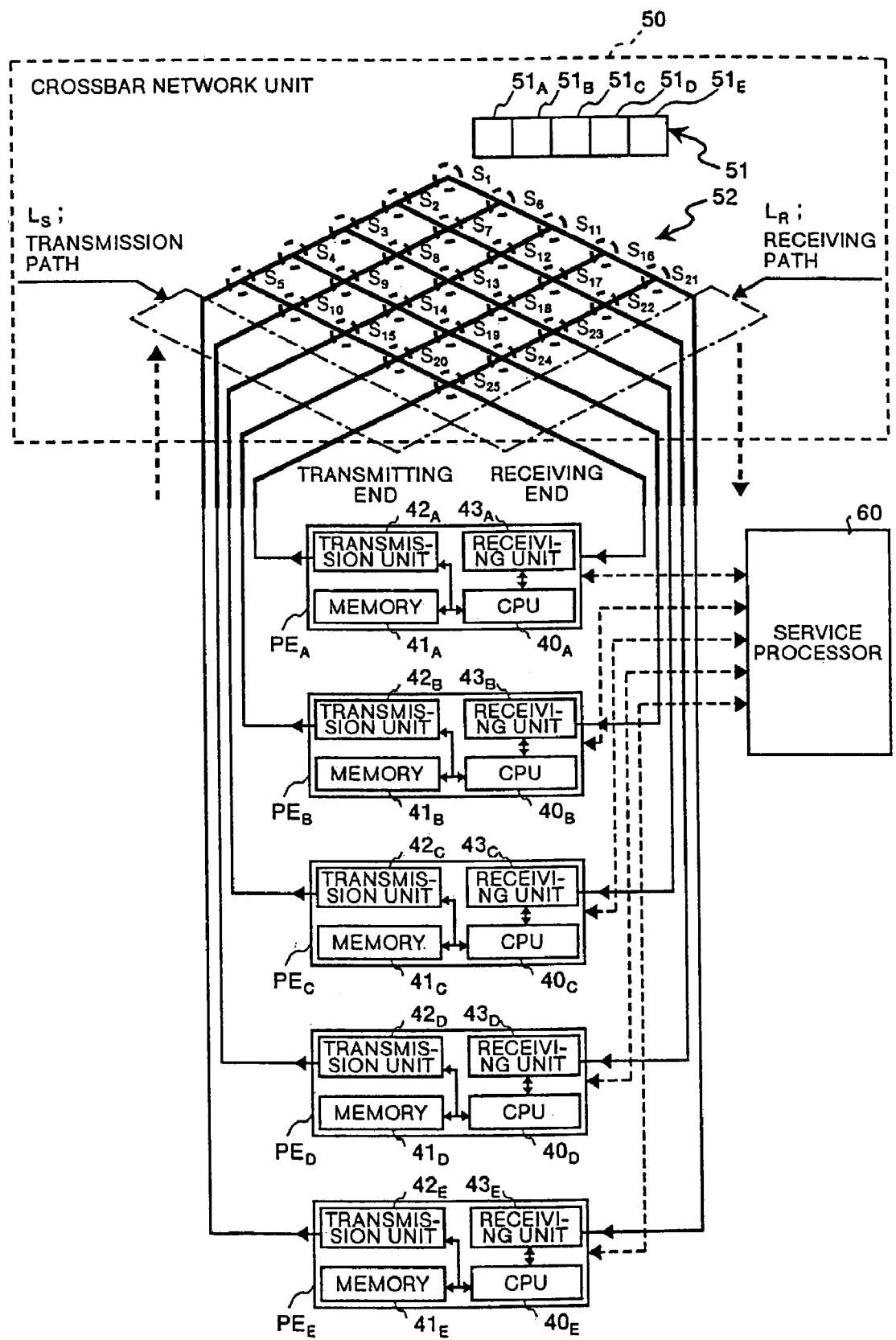
FIG. 22 is a block diagram showing a configuration according to a fourth embodiment of the present invention.

FIG. 22 is a block diagram showing a configuration of a fourth embodiment of the present invention. The basic configuration of the parallel processor system shown in FIG. 22 is the same as that shown in FIG. 1, except that the parallel processor system of FIG. 22 has five processor elements $PE_A$ to $PE_E$, i.e. one more processor element than the parallel processor system of FIG. 1. Also, with the increase in the number of processor elements, the configuration of the crossbar network unit 50 is somewhat different from that of the crossbar network unit,10 (see FIG. 1). The fourth embodiment concerns a fault diagnosis apparatus for performing the fault diagnosis and identifying a defective point.

In FIG. 22, the processor elements $PE_A$ to $PE_E$ are arithmetic elements for executing the arithmetic operation concurrently in accordance with the parallel algorithm, and each include a CPU and a memory. The basic configuration of the processor elements $PE_A$ to $PE_E$ is the same as that of the processor element $PE_0$ (see FIG. 1) described above. Specifically, the processor element $PE_A$ includes a CPU $40_A$ for controlling the various parts of the apparatus, a memory $41_A$ for storing a fault diagnosis program, an arithmetic program and arithmetic data, a transmission unit $42_A$ for transmitting the arithmetic data, etc. as packets under the control of the CPU $40_A$, and a receiving unit $43_A$ for receiving the packets. The fault diagnosis program is for fault diagnosis of the parallel processor system and will be described in detail later.

The other processor elements $PE_B$ to $PE_E$ have the same configuration as the processor element $PE_A$. Specifically, the processor element $PE_B$ includes a CPU $40_B$ for controlling the fault diagnosis, a memory $41_B$ for storing a fault diagnosis program, etc., a transmission unit $42_B$ for transmitting packets, and a receiving unit $43_B$ for receiving the packets. In similar fashion, the processor element $PE_C$ includes a CPU $40_C$, a memory $41_C$, a transmission unit $42_C$ and a receiving unit $43_C$, while the processor element $PE_D$ includes a CPU $40_D$, a memory $41_D$, a transmission unit $42_D$ and a receiving unit $43_D$. Also, the processor element $PE_E$ includes a CPU $40_E$, a memory $41_E$, a transmission unit $42_E$ and a receiving unit $43_E$.

The crossbar network unit 50 is a device for interconnecting the processor elements $PE_A$ to $PE_E$, and like the register group 11 (see FIG. 1), includes a register group 51 used for the synchronization process, and a crossbar switch group 52 having N×N (5×5 in the diagram) crossbar switches. In the crossbar network unit 50, the incoming line side (transmission path $L_S$ side) is connected to the transmission units $42_A$ to $42_E$ of the processor elements $PE_A$ to $PE_E$ while the outgoing line side (receiving path $L_R$ side) is connected to the receiving units $42_A$ to $43_E$ of the processor elements $PE_A$ to $PE_E$.

The register group 51 is configured with registers $51_A$ to $51_E$ and is used for assuring synchronization of the processor elements $PE_A$ to $PE_E$. These registers $51_A$ to $51_E$ correspond to the processor elements $PE_A$ to $PE_E$, respectively. The register $51_A$ stores the "1" or "0" data in response to the access thereto from the processor element $PE_A$. The processor element $PE_A$ can store "1" or "0" data only in the register $51_A$ but not in the other registers $51_B$ to $51_E$. In similar fashion, the registers $51_B$ to $51_E$ store "1" or "0" data in response to the access thereto from the processor elements $PE_B$ to $PE_E$, respectively.

Also, the data stored in the register group 51 (registers $51_A$ to $51_E$) can be accessed by any of the processor elements $PE_A$ to $PE_E$. Specifically, the processor element $PE_A$ can access the data stored in any of the registers $51_A$ to $51_E$. This is also the case with the other processor elements $PE_B$ to $PE_E$ which can access the data in any one of the registers $51_A$ to $51_E$. In the synchronization process, the processor elements $PE_A$ to $PE_E$ write "1" (or "0") data individually in the registers $51_A$ to $51_E$.

After that, the processor elements $PE_A$ to $PE_E$ poll the register group 51 (registers $51_A$ to $51_E$) at regular time intervals thereby to access the data held therein. The processor elements $PE_A$ to $PE_E$ recognize that the synchronization has been secured when all the data held in the register group 51 turn "1" (or "0").

The crossbar switch group 52 has a total of 25 (5×5) crossbar switches $S_1$ to $S_{25}$ for interconnecting an arbitrary one of the sets of the processor elements $PE_A$ to $PE_E$. A service processor 60 connected to each of the processor elements $PE_A$ to $PE_E$ has a similar function to the crossbar switch group 52. In other words, the service processor 60 interconnects an arbitrary one of the sets of the processor elements $PE_A$ to $PE_E$.

The memories $41_A$ to $41_E$ of the processor elements $PE_A$ to $PE_E$ shown in FIG. 22 each have stored therein, as in the case of FIG. 4, a fault diagnosis program including a master program and a slave program. Specifically, the memory $41_A$ of the processor element $PE_A$ has stored therein a master program and a slave program, while the memories $41_B$ to $41_E$ of the processor elements $PE_B$ to $PE_E$ each have stored therein a slave program.

Figure 23:
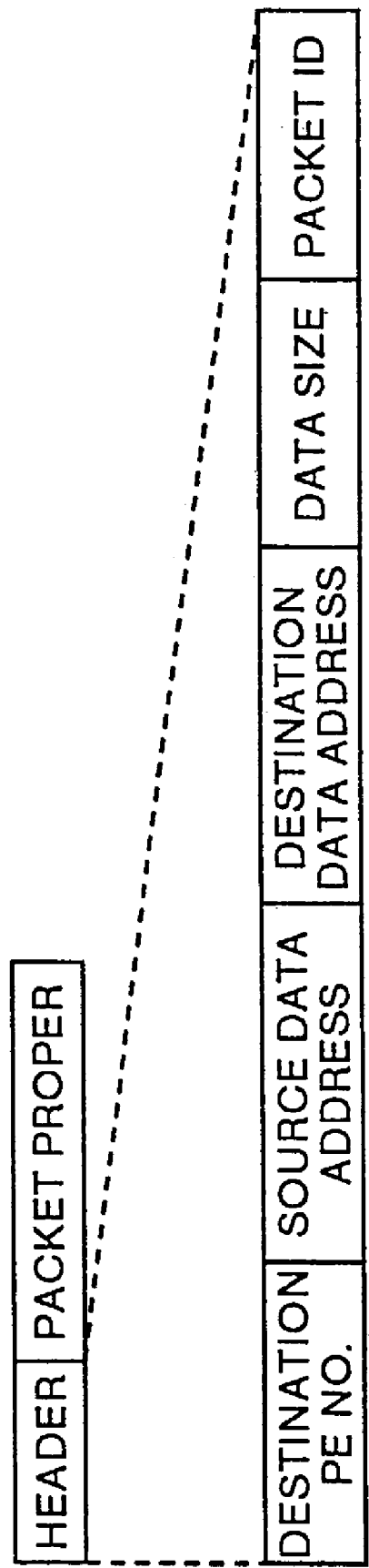
FIG. 23 is a diagram showing a data structure of a packet according to the fourth embodiment.

FIG. 23 is a diagram showing a data structure of the packet transmitted from the transmission units $42_A$ to $42_E$ of the processor elements $PE_A$ to $PE_E$, respectively. As shown in FIG. 23, the packet is composed of a header indicating an address, etc. and a packet proper (data). The header includes a destination PE number, a source data address, a destination data address, a data size and a packet ID. The destination PE number is for specifying a destination processor element out of the processor elements $PE_A$ to $PE_E$.

Thus, the processor elements $PE_A$ to $PE_E$ are each assigned a unique number (0 to 4, for example). The source data address is that of the memory of the source processor element where the packets are stored. The destination data address is that of the memory of the destination processor element for storing the packets. The data size is that of the packet proper (data) The packet ID (see FIG. 25) is an identifier for identifying a particular one of a plurality of packets, i.e. a particular set of a source processor element and a destination processor element. The packet ID will be explained in more detail later.

Figure 24:
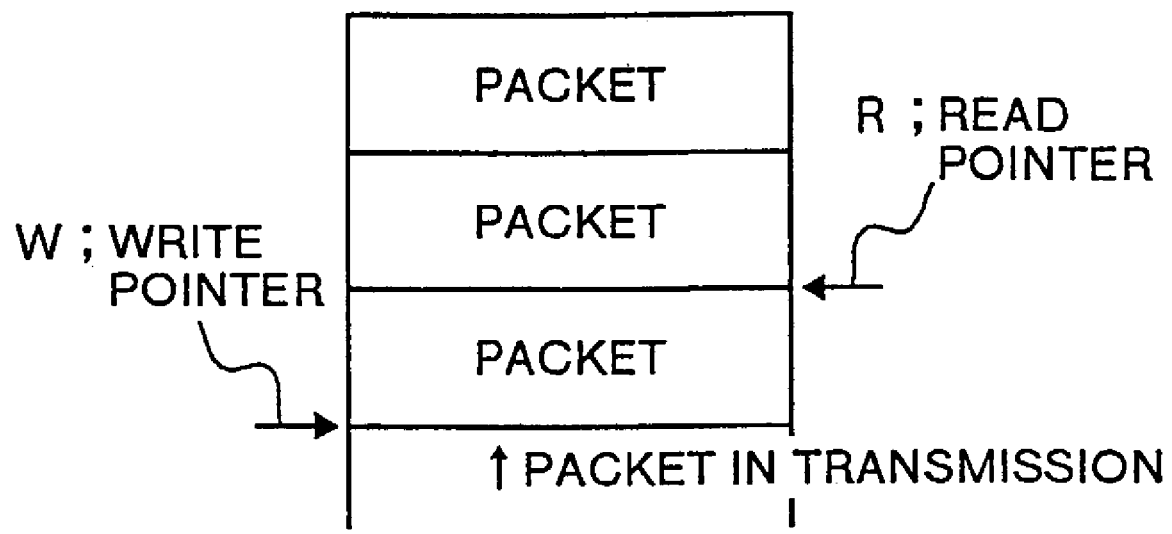
FIG. 24 is a diagram for explaining the packet transmission operation according to the fourth embodiment of the present invention.

As shown in FIG. 24, a plurality of packets are written in the memories $41_A$ to $41_E$ of the processor elements $PE_A$ to $PE_E$ and form a queue in the order of transmission. When a new packet is added to the queue, a write pointer W moves by one packet, while when the packet read out is transmitted, a read pointer R moves by one packet in the opposite direction. At the time point when the write pointer W and the read pointer R coincide with each other, the transmission of all the packets is completed.

Now, the operation of the fourth embodiment described above will be explained. The manner in which a fault diagnosis is made and a defective point is specified will be described below with reference to the case in which a defective point T exists between the crossbar switches $S_{13}$ and $S_{14}$ of the crossbar switch group 52 shown in FIG. 26.

Figure 27:
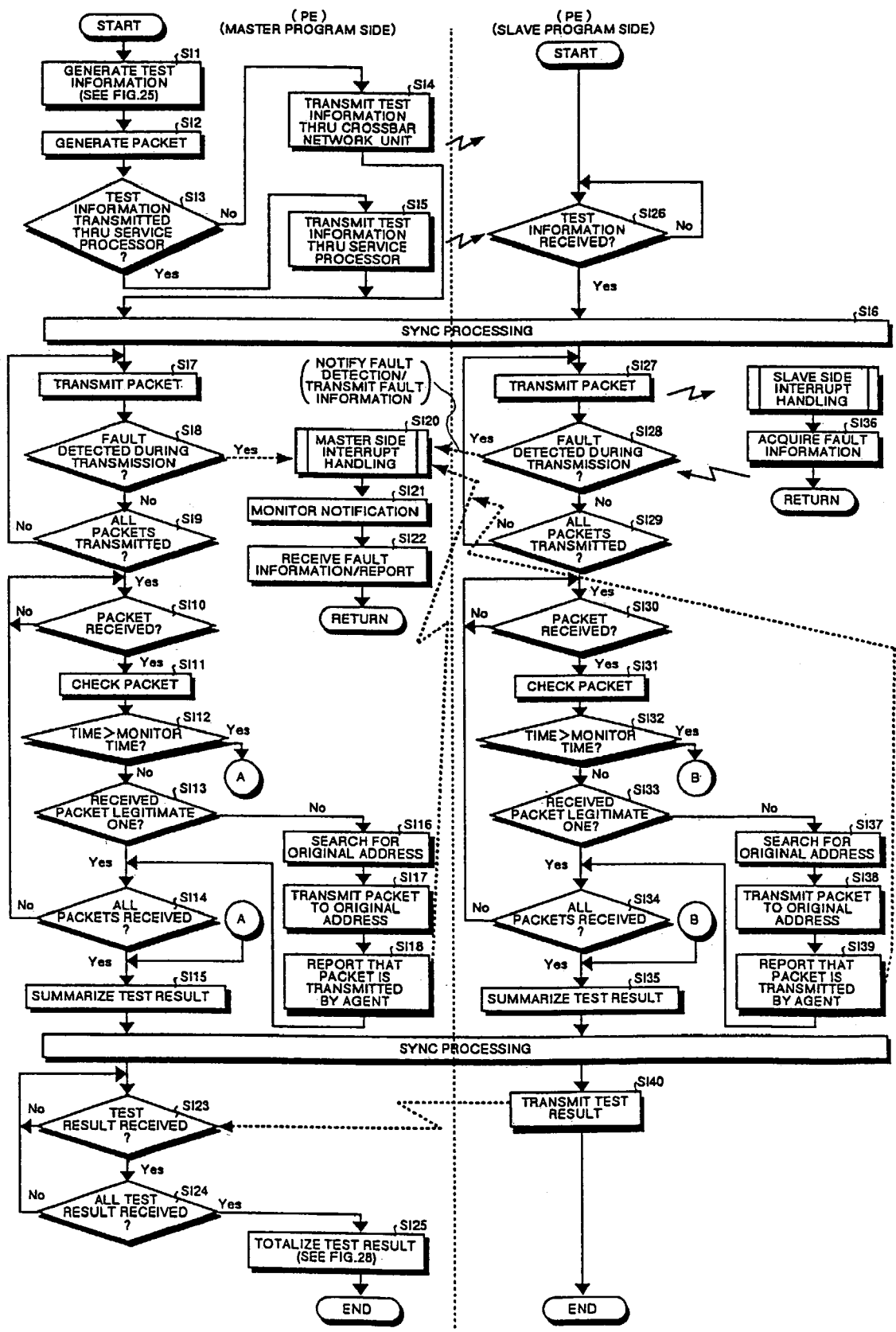
FIG. 27 is a flowchart for explaining the operation according to the fourth embodiment.

First, with reference to the flowchart of FIG. 27, a test for fault diagnosis will be explained. In FIG. 27, the processor element $PE_A$ (master program) generates the test information shown in FIG. 25 in step SI1, after which the process proceeds to step SI2. The test information shown in FIG. 25 is composed of 25 types of information including the packet ID (see FIG. 23), the source processor element, the destination processor element and the packet proper, and makes up packet information corresponding to the sets of the processor elements $PE_A$ to $PE_E$. In FIG. 25, characters A to E designate the processor elements $PE_A$ to $PE_E$, respectively.

The packets having the packet ID of 0, for example, include a packet proper (=0) to be transmitted to the destination processor element $PE_A$ from the source processor element $PE_A$. Thus, the packet ID of 0 can uniquely specify the set including the source processor element $PE_A$ and the destination processor element $PE_A$. In similar fashion, the packet of packet ID of 1 has a packet proper (=1) to be transmitted from the source processor element $PE_A$ to the destination processor $PE_B$. Thus the packet ID of 1 can uniquely specify the set including the source processor element $PE_A$ and the destination processor element $PE_B$.

In step SI26, the processor elements $PE_B$ to $PE_E$ (slave programs) determine whether the test information (including packets) shown in FIG. 25 have been received from the processor element $PE_A$ (master program). Since the determination is NO, the same process is repeated.

In step SI2, the processor element $PE_A$ (master program) generates a total of 25 packets (see FIGS. 23a and 23b) in accordance with the test information shown in FIG. 25, and then proceeds to step SI3. In the packet having the packet ID of 0, for example, the destination PE number shown in FIG. 23. is the number assigned to the destination processor element $PE_A$, and therefore the packet ID is 0 (see FIG. 25). Also, the packet proper shown in FIG. 23 is the packet 0 (see FIG. 25).

In step SI3, the processor element $PE_A$ (master program) determines whether the test information (including packets) shown in FIG. 25 is to be transmitted or not to the processor elements $PE_B$ to $PE_E$ (slave programs) through the service processor 60 shown in FIG. 22. The test information and the packets are held in the processor element $PE_A$ and therefore are not transmitted to the processor $PE_A$.

In the case where the determination in step SI3 is YES, the processor element $PE_A$ (master program) proceeds to step SI5. In step SI5, the processor element $PE_A$ (master program) transmits the test information (including packets) to the processor elements $PE_B$ to $PE_E$ (slave programs) through the service processor 60 and then proceeds to step SI6.

In the case where the determination in step SI3 is NO, on the other hand, the processor element $PE_A$ (master program) proceeds to step SI4. In step SI4, the processor element $PE_A$ (master program) transmits the test information (including packets) to the processor elements $PE_B$ to $PE_E$ (slave programs) through the crossbar network unit 50, and then proceeds to step SI6. The reason why the test information (including packets) is transmitted through the service processor 60 is in order to avoid the inconvenience of the test information (including packets) failing to arrive at the destination due to some fault of the crossbar network unit 50. According to the fourth embodiment, only the test information may be sent to the processor elements $PE_B$ to $PE_E$ (slave programs) so that packets are generated in the processor elements $PE_B$ to $PE_E$.

Upon receipt of the test information (including packets) from the processor element $PE_A$ (master program), the processor elements $PE_B$ to $PE_E$ determine the answer in step SI26 as YES, and proceed to step SI6. In step SI6, the processor elements $PE_A$ to $PE_E$ perform the synchronization process. Upon complete synchronization, the processor $PE_A$ starts counting on each timer (not shown) and then proceeds to step SI7, while the processor elements $PE_B$ to $PE_E$ proceed to SI27. In step SI7, the processor element $PE_A$ transmits the packet of packet ID 0 shown in FIG. 25 to the destination processor element $PE_A$, and then proceeds to step SI8, where it is determined whether a fault is detected at the time of transmission or not. In the case where this determination is NO, the process proceeds to step SI9.

In the case where the determination in step SI8 is YES, on the other hand, the processor element $PE_A$ proceeds to step SI20 for executing an interrupt handling on master side. This master-side interrupt handling is carried out in step SI21 in which the processor element $PE_A$ monitors whether a notification is given as to whether a fault is detected or not, and then proceeds to step SI22. In step SI22, on the other hand, the processor element $PE_A$ receives the fault information/report described later and then returns to the main routine.

In step SI9, the process or element $PE_A$ determines whether all the packets corresponding to the packet IDs 0 to 4 shown in FIG. 25 have been transmitted or not. Since the determination is NO in the case under consideration, the process returns to step SI7. After that, the processor element $PE_A$ sequentially transmits the packets corresponding to the remaining packet IDs 1 to 4 shown in FIG. 25. When the determination in step SI9 turns YES, the processor element $PE_A$ proceeds to step SI10. In step SI10, the processor element $PE_A$ determines whether the packets from the destination processor element have been received or not, and in the case where the determination is NO, the same process is repeated.

In step SI27, the processor elements $PE_B$, $PE_C$, $PE_D$ and $PE_E$, like in step SI7, transmit the packets of packet ID 5, the packet ID 10, the packet ID 15 and the packet ID 20, respectively, shown in FIG. 25, to the destination processor element $PE_A$, after which the process proceeds to step SI28. In step SI28, the processor elements $PE_B$, $PE_C$, $PE_D$ and $PE_E$ determine whether a fault has been detected or not at the time of transmission, and in the case where this determination is NO, the process proceeds to step SI29.

In the case where the determination in step SI28 is YES, on the other hand, an interrupt handling is generated on slave side. Specifically, in step SI36, the fault information is acquired and after that, the process is returned to the main routine. The processor elements $PE_B$, $PE_C$, $PE_D$ and $PE_E$ notify the processor element $PE_A$ (master program) of the fault detection. As a result, the processor element $PE_A$ (master program) carries out the interrupt handling of step SI20 described above.

In step SI29, the processor elements $PE_B$, $PE_C$, $PE_D$ and $PE_E$ determine whether all the packets corresponding to the packet IDs 5 to 9, 10 to 14, 15 to 19 and 20 to 24 shown in FIG. 25 have been transmitted or not. Since the determination is NO, the process is returned to step SI27.

After that, the processor elements $PE_B$, $PE_C$, $PE_D$ and $PE_E$ sequentially transmit the packets corresponding to the remaining packet IDs 6 to 9, 11 to 14, 16 to 19 and 21 to 24 shown in FIG. 25. Once the determination in step SI29 turns YES, the processor elements $PE_B$ to $PE_E$ proceed to step SI30. In step SI30, the processor elements $PE_B$ to $PE_E$ determine whether the packets have been received from the destination processor elements, and in the case where the determination is NO, the same process is repeated.

Also, the 25 packets corresponding to the packet IDs 0 to 24 shown in FIG. 25 are transmitted to the destination processor elements $PE_A$ to $PE_E$ through the crossbar network unit 50. Upon receipt of the packets, the processor element $PE_A$ turns YES the determination in step SI10, and proceeds to step SI11. In step SI11, the processor element $PE_A$ checks the received packets and proceeds to step SI12.

In step SI12, the processor element $PE_A$ determines whether the time on the timer (count) has exceeded the monitor time or not, and in the case where the determination is YES, the process. proceeds to step SI15. During this monitor time, the presence or absence of a packet received is checked. Assume that the time on the timer has not exceeded the monitor time. The processor element $PE_A$ determines the answer as NO and proceeds to step SI13. In step SI13, the processor element $PE_A$ determines whether the packet received is the one which should originally be received, based on the result of check in step SI11.

Specifically, the processor element $PE_A$ determines whether the received packet is the one addressed to itself by checking the destination PE number (see FIG. 23) thereof. In the case where the determination is NO, the processor element $PE_A$ recognizes that the packet has been transmitted in error, and proceeds to step SI16. A probable cause of the erroneous packet transmission is a case in which the destination PE number shown in FIG. 23 is replaced by another number due to the fault of a source processor element.

In step SI16, the processor element $PE_A$ searches the test information (see FIG. 25) for the original address (destination) of the particular packet using the packet ID (see FIG. 23) of the received packet as a key, and then proceeds to step SI17. In step SI17, the processor element $PE_A$ rewrites the destination PE number (see FIG. 23) of the received packet into the correct destination PE number searched for as described above. The processor element $PE_A$, after transmitting the particular packet as an agent for the original address, proceeds to step SI18. As a result, the particular packet is received by the correct destination processor element. In step SI18, the processor element $PE_A$ (slave program) informs the processor element $PE_A$ (master program) of the agency transmission, and then proceeds to step SI14.

As a result, the processor element $PE_A$ (master program) executes the master interrupt handling of step SI20. Specifically, in step SI21, the processor element $PE_A$ (master program) monitors whether a notification is given from the processor elements $PE_A$ to $PE_E$ (slave programs), and then proceeds to step SI22. In step SI22, the processor element $PE_A$ (master program), after receiving the information on the receipt by the agent, returns to the main routine.

In the case where the determination in step SI13 is YES, on the other hand, i.e. in the case where a packet is normally received, then the processor element $PE_A$ proceeds to step SI14. In step SI14, the processor element $PE_A$ determines by reference to the test information (FIG. 25) whether all the packets transmitted from the destination processor element has been received or not. The determination is NO in this case, return to step SI10 and therefore the processor element $PE_A$ performs the processing of receiving and checking the packets.

Upon receipt of a packet, on the other hand, the processor elements $PE_B$ to $PE_E$ proceed to step SI31. After that, in steps SI30 to SI34 and SI37 to SI39, the same processing as in steps SI10 to SI14 and SI16 to SI18 is executed by the processor elements $PE_B$ to $PE_E$, respectively.

In the case where the determination in step SI12 or step SI14 turns YES, the processor element $PE_A$ proceeds to step SI15. In step SI15, the processor element $PE_A$ summarizes the test result, and then proceeds to step SI19. Also, when the determination in step SI32 or SI34 turns YES, the processor elements $PE_B$ to $PE_E$ proceed to step SI35. In step SI35, the processor elements $PE_B$ to $PE_E$ summarize the test result and proceed to step SI19. In step SI19, the processor elements $PE_A$ to $PE_E$ perform the synchronization process.

Upon complete synchronization process, the processor element $PE_A$ proceeds to step SI23, and determines whether the test result has been received from the processor elements $PE_B$ to $PE_E$. Since the determination is NO in this case, the same process is repeated. Upon complete synchronization, on the other hand, the processor elements $PE_B$ to $PE_E$ proceed to step SI40, and after transmitting the test result to the processor element $PE_A$ through the crossbar network unit 50 (or the service processor 60), end the series of the process. Upon receipt of the test result, the processor element $PE_E$ determines the answer in step SI23 as YES, and proceeds to step SI24.

In step SI24, the processor element $PE_A$ determines whether all the test result have been received or not, and in the case where this determination is NO, returns to step SI23. Upon receipt of all the test result, on the other hand, the processor element $PE_A$ determines the answer in step SI24 as YES and proceeds to step SI25. In step SI25, the processor element $PE_A$ (master program) collects the received test result and thus obtains the test result as shown in FIG. 28, thereby completing the series of the process. In the test result shown in FIG. 28, "RESULT" indicates the test result for each packet, "OK" indicates that a particular packet has been normally transmitted/received, and "NG" indicates that a particular packet has developed a fault in transmission/receipt.

Figure 29:
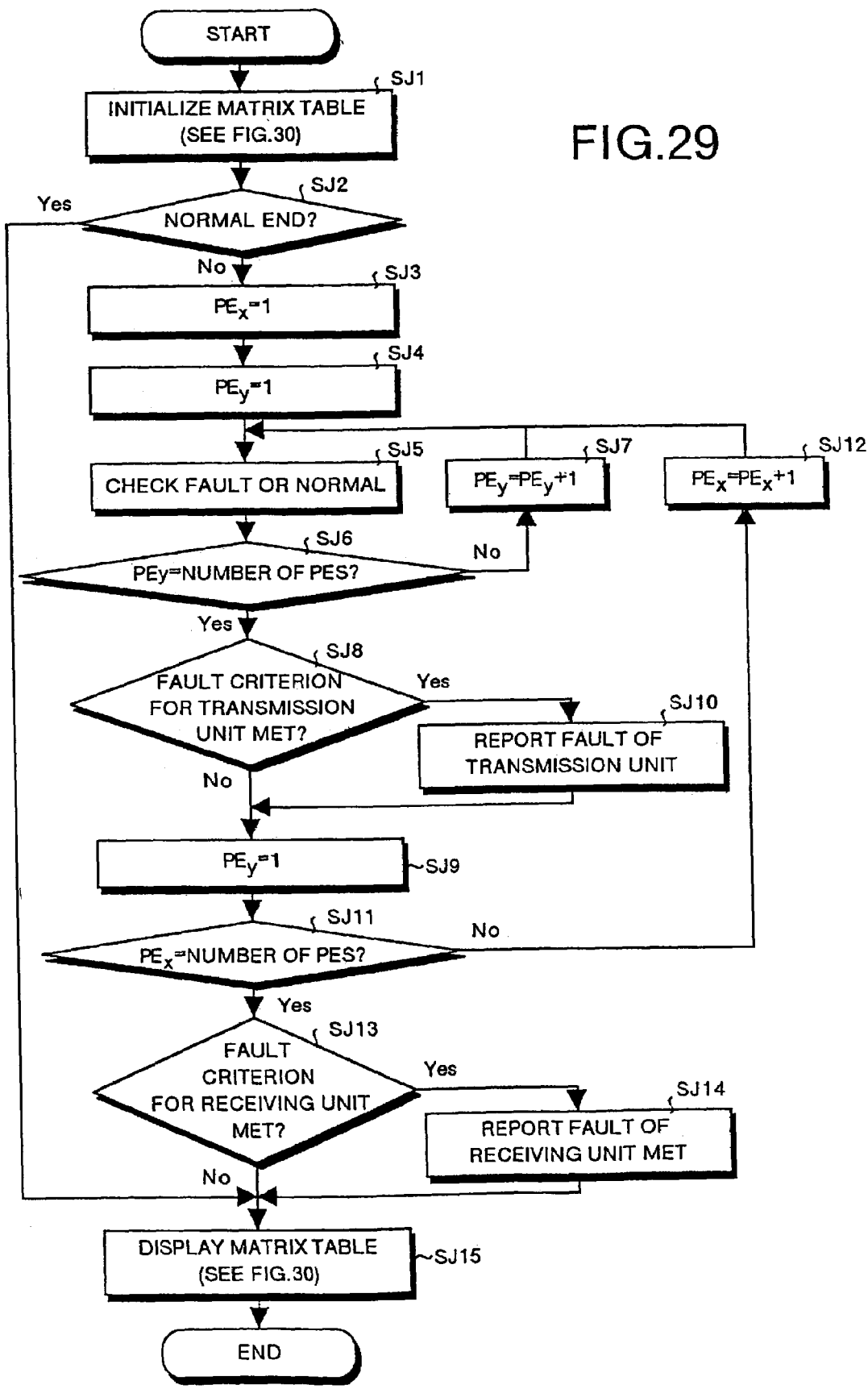
FIG. 29 is a flowchart for explaining the fourth embodiment of the present invention.

Now, the process for analyzing the test result shown in FIG. 28 will be explained with reference to the flowchart of FIG. 29. This process is executed by the processor element $PE_A$ (master program). In step SJ1 shown in FIG. 29, the processor element $PE_A$ initializes the matrix table of FIG. 30, and then proceeds to step SJ2. This matrix table is a model presentation of the crossbar switches S1 to S25 shown in FIG. 26.

Figure 30:
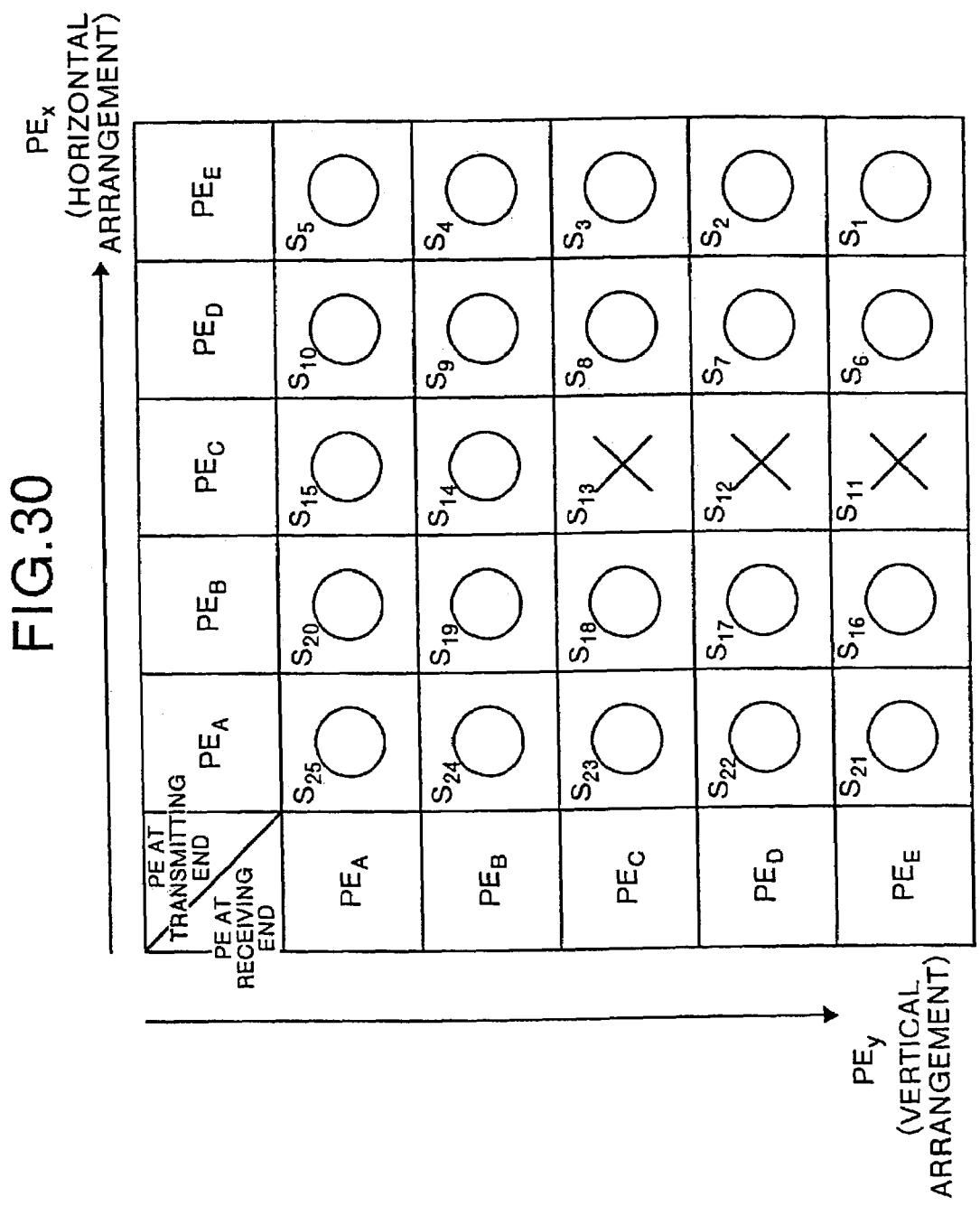
FIG. 30 is a diagram showing a matrix table according to the fourth embodiment.

Variables $PE_X$ ($PE_A$ to $PE_E$) in horizontal arrangement in rows are for specifying the processor elements $PE_A$ to $PE_E$ (see FIGS. 22 and 26) at the transmitting end. Variables $PE_Y$ ($PE_A$ to $PE_E$) in vertical arrangement in columns, on the other hand, are for specifying the processor elements $PE_A$ to $PE_E$ (see FIGS. 22 and 26) at the receiving end. In FIG. 30, the white circle indicates that the test result is normal (OK), and X indicates that the test result is not normal (NG).

In step SJ2, the processor element $PE_A$ determines whether all are normal (OK) or not by referring to the "RESULT" of the test information shown in FIG. 28. In the test information shown in FIG. 28, the packets ID 12, 17 and 22 are all abnormal (NG), and therefore the processor element $PE_A$, determining the answer in step SJ2 as NO, proceeds to step SJ3. In the case where the determination in step SJ2 is YES, on the other hand, the processor element $PE_A$ proceeds to step SJ15. In step SJ15, the processor element $PE_A$ displays the matrix table of FIG. 30 with all the columns thereof filled with a white circle on the display unit (not shown) as an analysis result. By checking this display, the test operator recognizes that all the tests have been normally completed, i.e. that there is no defective point.

In this case, in step SJ3, the processor element $PE_A$ substitutes 1 into the variable $PE_X$ in horizontal arrangement of FIG. 30, and then proceeds to step SJ4. In step SJ4, the processor element $PE_A$ substitutes 1 into the variable $PE_Y$ in vertical arrangement of FIG. 30, and then proceeds to step SJ5. The variable $PE_X$ (=1) corresponds to the source processor element $PE_A$ shown in FIG. 28 and the variable $PE_Y$ (=1) corresponds to the destination processor element $PE_A$ shown in FIG. 28.

In step SJ5, the processor element $PE_A$ (master program) checks the result corresponding to the packet ID (=0) shown in FIG. 28 specified by the variables $PE_X$(=1) and $PE_Y$(=1). In this case, the test result is normal (OK), and therefore the processor element $PE_A$ fills a white circle in the portion ($S_{25}$) of the matrix table of FIG. 30 and proceeds to step SJ6.

In step SJ6, the processor element $PE_A$ determines whether the variable $PE_Y$ (=1) is as many as the PEs (=5) or not. The number of PEs is the total number of the processor elements $PE_A$ to $PE_E$. In the case under consideration, the processor element $PE_A$ determines the answer in step SJ6 as NO and proceeds to step SJ7. In step SJ7, the processor element $PE_A$ increments the variable $PE_Y$(=1) to 2, and then proceeds to step SJ5. The variable $PE_Y$ (=2) corresponds to the destination processor element $PE_B$ shown in FIG. 28.

In step SJ5, the processor element $PE_A$ (master program) checks the result corresponding to the packet ID (=1) shown in FIG. 28 specified by the variables $PE_X$(=1) and $PE_Y$(=2). In this case, the result is normal (OK), and therefore the processor element $PE_A$ fills a white circle in the portion ($S_{24}$) of the matrix table of FIG. 30 and then proceeds to step SJ6.

After that, until the determination in step SJ6 turns YES, the processor element $PE_A$ keeps the variable $PE_X$ (=1) at a constant value while incrementing the variable $PE_Y$ sequentially thereby to check the result as described above. Once the determination in step SJ6 turns YES, the processor element $PE_A$ proceeds to step SJ8. At this time point, the white circle, indicating the normality is filled in the portions of $S_{25}$ to $S_{21}$ of the matrix table of FIG. 30.

In step SJ8, it is determined whether the criterion for the fault of the transmission unit is met or not. The criterion for the fault of the transmission unit is a condition for determining whether a transmission unit of the source processor element (the processor element $PE_A$ in this case) corresponding to the variable $PE_X$(=1) is abnormal or not. Specifically, the criterion requires that the variable $PE_X$ remains constant and until the variable $PE_Y$ comes to coincide with the number of PEs, all the result in step SJ5 is abnormal. In the case under consideration, as clear from FIG. 30, the portions $S_{25}$ to $S_{21}$ are all filled with the white circle indicating the normality, and therefore the processor element $PE_A$ determines the answer in step SJ8 as NO and proceeds to step SJ9.

In the case where the criterion for the fault of the transmission unit is met, i.e. in the case where X marks indicating a fault are filled in all the portions $S_{25}$ to $S_{21}$ in FIG. 30, on the other hand, the processor element $PE_A$ determines the answer in step SJ8 as YES and proceeds to step SJ10. In step SJ10, the processor element $PE_A$ displays on a display unit (not shown) or otherwise informs the test operator that the transmission unit $42_A$ (see FIG. 22) of the source processor element $PE_A$ corresponding to the variable $PE_X$(=1) is abnormal, followed by proceeding to step SJ9.

In step SJ9, the processor element $PE_A$ substitutes 1 into the variable $PE_Y$, and then proceeds to step SJ11. In step SJ11, the processor element $PE_A$ determines whether the variable $PE_X$ (=1) is as many as the PEs (=5) In the case under consideration, the determination is NO and the process proceeds to step SJ12. Instep SJ12, the processor element $PE_A$ increments the variable $PE_X$ (=1) by one, and then proceeds to step SJ5. The variable $PE_X$ (=2) corresponds to the source processor element $PE_B$ shown in FIG. 28. Instep SJ5, the processor element $PE_A$ checks the result corresponding to the packet ID (=5) shown in FIG. 28 specified by the variables $PE_X$(=2) and $PE_Y$(=1). In the case under consideration, the result is normal (OK) and therefore the processor element $PE_A$ fills a white circle in the portion $S20$ of the matrix table of FIG. 30, and then proceeds to step SJ6.

Then, until the determination in step SJ6 turns YES, the processor element $PE_A$ keeps the value of the variable $PE_X$ (=2) constant while incrementing the variable $PE_Y$ sequentially thereby to check the result described above. Once the determination in step SJ6 turns YES, the processor element $PE_A$ proceeds to step SJ8. At this time point, the portions $S_{20}$ to $S_{16}$ in the matrix table of FIG. 30 are filled with a white circle indicating the normal state.

In step SJ8, the processor element $PE_A$, as in the aforementioned operation, determines whether the criterion for the fault of the transmission unit is met or not. In this case, as apparent from FIG. 30, all the portions $S_{20}$ to $S_{16}$ are filled with a white circle indicating the normal state, and therefore the determination in step SJ8 is turned NO and the process proceeds to step SJ9. In step SJ9, the processor element $PE_A$ substitutes 1 into the variable $PE_Y$, after which the process proceeds to step SJ11. In step SJ11, the processor element $PE_A$ determines whether the variable $PE_X$ (=2) is as many as the PEs (=5). Since the determination is NO in this case, the process proceeds to step SJ12.

In step SJ12, the processor element $PE_A$ increments the variable $PE_X$ (=2) by one, and then proceeds to step SJ5. The variable $PE_X$ (=3) corresponds to the source processor element $PE_C$ shown in FIG. 28. In step SJ5, the processor element $PE_A$ checks the result corresponding to the packet ID (=10) shown in FIG. 28 specified by the variables $PE_X$ (=3) and $PE_Y$(=1). In this case, the result is normal (OK), and therefore the processor element $PE_A$ fills a white circle in the portion $S_{15}$ of the matrix table of FIG. 30, followed by proceeding to step SJ6.

After that, until the determination in step SJ6 turns YES, the processor element $PE_A$ keeps the value of the variable $PE_X$ (=3) constant while sequentially incrementing the variable $PE_Y$ one by one thereby to check the result. Once the determination in step SJ6 turns YES, the processor element $PE_A$ proceeds to step SJ8. At this time point, the portions $S_{15}$ and $S_{14}$ of the matrix table shown in FIG. 30 are filled with a white circle indicating the normal state, while an X mark indicating a fault is filled in the portions $S_{13}$ to $S_{11}$.

In step SJ8, the processor element $PE_A$, like the aforementioned operation, determines whether the criterion for the fault of the transmission unit is met or not. Since the portions $S_{15}$ to $S_{11}$ are filled with a white circle indicating the normal state, as apparent from FIG. 30, the determination is turned NO and the process proceeds to step SJ9. In step SJ9, the processor PE$_A$ substitutes 1 into the variable PE$_Y$ and then proceeds to step SJ11. In step SJ11, the processor element PE$_A$ determines the answer as NO and proceeds to step SJ12, where the variable PE$_X$ (=3) is incremented by one, followed by proceeding to step SJ5.

After that, until the determination in step SJ11 turns YES, the processor element PE$_A$ sequentially increments the variables PE$_X$ and PE$_Y$ one by one thereby to check the result described above. Once the determination of step SJ11 turns YES, the processor element PE$_A$ proceeds to step SJ13. At this time point, the portions $S_{10}$ to $S_1$ of the matrix table shown in FIG. 30 are filled with a white circle indicating the normal state.

In step SJ13, it is determined whether the criterion for a fault of the transmission unit is met or not. The criterion for a fault of the transmission is defined as a condition for determining whether the receiving unit of the destination processor element corresponding to the variable PE$_Y$ is defective or not. Specifically, the criterion requires that the variable PE$_Y$ is constant in value, and all the result is normal in step SJ5 until the variable PE$_X$ becomes as many as the PEs. In this case, as apparent from FIG. 30, five (number of PEs) X marks indicating a fault are successively arranged in the horizontal line, and therefore the processor element PE$_A$ determines the answer in step SJ13 as NO and proceeds to step SJ15.

In the case where the criterion for a fault of the transmission unit is met, i.e. in the case where the X marks indicating a fault are filled in all the portions $S_{25}$ to $S_5$ of the horizontal arrangement in FIG. 30, for example, the processor element PE$_A$ determines the answer in SJ13 as YES and proceeds to step SJ14. In step SJ14, the processor element PE$_A$ displays on a display unit (not shown) that a fault is found in the receiving unit 42$_A$ (see FIG. 22) of the destination processor element PE$_A$ corresponding to the variable PE$_Y$ (=1).

Then, the processor element PE$_A$ specifies a defective point from the matrix table displayed on the display unit. Specifically, the processor element PE$_A$, taking note of the portions $S_{13}$ to $S_{11}$ marked with X indicating a fault, checks the processor elements at the transmitting end corresponding to the particular three X marks. In this case, the processor elements at the transmitting end corresponding to the three X marks are, the processor elements PE$_C$. Then, the processor element PE$_A$, taking note of the portions $S_{15}$ and $S_{14}$ marked with a white circle indicating the normality in the arrangement ($S_{15}$ to $S_{11}$) associated with the three X marks, checks the processor elements at the receiving end corresponding to the two white circles. In this case, the processor elements at the receiving end are the processor element PE$_A$ and the processor element PE$_B$.

Figure 26:
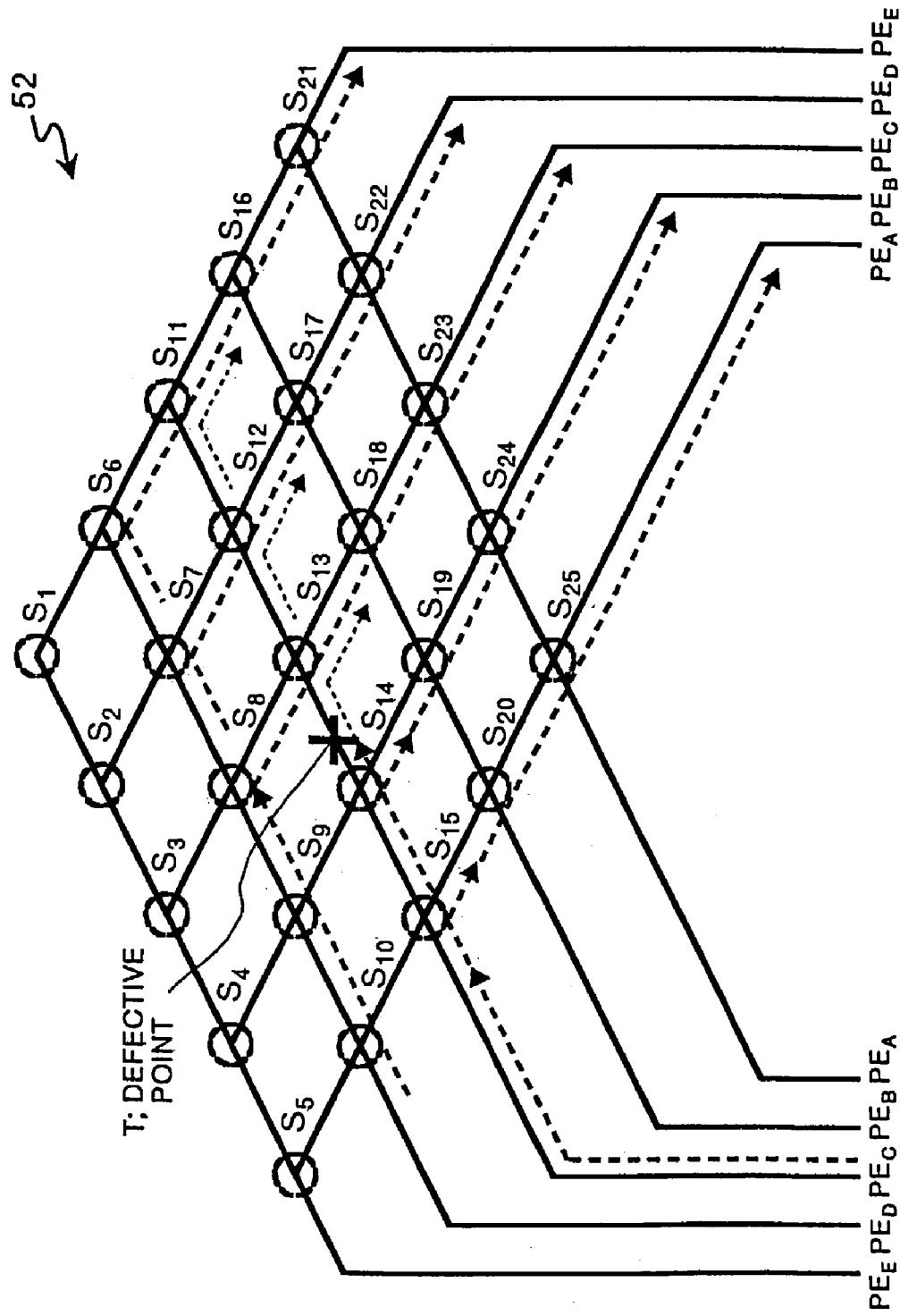
FIG. 26 is a diagram for explaining the operation according to the fourth embodiment.

This matrix table shows that the packets sent from the processor elements PE$_C$ at the transmitting end shown in FIG. 26 to the processor elements PE$_A$ and PE$_B$ at the receiving end are normally received by the processor elements PE$_A$ and PE$_B$ at the receiving end through the crossbar switches $S_{15}$ and $S_{14}$. Also, it is seen that the packets sent from the processor element PE$_C$ at the transmitting end to the processor elements PE$_C$ to PE$_E$ are not received by the processor elements PE$_C$ to PE$_E$. Thus, the processor element PE$_A$ specifies a defective point T between the crossbar switches $S_{14}$ and $S_{13}$ shown in FIG. 26, and then proceeds to step SJ15. In step SJ15, the processor element PE$_A$ displays the result of specifying the defective point and the matrix table shown in FIG. 30 on a display unit (not shown), thereby completing the series of processes.

As described above, according to the fourth embodiment, packets with a packet ID (identifier) attached thereto for specifying a set of a plurality of processor elements are combined into sets accurately and transmitted, and based on the test information shown in FIG. 25, a fault between a source processor element and a destination processor element is grasped. Therefore a defective point can be identified with rapidity.

Also, according to the fourth embodiment, the information on the presence or absence of a fault is arranged in a matrix table as shown in FIG. 30 so that the position of the crossbar switch corresponding to a defective point can be grasped. The identification of a defective point of the crossbar network unit which has thus far been difficult can be effected with rapidity.

Further, according to the fourth embodiment, in the case where a packet with a wrong address is received by a processor element, the particular processor element sends it to the original destination (processor element). As a result, the secondary fault is prevented which would be caused when the processor element originally entitled to receive the packet detects a fault due to the receiving time-out.

The first to fourth embodiments of the present invention have been described in detail with reference to the drawings. Specific example configurations, however, are not limited to the first to fourth embodiments, but any design change not departing from the spirit and scope of the present invention is covered by the present invention. In the first to fourth embodiments described above, for example, the load test program or the fault diagnosis program for realizing the function of the load testing apparatus or the fault diagnosis apparatus, as the case may be, can be recorded in the computer readable recording medium 200 shown in FIG. 31 so that the load test program or the fault diagnosis program recorded in the recording medium 200 can be read by the computer 100 shown in FIG. 31 thereby to carry out the load test or the fault diagnosis, as the case may be.

The computer 100 shown in FIG. 31 includes a CPU 101 for executing the load test program and the fault diagnosis program, an input device 102 such as a keyboard and a mouse, a ROM (read-only memory) 103 for storing various data, a RAM (random access memory) 104 for storing arithmetic parameters, etc., a reader 105 for reading the load test program or the fault diagnosis program from the recording medium 200, and an output device 106 such as a display or a printer, and a bus BU for connecting the various parts the apparatus.

The CPU 101 reads the load test program or the fault diagnosis program stored in the recording medium 200 through the reader 105, and then executes the load test program or the fault diagnosis program, as the case may be, thereby to carry out the load test or the fault diagnosis. The recording medium 200 includes a portable recording medium such as an optical disk, a floppy disk or a hard disk and also a transmission medium such as a network for temporarily recording and holding data.

In the first to third embodiments, an explanation is given of the case in which the performance is evaluated based on the result of measuring the transmission time (including the expected value) in the two-way path between processor elements. The performance can alternatively be evaluated based on the result of measuring the transmission time (including the expected value) for the outgoing one-way path. The route for which the transmission time (including the expected value) is measured in the first to third embodiments, therefore, may be either a two-way path or an outgoing one-way path.

The present invention in the aspects described above can be modified in the following manner. Specifically, the second aspect of the present invention may comprise a return test means (corresponding to the CPUs of the processor elements $PE_0$ to $PE_7$ according to the second embodiment described above) in which packets are sent from a source arithmetic unit to itself, and the transmission time between the arithmetic unit and the network is measured sequentially for each arithmetic unit, wherein the load testing unit can determine the transmission timing based on the measurement result of the return test unit.

According to this aspect of the present invention, the packets transmitted from the arithmetic unit of the source to itself are returned to the arithmetic unit of the source by the network and then received by the arithmetic unit of the source, while measuring the transmission time between the arithmetic unit and the network. The load test unit causes a plurality of packets to be sent at a transmission timing based on the measurement result of the return test unit.

As described above, according to this invention, a plurality of packets are transmitted in such a timing as to arrive at a network at the same time on condition that no packets are sent to one destination arithmetic unit from a plurality of source arithmetic unit, and therefore a load test can be conducted always under maximum load. Further, the performance is evaluated using the actually-measured transmission time for each set as an expected value and based on the transmission time under maximum load, thereby producing a highly reliable test result.

Further, the network is a crossbar network (corresponding to the crossbar network unit 50 according to the fourth embodiment described above) having a two-dimensional arrangement in which a plurality of incoming lines are connected to a plurality of source arithmetic unit and a plurality of outgoing lines are connected to a plurality of destination arithmetic unit. Also, the fault diagnosis unit described above may perform the fault diagnosis in such a manner that a matrix table having an arrangement corresponding to a plurality of crossbar switches is produced, and the test information is accessed using the identifier in the collection result of the information collecting unit as a key, so that the fault diagnosis is performed based on the result of arranging in the matrix table the information on the presence or absence of a receiving fault in the arithmetic unit of the destination.

According to this invention, some destination arithmetic unit may normally receive ID attached packets while other arithmetic unit may not receive ID attached packets in case of a fault. In such a case, the information collecting unit collects the information on the receiving condition (presence or absence of receipt) of each arithmetic unit. Also, the fault diagnosis unit refers to the test information using the identifier in the collection result of the information collecting unit as a key so that the information on the presence or absence of a receiving fault in the destination arithmetic unit are arranged in a matrix table. Then, the fault diagnosis unit grasps the position of the crossbar switch corresponding to the receiving fault based on the matrix table thereby to specify a defective point in the crossbar network.

As described above, according to the present invention, the information on the presence or absence of a receiving fault in the arithmetic unit of the destination is arranged in a matrix table to grasp the position of a crossbar switch corresponding to a defective point, and therefore a defective point in the crossbar network which has thus far been considered difficult to grasp can be rapidly identified.

Further, the system according to the present invention comprises search unit (corresponding to the CPUs $40_A$ to $40_E$ according to the fourth embodiment described above) in which in the case where a destination arithmetic unit receives a packet with an identifier not addressed to the particular arithmetic unit, the destination arithmetic unit which should receive the particular packet with the identifier is searched for by referring to the test information using the identifier of the packet as a key, and agency transmission control unit (corresponding to the CPUs $40_A$ to $40_E$ according to the fourth embodiment described above) for transmitting the packet with the identifier to the correct destination arithmetic unit from the arithmetic unit that has received the packet with the identifier, based on the search result of the search unit.

According to the above invention, in the case where the address of a packet with an identifier is changed to another address (wrong address) due to a fault of the source arithmetic unit, the particular packet with the identifier is received by the arithmetic unit of a different destination. In such a case, the search unit accesses the test information with the identifier included in the packet as a key and thus searches for the legitimate destination arithmetic unit which should receive the particular packet with the identifier, and the packet with the identifier is sent from the arithmetic unit that has received it to the legitimate destination arithmetic unit. In other words, the destination arithmetic unit that has received the wrongly-addressed packet with the identifier transmits the particular packet to the legitimate address (arithmetic unit) on behalf of the source arithmetic unit that has developed the fault.

In this way, according to this invention, the packet with an identifier wrongly addressed is received by the arithmetic unit, the arithmetic unit sends it to the legitimate address (arithmetic unit). Therefore, the secondary fault can be prevented, in which a fault would otherwise might be detected due to a time out of receiving by the arithmetic unit which should receive the particular packet with the identifier.

Further, according to the present invention, the network is a crossbar network having a plurality of two-dimensionally arranged crossbar switches so configured that a plurality of incoming lines thereof are connected to a plurality of source arithmetic unit and a plurality of outgoing lines thereof are connected to a plurality of destination arithmetic unit, and the fault diagnosis process may include the step of producing a matrix table of an arrangement corresponding to the crossbar switches, the step of accessing the test information using the identifier in the collection result of the information collecting process as a key and thus arranging the information on the presence or absence of a receiving fault of the destination arithmetic unit in the matrix table, and the step of performing the fault diagnosis based on the result of arrangement of the information in the matrix table.

According to the above invention, in the case where the system has a defective point, a plurality of destination arithmetic unit include arithmetic unit that have normally received packets with an identifier and arithmetic unit that has not received such packets. In such a case, the information on the receiving condition (presence or absence of receipt) of each arithmetic unit is collected in the information collecting process. In the fault diagnosis process, the test information is accessed with the identifier in the collection result of the information collecting process as a key so that the information on the presence or absence of the receiving fault in the destination arithmetic unit is arranged in the matrix table. Then, in the fault diagnosis process, the position of a crossbar switch corresponding to the receiving fault is grasped based on the matrix table, thereby identifying a defective point of the crossbar network.

As described above, according to the present invention, the information on the presence or absence of a receiving fault in the destination arithmetic unit are arranged in a matrix table to grasp the position of a crossbar switch corresponding to a defective point. Therefore, a defective point which has so far been considered difficult to detect in the crossbar network can be identified with rapidity.

Further, according to the present invention, the invention can comprise a search process (corresponding to steps SI16 and SI37 of the fourth embodiment described above) in which in the case where a packet with an identifier not addressed to a destination arithmetic unit is received by the particular arithmetic unit, the test information is accessed with the identifier of the particular packet as a key thereby to search for the legitimate destination arithmetic unit which should receive the packet with the identifier, and an agency transmission control process (corresponding to steps SI17 and SI39 of the fourth embodiment described above) in which the packet with an identifier is transmitted from the arithmetic unit that has received the packet with the identifier to the legitimate destination arithmetic unit based on the result of the search in the search process.

According to the above invention, in the case where the address of a packet with an identifier is changed to another address (wrong address) due to a fault of the source arithmetic unit, the particular packet with the identifier is received by the arithmetic unit of a different destination. In such a case, the test information is accessed in the search process with the identifier included in the packet as a key thereby to search for the legitimate destination arithmetic unit which should receive the particular packet with the identifier, and the packet with the identifier is sent from the arithmetic unit that has received it to the legitimate destination arithmetic unit. In other words, the destination arithmetic unit that has received the wrongly-addressed packet with the identifier transmits the particular packet to the legitimate address (arithmetic unit) on behalf of the source arithmetic unit that has developed the fault.

In this way, according to this invention, the packet with an identifier wrongly addressed is received by the arithmetic unit, the arithmetic unit sends it to the legitimate address (arithmetic unit). Therefore, the secondary fault can be prevented, in which a fault would otherwise might be detected due to a time out of receiving by the arithmetic unit which should receive the particular packet with the identifier.

As described above, according to the present invention, a plurality of packets are sent at a time on condition that no packet is sent from a plurality of source arithmetic unit to a single destination arithmetic unit, and therefore a load test can be conducted always under heavy load. Also, according to the first and fourth aspects of the present invention, the performance is evaluated using the actually-measured transmission time for each set as an expected value, and therefore a highly reliable test result is obtained.

Further, according to the present invention, a plurality of packets are sent in such a timing as to arrive at the network at the same time on condition that no packet is sent to a single destination arithmetic unit from a plurality of source arithmetic unit, and therefore a load test can be conducted always under maximum load. Also, according to the second and fifth aspects of the present, invention, the performance is evaluated based on the transmission time under maximum load with the actually-measured transmission time for each set as an expected value, and therefore an even more highly reliable test result is obtained.

Further, according to the present invention, a packet is sent between a specified set of arithmetic unit while at the same time sending packets and evaluating the performance between other sets of arithmetic unit, and therefore it is possible to determine the effect that the packet transmission in a specified set of arithmetic unit has on the packet transmission in other sets of arithmetic unit.

Further, according to the present invention, packets with an identifier for identifying a given set of a plurality of arithmetic unit in accurate combinations are transmitted, and the relation between the source arithmetic unit and the destination arithmetic unit is grasped taking the receiving condition of the destination arithmetic unit into account based on the test information. Thus, a defective point can be identified with rapidity.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A fault diagnosis apparatus which diagnoses a fault of a parallel processor system, said parallel processor system having
a plurality of arithmetic units each having a packet transmission and receiving function; and
a network for interconnecting said plurality of arithmetic units;
said fault diagnosis apparatus comprising:
a determining unit which determines a plurality of pairs of said arithmetic units by combining, without overage or shortage, said plurality of arithmetic units, wherein said pair of said arithmetic units is a combination of an arithmetic unit at the source (source arithmetic unit) and an arithmetic unit at the destination (destination arithmetic unit);
a packet producing unit which produces packets with an identifier attached to data for identifying each of said pairs;
a storing unit which stores the test information including the identifier, the information on the arithmetic units constituting the source of said packet with the identifier and the information on said arithmetic units constituting the destination of said packet with the identifier;
a transmitting unit which transmits the packets with the identifier from said plurality of source arithmetic units to the corresponding destination arithmetic units, respectively, in the same pair; and
an information collecting unit which collects an information on the receiving condition of the packets with the identifier in each of said destination arithmetic units; and
a diagnosing unit which diagnoses a fault by accessing the test information using the identifier in the information collected by said information collecting unit as a key.

2. A computer readable recording medium recording a fault diagnosis program used for fault diagnosis of a parallel processor system including a plurality of arithmetic units each having the function of transmitting and receiving packets, and a network for interconnecting said plurality of arithmetic units, said fault diagnosis program enabling a computer to execute the steps of:

determining a plurality of pairs of said arithmetic units by combining, without overage or shortage, said plurality of arithmetic units, wherein said pair of said arithmetic units is a combination of an arithmetic unit at the source (source arithmetic unit) and an arithmetic unit at the destination (destination arithmetic unit);

producing packets with an identifier attached to data for identifying each of said pairs;

storing the test information including the identifier, the information on the arithmetic units constituting the source of the packet with the identifier and the information on the arithmetic units constituting the destination of the packet with the identifier;

transmitting the packets with the identifier from said plurality of source arithmetic units to the corresponding destination arithmetic units, respectively, in the same pair; and collecting information on the receiving condition of the packets with the identifier in each of said destination arithmetic units; and diagnosing a fault by accessing the test information using the identifier in the information collected by said information collecting unit as a key.

3. A method of performing fault diagnosis of a parallel processor system including a plurality of arithmetic units each having the function of transmitting and receiving packets, and a network to interconnect the plurality of arithmetic units, the method comprising:

determining identifiers which respectively identify all possible transmission pairs of the respective arithmetic units, each of the transmission pairs including a source arithmetic unit and a destination arithmetic unit;

transmitting test packets from the source to the destination of each of the transmission pairs, each of the test packets comprising a corresponding one of the identifiers along with source and destination information regarding the respective arithmetic units; and comparing the identifier with the source and destination information in each of the received packets to detect faults between the source and destination arithmetic units.

* * * * *

UNITED STATES PATENT AND TRADEMARK OFFICE
CERTIFICATE OF CORRECTION

| | | |
|---|---|---|
| PATENT NO. | : 7,137,035 B2 | Page 1 of 1 |
| APPLICATION NO. | : 10/449012 | |
| DATED | : November 14, 2006 | |
| INVENTOR(S) | : Satoshi Sato et al. | |

It is certified that error appears in the above-identified patent and that said Letters Patent is hereby corrected as shown below:

Title Page, Item (73) Assignee: change "Fijitsu" to --Fujitsu--.

Signed and Sealed this

Thirteenth Day of March, 2007

JON W. DUDAS
*Director of the United States Patent and Trademark Office*